(12) United States Patent
Hamner

(10) Patent No.: US 11,644,298 B2
(45) Date of Patent: *May 9, 2023

(54) INDUCTIVE POSITION DETECTION CONFIGURATION FOR INDICATING A MEASUREMENT DEVICE STYLUS POSITION

(71) Applicant: Mitutoyo Corporation, Kanagawa-ken (JP)

(72) Inventor: Christopher Richard Hamner, Kirkland, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 167 days.

This patent is subject to a terminal disclaimer.

(21) Appl. No.: 17/135,665

(22) Filed: Dec. 28, 2020

(65) Prior Publication Data

US 2021/0116228 A1 Apr. 22, 2021

Related U.S. Application Data

(63) Continuation-in-part of application No. 16/557,719, filed on Aug. 30, 2019, now Pat. No. 10,914,570.
(Continued)

(51) Int. Cl.
*G01B 7/012* (2006.01)

(52) U.S. Cl.
CPC ................... *G01B 7/012* (2013.01)

(58) Field of Classification Search
None
See application file for complete search history.

(56) References Cited

U.S. PATENT DOCUMENTS

| | | | | |
|---|---|---|---|---|
| 4,375,723 A | * | 3/1983 | McMurtry | G01B 7/012 33/559 |
| 4,716,656 A | | 1/1988 | Maddock et al. | |

(Continued)

FOREIGN PATENT DOCUMENTS

| | | |
|---|---|---|
| CN | 103229024 A | 7/2013 |
| CN | 108291801 A | 7/2018 |

(Continued)

OTHER PUBLICATIONS

Extended European Search Report, dated Apr. 21, 2022, for European Application No. 21215886.9-1001, 7 pages.
(Continued)

*Primary Examiner* — Christopher W Fulton
(74) *Attorney, Agent, or Firm* — Seed Intellectual Property Law Group LLP

(57) ABSTRACT

An inductive position detector for stylus position measurement in a scanning probe comprises a coil board configuration located along a central axis in the probe. The coil board configuration includes a field generating coil configuration that surrounds a hole in the coil board configuration, a top axial sensing coil configuration and a bottom axial sensing coil configuration, and N top rotary sensing coils and N bottom rotary sensing coils. A stylus-coupled disruptor configuration includes a cylindrical disruptor element that is configured to move and fit within the hole of the coil board configuration, and moves along Z (axial) and X-Y (rotary) directions in a motion volume. The field generating coil configuration generates a changing magnetic flux (e.g., encompassing all or at least part of the cylindrical disruptor element), and coil signals indicate the cylindrical disruptor element and/or stylus positions.

20 Claims, 33 Drawing Sheets

Related U.S. Application Data which is a continuation-in-part of application No. 16/178,295, filed on Nov. 1, 2018, now Pat. No. 10,866,080.

(56) References Cited

U.S. PATENT DOCUMENTS

| | | | |
|---|---|---|---|
| 4,810,966 A | 3/1989 | Schmall | |
| 4,866,854 A | 9/1989 | Seltzer | |
| 5,109,223 A | 4/1992 | Schmitt et al. | |
| 5,209,131 A | 5/1993 | Baxter | |
| 5,212,646 A * | 5/1993 | McMurtry | G01B 7/28 700/161 |
| 5,326,982 A | 7/1994 | Wiklund | |
| 5,345,689 A | 9/1994 | McMurtry et al. | |
| 5,841,274 A | 11/1998 | Masreliez et al. | |
| 6,043,644 A | 3/2000 | de Coulon et al. | |
| 6,526,672 B1 | 3/2003 | Danielli et al. | |
| 6,971,183 B2 | 12/2005 | Brenner et al. | |
| 7,552,543 B2 * | 6/2009 | Tomelleri | G01B 7/012 33/561 |
| 7,652,275 B2 | 1/2010 | Gladnick | |
| 8,438,746 B2 | 5/2013 | Usui | |
| 9,454,145 B2 | 9/2016 | Collingwood et al. | |
| 9,471,054 B2 * | 10/2016 | McMurtry | G01B 5/012 |
| 9,671,257 B2 | 6/2017 | Held et al. | |
| 9,791,262 B2 | 10/2017 | Harsila et al. | |
| 9,803,972 B2 | 10/2017 | Sesko | |
| 9,835,433 B1 | 12/2017 | Antreasyan et al. | |
| 10,006,757 B1 | 6/2018 | Sesko | |
| 10,145,666 B2 | 12/2018 | Jansson | |
| 10,184,773 B2 | 1/2019 | Jansson | |
| 10,215,547 B2 | 2/2019 | Hemmings et al. | |
| 10,323,928 B2 | 6/2019 | Sesko | |
| 10,866,080 B2 * | 12/2020 | Cook | G01B 5/016 |
| 10,914,570 B2 * | 2/2021 | Hamner | G01B 5/016 |
| 11,047,678 B2 * | 6/2021 | Koga | G01B 21/04 |
| 11,268,874 B2 * | 3/2022 | Saito | G01B 5/016 |
| 2003/0048592 A1 | 3/2003 | Thomas et al. | |
| 2005/0253576 A1 | 11/2005 | Nyce | |
| 2013/0111774 A1 | 5/2013 | McMurtry et al. | |
| 2015/0330766 A1 | 11/2015 | Gong | |
| 2016/0195389 A1 | 7/2016 | Sagemueller et al. | |
| 2016/0258744 A1 | 9/2016 | Shimaoka et al. | |
| 2017/0176171 A1 | 6/2017 | Harsila et al. | |
| 2017/0227345 A1 | 8/2017 | Sakai | |
| 2017/0370688 A1 | 12/2017 | Hemmings et al. | |
| 2018/0156594 A1 | 6/2018 | Jansson | |
| 2018/0364026 A1 | 12/2018 | Sesko | |
| 2019/0004092 A1 | 1/2019 | Hemmings | |
| 2019/0120606 A1 | 4/2019 | Harsila et al. | |
| 2020/0141714 A1 | 5/2020 | Cook et al. | |
| 2020/0141717 A1 | 5/2020 | Hamner et al. | |
| 2021/0117020 A1 * | 4/2021 | Hamner | G01B 5/016 |
| 2022/0074728 A1 * | 3/2022 | Hamner | G01D 5/2053 |
| 2022/0205773 A1 * | 6/2022 | Hamner | G01D 5/2053 |

FOREIGN PATENT DOCUMENTS

| | | |
|---|---|---|
| DE | 23 47 899 A1 | 4/1975 |
| DE | 10 2011 052 609 A1 | 2/2013 |
| EP | 0 130 940 A1 | 1/1985 |
| JP | S3211992 Y | 9/1957 |
| JP | S51149049 A | 12/1976 |
| JP | S6038648 A | 2/1985 |
| JP | 2002039796 A | 2/2002 |
| JP | 2005265463 A | 9/2005 |
| JP | 2008102144 A | 5/2008 |
| JP | 2017111113 A | 6/2017 |
| WO | 2018/006032 A1 | 1/2018 |
| WO | 2019/067755 A1 | 4/2019 |

OTHER PUBLICATIONS

Extended European Search Report, dated May 16, 2022, for European Application No. 21216121.0-1001, 7 pages.
Extended European Search Report, dated May 18, 2022, for European Application No. 21216011.3-1001, 5 pages.
Extended European Search Report, dated Apr. 6, 2020, for European Application No. 19206283.4-1010, 5 pages.
Office Action, dated Jan. 10, 2023, for Japanese Patent Application No. 2019-197854. (6 pages) (with English Translation).

* cited by examiner

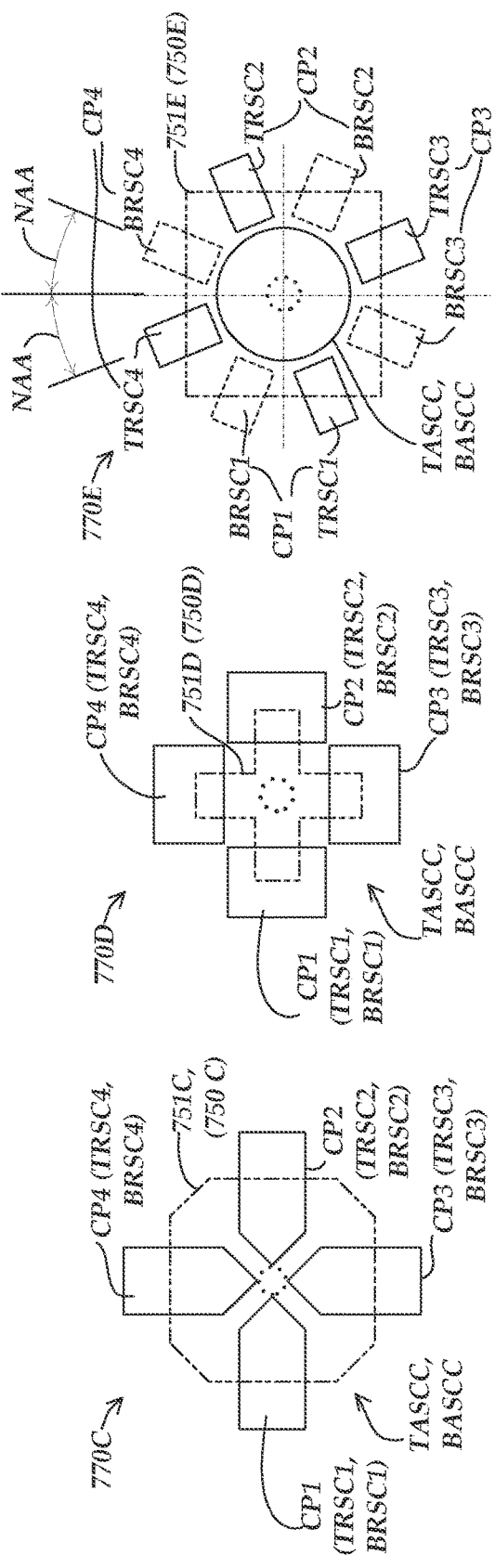
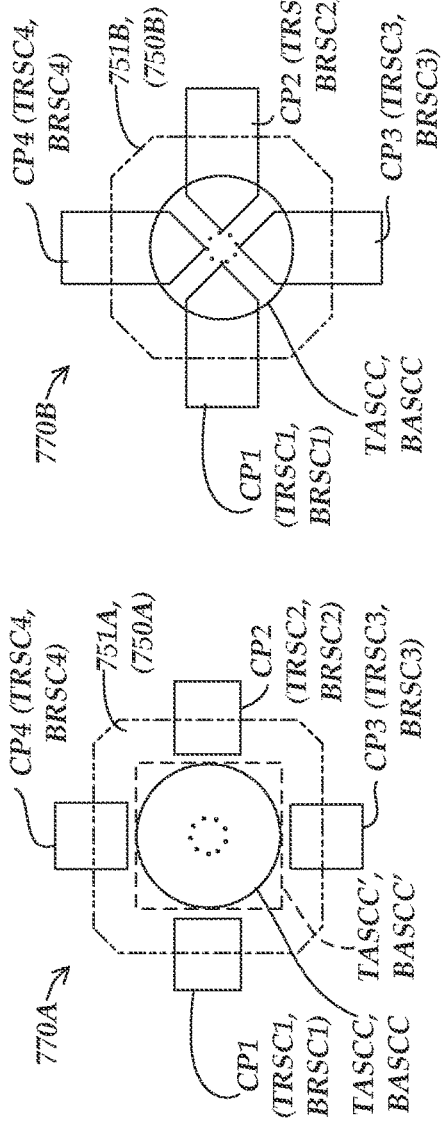
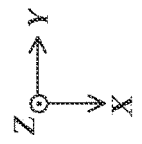
FIG. 7A  FIG. 7B  FIG. 7C  FIG. 7D  FIG. 7E

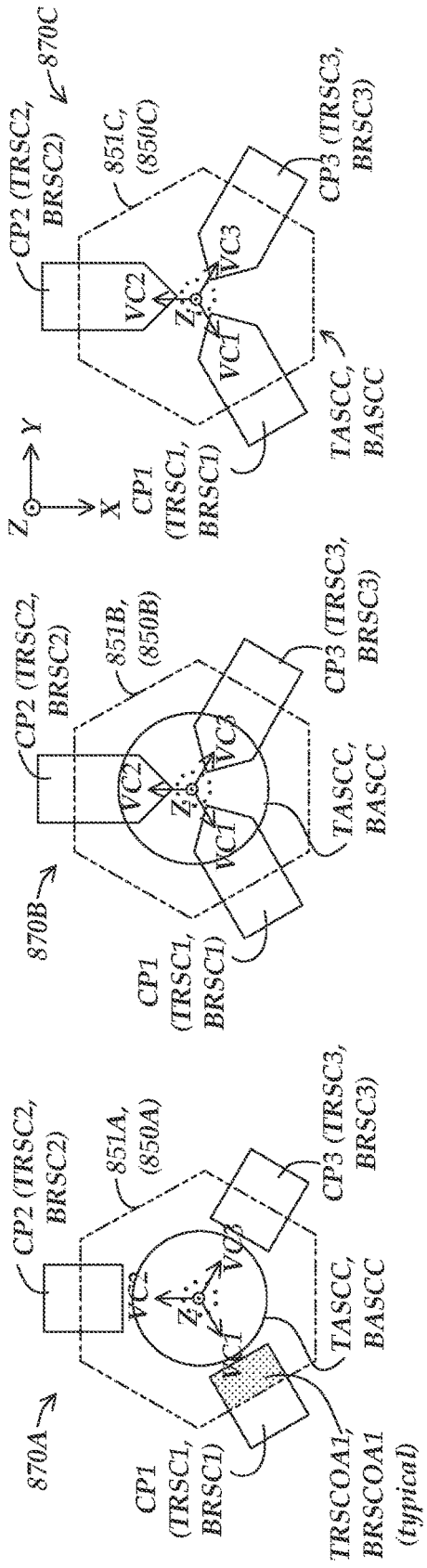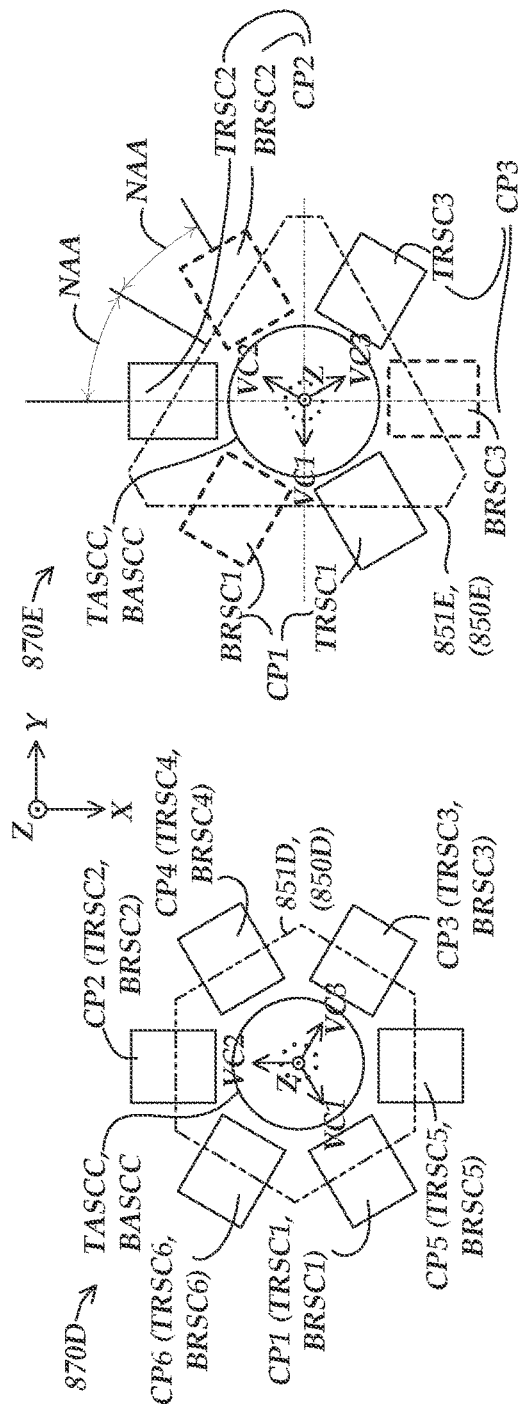

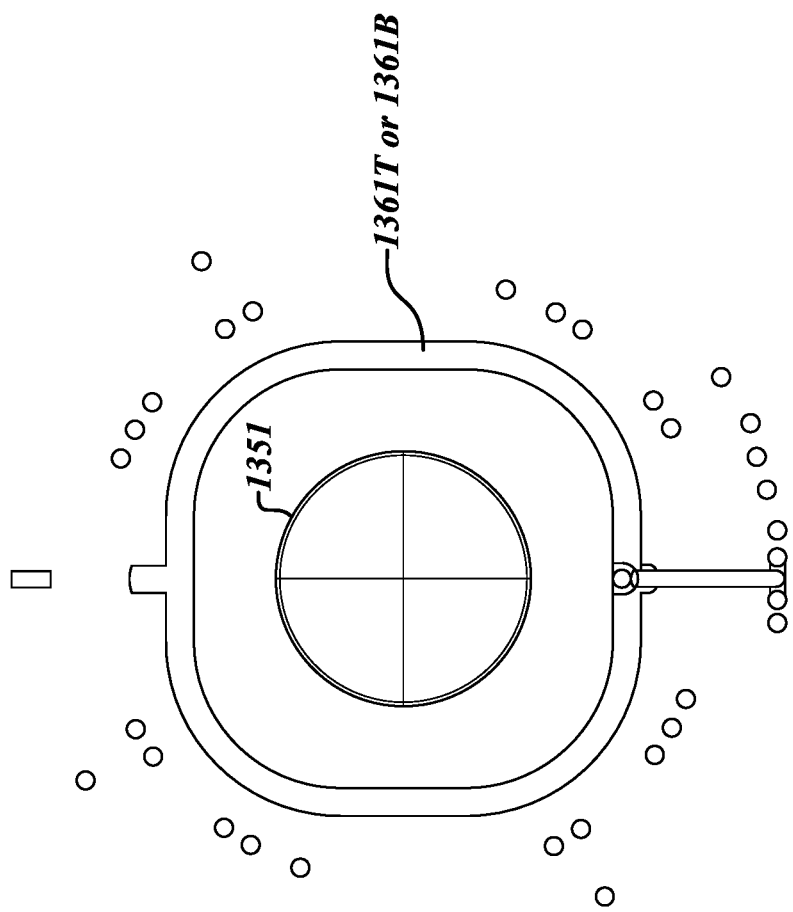

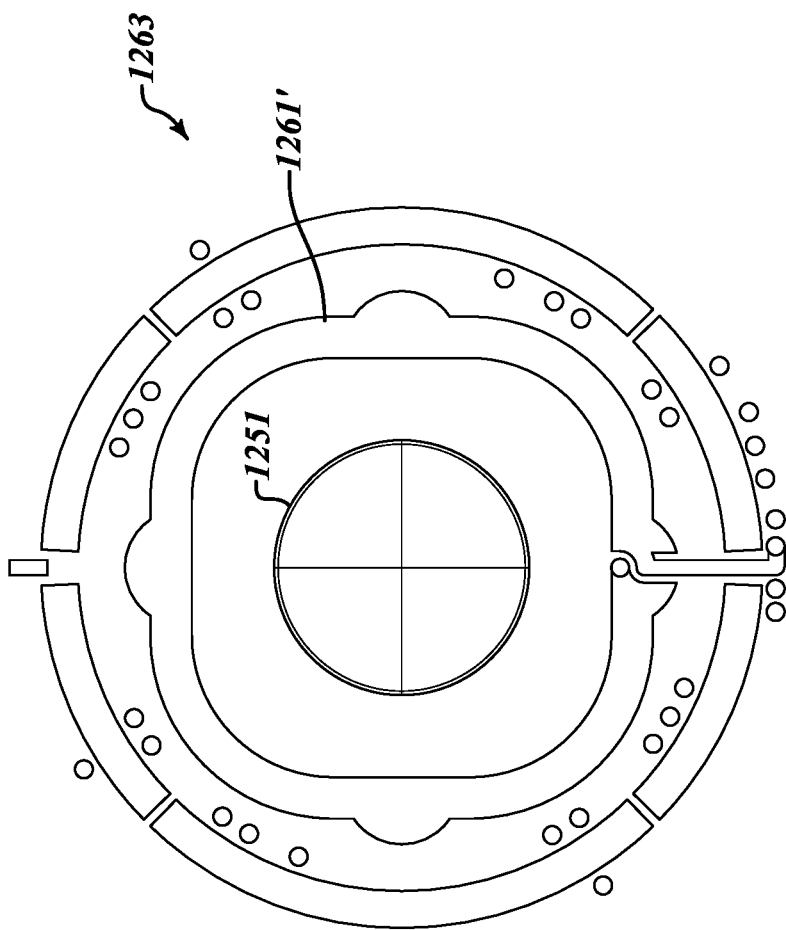

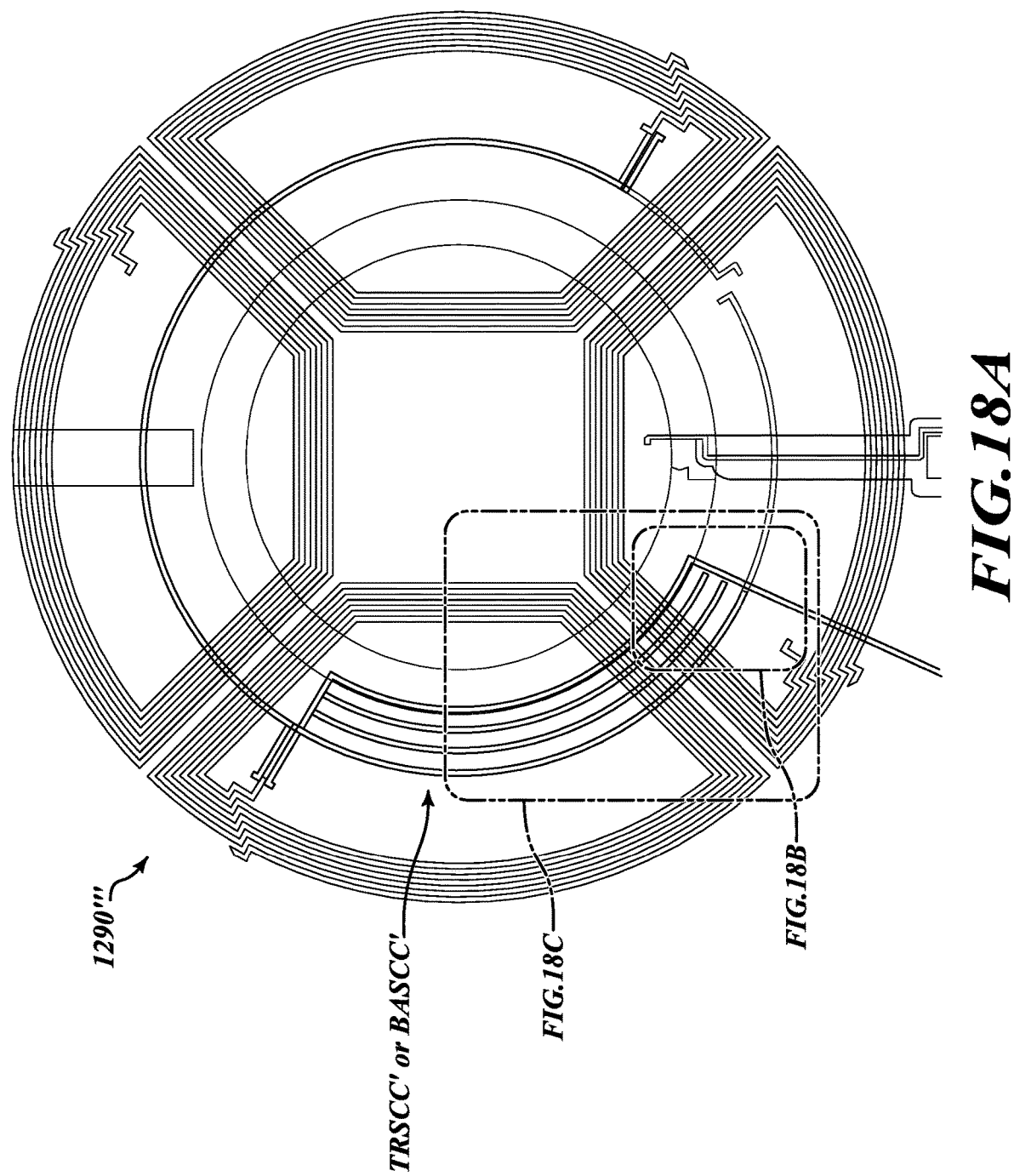

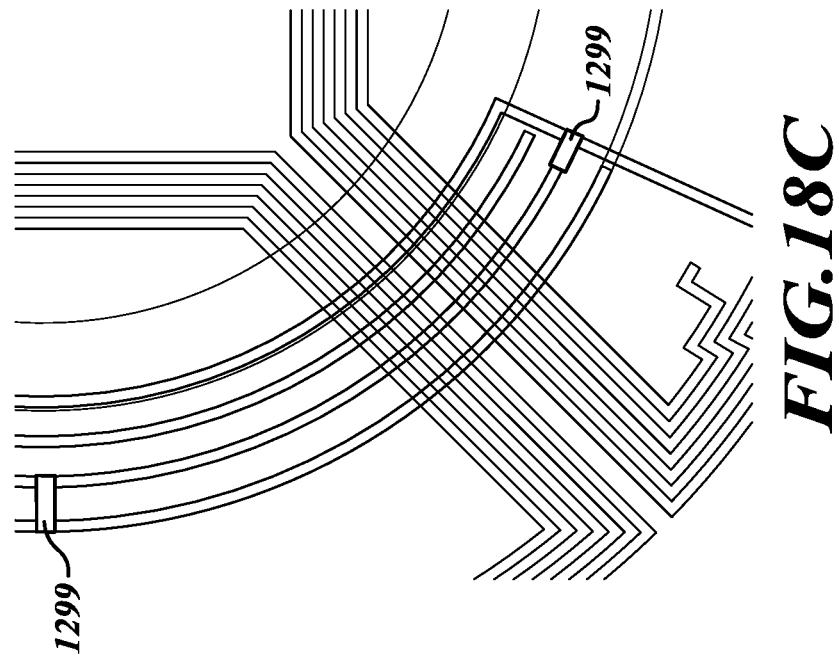
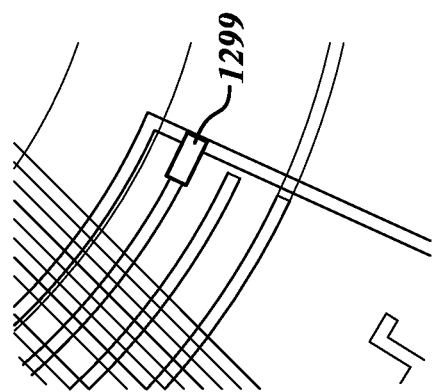

INDUCTIVE POSITION DETECTION CONFIGURATION FOR INDICATING A MEASUREMENT DEVICE STYLUS POSITION

CROSS-REFERENCE TO RELATED APPLICATION(S)

This application is a continuation-in-part of U.S. patent application Ser. No. 16/557,719, entitled "INDUCTIVE POSITION DETECTION CONFIGURATION FOR INDICATING A MEASUREMENT DEVICE STYLUS POSITION" filed on Aug. 30, 2019, now Issued U.S. Pat. No. 10,914,570, which is a continuation-in-part of U.S. patent application Ser. No. 16/178,295, entitled "INDUCTIVE POSITION DETECTION CONFIGURATION FOR INDICATING A MEASUREMENT DEVICE STYLUS POSITION" filed on Nov. 1, 2018, now Issued U.S. Pat. No. 10,866,080, the disclosure of which is hereby incorporated herein by reference in its entirety.

BACKGROUND

Technical Field

This disclosure relates to precision metrology, and more particularly to inductive type sensing configurations for use in probes used with coordinate measuring machines.

Description of the Related Art

Coordinate measurement machines (CMM's) can obtain measurements of inspected workpieces. One exemplary prior art CMM described in U.S. Pat. No. 8,438,746, which is hereby incorporated herein by reference in its entirety, includes a probe for measuring a workpiece, a movement mechanism for moving the probe, and a controller for controlling the movement. A CMM including a surface scanning probe is described in U.S. Pat. No. 7,652,275, which is hereby incorporated herein by reference in its entirety. As disclosed therein, a mechanical contact probe or an optical probe may scan across the workpiece surface.

A CMM employing a mechanical contact probe is also described in U.S. Pat. No. 6,971,183, which is hereby incorporated herein by reference in its entirety. The probe disclosed therein includes a stylus having a surface contact portion, an axial motion mechanism, and a rotary motion mechanism. The axial motion mechanism includes a moving member that allows the contact portion to move in a central axis direction (also referred to as a Z direction or an axial direction) of the measuring probe. The rotary motion mechanism includes a rotating member that allows the contact portion to move perpendicular to the Z direction. The axial motion mechanism is nested inside the rotary motion mechanism. The contact portion location and/or workpiece surface coordinates are determined based on the displacement of the rotating member and the axial displacement of the axial motion moving member.

Inductive sensing technologies are known to be environmentally robust, and have various desirable sensing properties. It is known to use precision LVDT's or the like to measure displacements or positions of various internal elements in mechanical contact probes similar to those referred to above. However, LVDT's and other known inductive type sensors that are sufficiently accurate for use in CMM probes may be rather large or awkward to incorporate, and the associated motion mechanisms and/or displacement detector arrangements may be relatively expensive and/or susceptible to various "cross coupling" errors (e.g., due to the general configuration and/or mechanism and/or detector imperfections, etc.). U.S. Pat. No. 4,810,966, (the '966 patent) which is hereby incorporated herein by reference in its entirety, discloses an inductive sensor configuration that is relatively planar and relatively economical, and which can detect the three-dimensional position of a nearby conductive target. However, the configurations disclosed in the '966 patent have several design deficiencies relative to providing the accuracy and/or form factors necessary for successful adaptation for use in a CMM scanning probe. In short, the configurations of the '966 patent lack the sophistication and features necessary for providing reasonable levels of accuracy in modern metrology instruments such as a CMM probe. Other issues associated with the use of known inductive sensing systems such as those outlined above in a CMM probe may include signal/response non-linearities that are inherent in the displacement response of the system, position errors resulting from less than perfect assembly and alignment, and signal drift due to environmental effects on mechanical and electrical components (e.g., due to temperature changes, etc.). A need exists for an improved inductive sensing configuration for use in a CMM probe (e.g., wherein the displacement detector configurations may be less susceptible to errors such as those noted above, and/or may be relatively less expensive, etc.).

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A scanning probe responsive in 3 axes is provided for use in a measuring machine (e.g., a CMM). The scanning probe includes a stylus suspension portion, a stylus position detection portion, and signal processing and control circuitry.

The stylus suspension portion is attached to a frame of the scanning probe, and includes a stylus coupling portion that is configured to be rigidly coupled to a stylus, and a stylus motion mechanism that is configured to enable axial motion of the stylus coupling portion along an axial direction, and rotary motion of the stylus coupling portion about a rotation center.

The stylus position detection portion is arranged along a central axis that is parallel to the axial direction and nominally aligned with the rotational center, and is based on inductive sensing principles. The stylus position detection portion includes a coil board configuration and a disruptor configuration. The coil board configuration comprises a field generating coil configuration that surrounds a hole in the coil board configuration, a top axial sensing coil configuration (TASCC), a bottom axial sensing coil configuration (BASCC), N top rotary sensing coils (TRSC), and N bottom rotary sensing coils (BRSC), where N is an integer greater than 3.

The disruptor configuration comprises a cylindrical disruptor element that is configured to move and fit within the hole of the coil board configuration. The cylindrical disruptor element comprises a conductive cylinder that provides a disruptor area and is located along the central axis in a disruptor motion volume. The cylindrical disruptor element is coupled to the stylus suspension portion by a coupling configuration, and moves in the disruptor motion volume relative to an undeflected position in response to a deflection of the stylus suspension portion. The cylindrical disruptor element may be described as moving over operating motion ranges +/−Rz along the axial direction in response to the axial motion, and over respective operating motion ranges +/−Rx and +/−Ry along orthogonal X and Y directions that are orthogonal to the axial direction in response to the rotary motion. The field generating coil configuration generates a changing magnetic flux generally along the axial direction in the disruptor motion volume in response to a coil drive signal.

The signal processing and control circuitry is operably connected to the coils of the stylus position detection portion to provide the coil drive signal, and is configured to input signals from the receiver coil portion comprising respective signal components provided by the respective rotary and axial sensing coils located on the top and bottom coil substrates. It is further configured to output signals indicative of the axial position and the rotary position of the cylindrical disruptor element or the stylus relative to the frame or housing of the scanning probe.

Such a configuration, according to the principles disclosed herein, may provide signal components that are particularly advantageous with regard to eliminating or allowing correction of certain signal errors and/or signal cross coupling errors that have limited the accuracy of position determination in known economical three-dimensional position indicators based on inductive sensing.

In some implementations, the field generating coil configuration may comprise first and second field generating coil configurations that each surround the hole in the coil board configuration and correspondingly surround the disruptor motion volume. In some such implementations, the first and second field generating coil configurations may comprise a pair of planar field generating coils that are located approximately equidistant from a midplane of the disruptor motion volume along the central axis, and that are nominally planar and orthogonal to the central axis. In some such implementations, the top and bottom axial sensing coil configurations also surround the hole in the coil board configuration and correspondingly surround the disruptor motion volume.

In some such implementations, the coil board configuration has top and bottom portions. The top portion includes first, second and third layers which include the top axial sensing coil configuration, the first field generating coil configuration and the N top rotary sensing coils, respectively. The bottom portion mirrors the top portion and correspondingly has first, second and third layers which include the bottom axial sensing coil configuration, the second field generating coil configuration, and the N bottom rotary sensing coils, respectively. The coil board configuration is mounted in the fixed relationship to the frame of the scanning probe with the bottom portion of the coil board configuration closer to the stylus suspension portion. The top and bottom portions of the coil board configuration are nominally parallel to one another and nominally orthogonal to the central axis. The coil board configuration may comprise a normalization coil configuration having a top normalization coil as part of the top portion and a bottom normalization coil as part of the bottom portion. The normalization coil configuration may be utilized to provide a measurement of the changing magnetic flux that is generated by the first and second field generating coil configurations. The top and bottom portions may be part of a single multilayer printed circuit board.

In some implementations, a method comprises moving a scanning probe as disclosed herein along a surface of a workpiece and generating three-dimensional position information based on inductive sensing signals generated by the scanning probe as the scanning probe is moved along the surface of the workpiece.

In some implementations, a system comprises a scanning probe as disclosed herein, a drive mechanism and an attachment portion configured to couple the drive mechanism to the scanning probe. In some implementations, the system comprises a motion controller which controls movements of the drive mechanism.

Previously known inductive sensors utilizing nominally planar sensing elements have been far too inaccurate for application in precision scanning probes. In contrast, inductive sensors utilizing nominally planar sensing elements configured according to the various principles disclosed and claimed herein provide a robust set of signals and may be used to provide sufficient accuracy for application in precision scanning probes. In particular, implementations and/or configurations such as those outlined above may provide signal components that are particularly advantageous with regard to eliminating or allowing correction of certain signal errors and/or signal cross coupling errors that have previously limited the accuracy of position determination in known economical three-dimensional position indicators based on inductive sensing. In various implementations according to the various principles disclosed and claimed herein, the signal components that are provided by the various receiver coils are particularly advantageous in that they may be processed using relatively fast and simple signal processing in order to provide robust and highly accurate three-dimensional position indications.

BRIEF DESCRIPTION OF THE DRAWINGS

FIGS. 7A-7E are diagrams representing respective "4 complementary pair" implementations of patterns of receiver coil portions and disruptor element configurations according to principles disclosed herein, usable in various implementations of the stylus position detection portions shown in FIGS. 3 and/or 4;

FIGS. 8A-8F are diagrams representing respective "3 (or 6) complementary pair" implementations or patterns of receiver coil portions and disruptor element configurations according to principles disclosed herein, usable in various implementations of the stylus position detection portions shown in FIGS. 3 and/or 4;

FIGS. 13B to 13F are diagrams showing portions of an exemplary implementation of a stylus position detection portion, emphasizing certain aspects according to principles disclosed herein;

FIGS. 15A to 15C are diagrams showing portions of an exemplary implementation of a stylus position detection portion, emphasizing certain aspects according to principles disclosed herein;

FIGS. 18A to 18C are diagrams showing portions of an exemplary implementation of a stylus position detection portion, emphasizing certain aspects according to principles disclosed herein.

DETAILED DESCRIPTION

Figure 1:
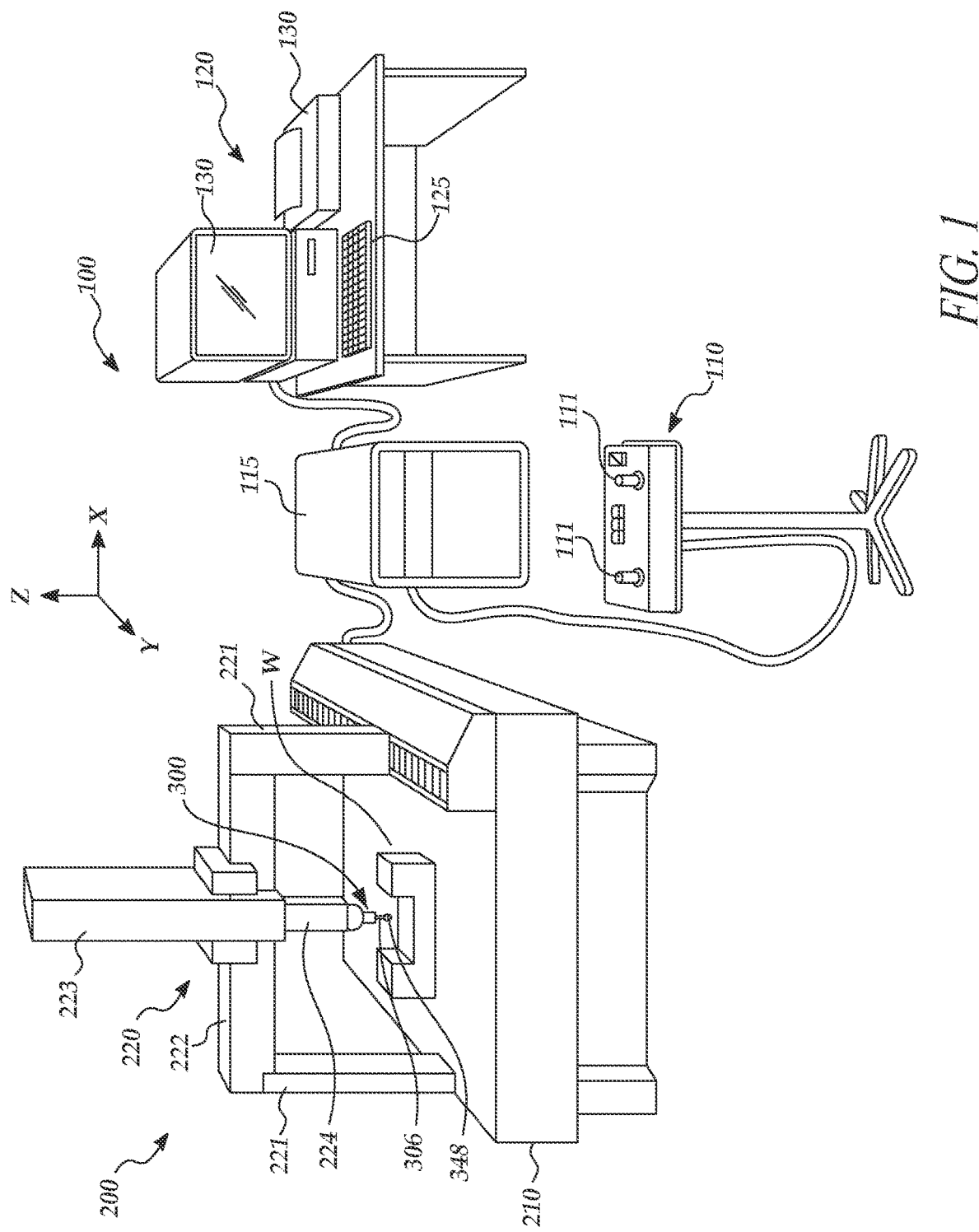
FIG. 1 is a diagram showing various typical components of a measuring system including a CMM utilizing a scanning probe such as that disclosed herein.

FIG. 1 is a diagram showing various typical components of a measuring system 100 including a CMM 200 utilizing a scanning probe 300 such as that disclosed herein. The measuring system 100 includes an operating unit 110, a motion controller 115 that controls movements of the CMM 200, a host computer 120 and the CMM 200. The operating unit 110 is coupled to the motion controller 115 and may include joysticks 111 for manually operating the CMM 200. The host computer 120 is coupled to the motion controller 115 and operates the CMM 200 and processes measurement data for a workpiece W. The host computer 120 includes input means 125 (e.g., a keyboard, etc.) for inputting, for example, measurement conditions, and output means 130 (e.g., a display, printer, etc.) for outputting, for example, measurement results.

The CMM 200 includes a drive mechanism 220 which is located on a surface plate 210, and an attachment portion 224 for attaching the scanning probe 300 to the drive mechanism 220. The drive mechanism 220 includes X axis, Y axis, and Z axis slide mechanisms 222, 221, and 223, respectively, for moving the scanning probe 300 three-dimensionally. A stylus 306 attached to the end of the scanning probe 300 includes a contact portion 348. As will be described in more detail below, the stylus 306 is attached to a stylus suspension portion of the scanning probe 300, which allows the contact portion 348 to freely change its position in three directions when the contact portion 348 moves along a measurement path on the surface of the workpiece W.

Figure 2:
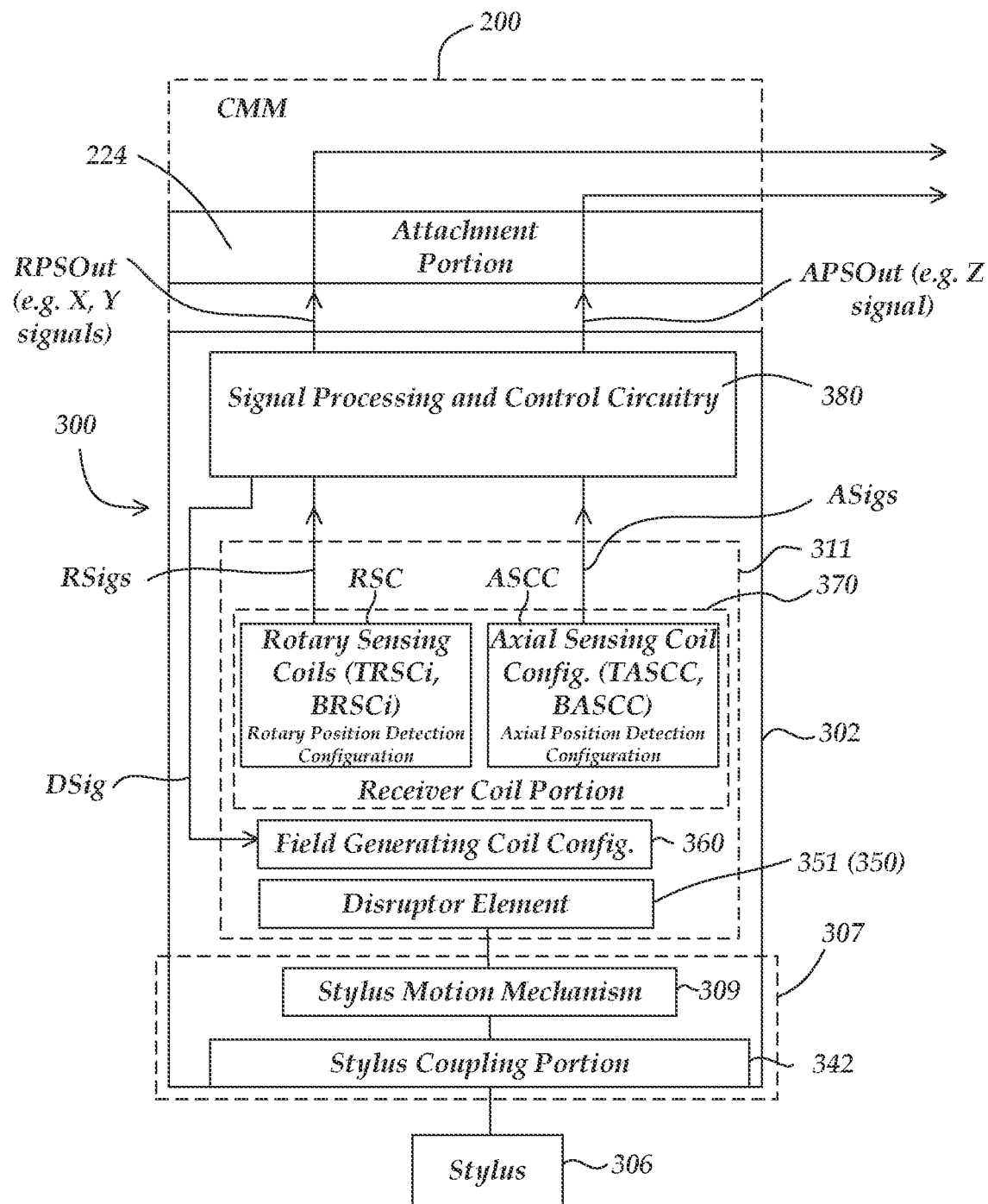
FIG. 2 is a block diagram showing various elements of a scanning probe as coupled to a CMM and providing rotary and axial position signals.

FIG. 2 is a block diagram showing various elements of a scanning probe 300 as coupled to a CMM 200 and providing rotary (e.g., X, Y) and axial (e.g., Z) position signals. The scanning probe 300 includes a probe main body 302 (e.g., comprising a frame) which incorporates a stylus suspension portion 307 and a stylus position detection portion 311. The stylus suspension portion 307 includes a stylus coupling portion 342 and a stylus motion mechanism 309. The stylus coupling portion 342 is rigidly coupled to a stylus 306. The stylus motion mechanism 309 is configured to enable axial motion of the stylus coupling portion 342 and attached stylus 306 along an axial direction, and to enable rotary motion of the stylus coupling portion 342 and attached stylus 306 about a rotation center, as will be described in more detail below with respect to FIGS. 3 and 4. Signal processing and control circuitry 380 included in the scanning probe 300 is connected to and governs the operation of the stylus position detection portion 311, and may perform related signal processing, all as described in greater detail below.

As shown in FIG. 2, the stylus position detection portion 311 uses inductive sensing principles and includes a receiver coil portion 370, a field generating coil configuration 360, and a disruptor element 351 (which may be part of a disruptor configuration 350, which may include a plurality of parts in some implementations). The receiver coil portion 370 may comprise a rotary sensing coil portion (also referred to as rotary sensing coils) RSC and an axial sensing coil configuration ASCC. Briefly, the moving disruptor element 351 (or more generally, the disruptor configuration 350) causes position-dependent variations in a changing magnetic field generated by the field generating coil configuration 360. The receiver coil portion 370 is responsive to the changing magnetic field and the variations therein caused by the disruptor element 351. In particular, the rotary sensing coil portion RSC outputs at least first and second rotary signal components RSigs that are indicative of the rotary position (e.g., X and Y position signals) of the stylus coupling portion 342 over corresponding signal lines, and the axial sensing coil configuration ASCC outputs one or more axial signal components ASigs that is indicative of the axial position (e.g., a Z position signal) of the stylus coupling portion 342 over corresponding signal lines, as described in greater detail below with reference to FIGS. 3, 5 and 6, for example. In various implementations, the signal processing and control circuitry 380 receives the rotary signal components RSigs and the axial signal components ASigs, and may perform various levels of related signal processing in various implementations. For example, in one implementation, the signal processing and control circuitry 380 may cause the signal components from various receiver coils to be combined and/or processed in various relationships, and provide the results in a desired output format as the rotary and axial position signal outputs RPSOut and APSOut, through the attachment portion 224. One or more receiving portions (e.g., in the CMM 200, motion controller 115, host computer 120, etc.) may receive the rotary and axial position signal outputs RPSOut and APSOut, and one or more associated processing and control portions may be utilized to determine a three-dimensional position of the stylus coupling portion 342 and/or of the contact portion of the attached stylus 306 as its contact portion 348 moves along a surface of a workpiece W that is being measured.

Figure 3:
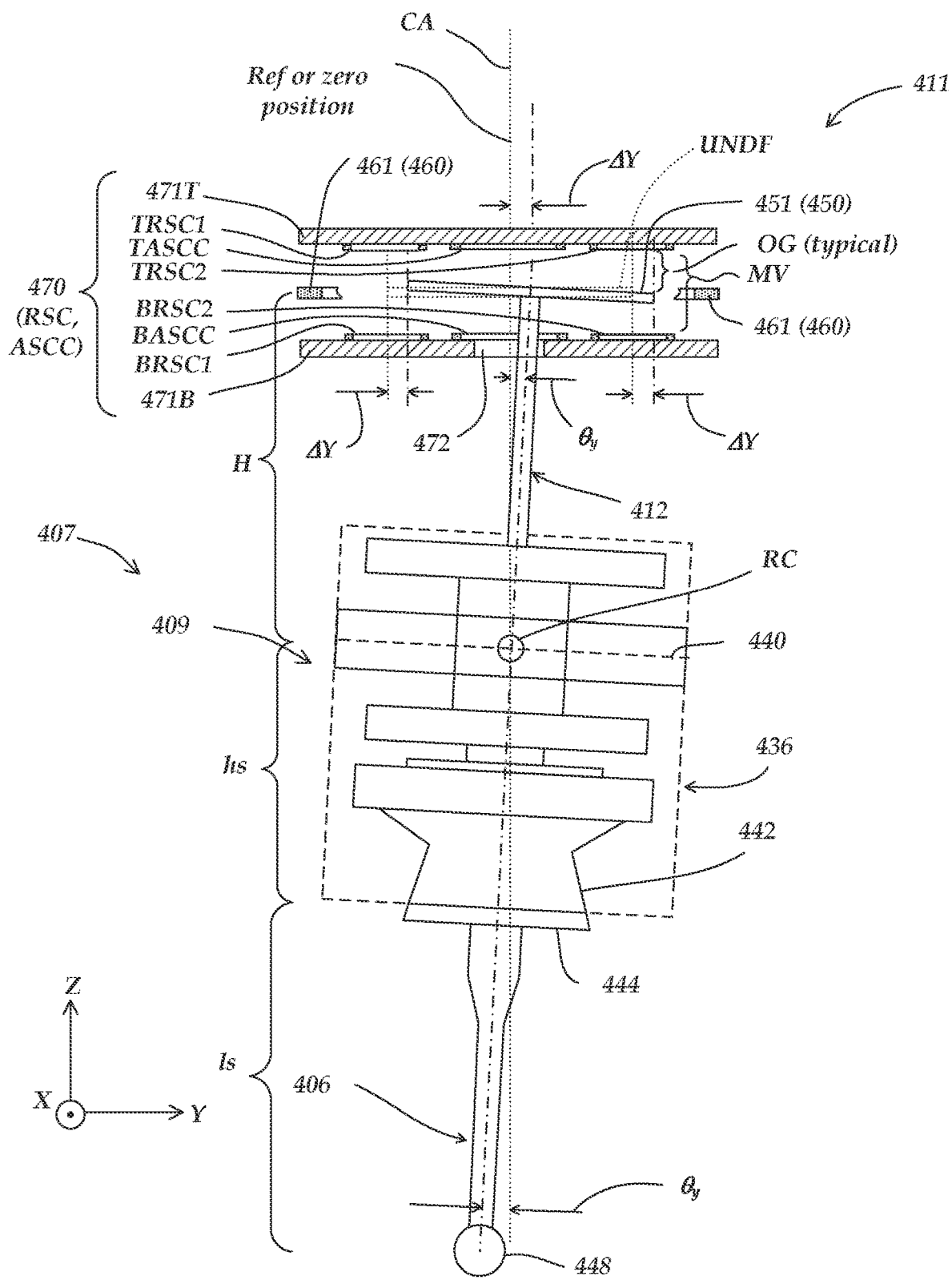
FIG. 3 is a diagram showing portions of a first exemplary implementation of a stylus suspension portion as coupled to a stylus and a first exemplary implementation of a stylus position detection portion for detecting the position of the stylus suspension portion.

FIG. 3 is partially schematic diagram showing portions of a first exemplary implementation of a schematically represented stylus suspension portion 407 as coupled to a stylus 406, along with a partially schematic cross-section of a first exemplary implementation of a stylus position detection portion 411 for detecting the position of the stylus suspension portion 407 and/or the stylus 406. It will be appreciated that certain numbered components 4XX of FIG. 3 may correspond to and/or have similar operations as similarly numbered counterpart components 3XX of FIG. 2, and may be understood by analogy thereto and as otherwise described below. This numbering scheme to indicate elements having analogous design and/or function is also applied to the following FIGS. 4-8F. As shown in FIG. 3, the stylus suspension portion 407 includes a stylus motion mechanism 409 and a stylus coupling portion 442. The stylus coupling portion 442 is configured to be rigidly coupled to a stylus 406 which has a contact portion 448 for contacting a surface S of a workpiece W (not shown).

As will be described in more detail below with respect to FIG. 4, the stylus motion mechanism 409 is attached to a frame of the scanning probe, and is configured to enable axial and rotary motion of the stylus coupling portion 442 and attached stylus 406 so that the contact portion 448 can change its position in three directions along the shape of the surface S. For purposes of illustration, the vertical and horizontal directions on the plane of paper in FIG. 3 are defined as Z and Y directions, respectively, and the perpendicular direction to the plane of the paper is defined as the X direction. The direction of a central axis CA, also referred to as the axial direction, of the measuring probe 300 coincides with the Z direction in this illustration.

In FIG. 3, rotary motion portions of the stylus motion mechanism 409 are represented, including a rotating member 436, a flexure element 440, and a moving member 412 disposed within the rotating member 436. As will be described in more detail below with respect to FIG. 4, the flexure element 440 enables rotary motion of the rotating member 436 about a rotation center RC. As will be described in more detail below, in various implementations rotary sensing coils TRSCi and BRSCi (where i is an index integer which identifies specific coils) and stylus position detection portion 411 are able to sense the rotated position of the disruptor element 451 and thereby the rotated position of the moving member 412 (e.g., in X and Y directions), and the axial sensing coil configurations (also referred to as the axial sensing coils) TASCC and BASCC are able to sense the axial position of the disruptor element 451 and thereby the axial position of the moving member 412 (e.g., in the Z direction).

As shown in FIG. 3, a first exemplary implementation of a stylus position detection portion 411 includes a disruptor element 451 (or more generally a disruptor configuration 450) that is coupled to the moving member 412 and which moves relative to the scanning probe frame (e.g., wherein the frame is included as part of the scanning probe body, etc.), within a disruptor motion volume MV located between the top and bottom coil substrates 471T and 471B, respectively. As shown in FIG. 3, the moving member 412 extends through and moves in a hole 472 located along the central axis CA in a bottom coil substrate (471B). The attached disruptor element 451 moves in the disruptor motion volume MV relative to an undeflected position UNDF in response to a deflection of the stylus suspension portion 407 and the moving member 412.

Various other components of the stylus position detection portion 411, e.g., the receiver coil portion 470 and the field generating coil configuration 460, may be fixed relative to the frame unless otherwise indicated. In the implementation shown in FIG. 3, the field generating coil configuration 460 comprises a single planar field generating coil 461 that is located approximately at a midplane of the disruptor motion volume MV and that is nominally planar and orthogonal to the central axis CA. As previously outlined with reference to FIG. 2, the receiver coil portion 470 may generally comprise a rotary sensing coil portion (also referred to as rotary sensing coils) RSC and an axial sensing coil configuration ASCC. The rotary position detection configuration RSC generally includes top rotary sensing coils TRSCi and bottom rotary sensing coils BRSCi. In the cross section shown in FIG. 3, only two top rotary sensing coils TRSC1 and TRSC2, and two bottom rotary sensing coils BRSC1 and BRSC2, are shown. These rotary sensing coils may provide signal components indicative of the position of the disruptor element 451 along the Y direction. In particular, their signal components vary depending on an amount of displacement $\Delta Y$ of the disruptor element 451 along the Y direction, and are therefore indicative of the amount of displacement $\Delta Y$. The displacement $\Delta Y$ determines an associated amount of "overlap" between the disruptor element 451 and the various rotary sensing coils TRSCi and BRSCi, and thereby their amount of coupling to the changing magnetic field generated by the field generating coil 461 (which determines the resultant signal components). Other rotary sensing coils (not shown) may provide signal components which are indicative of the position of the disruptor element 451 along the X axis direction. The various rotary sensing coil signal components may also be undesirably sensitive to their local "operating gap" OG relative to the disruptor element 451, as represented in FIG. 3 for the top rotary sensing coil TRSC2. However, such undesirable gap sensitivity may be substantially eliminated or compensated according to various principles disclosed herein, as described further below.

The axial sensing coil configuration ASCC generally includes a top axial sensing coil configuration TASCC and a bottom axial sensing coil configuration BASCC. In the implementation shown in FIG. 3, the top axial sensing coil configuration TASCC comprises a single top axial sensing coil that at least partially surrounds the central axis CA, and the at least one bottom axial sensing coil comprises a single bottom axial sensing coil that at least partially surrounds the central axis, as shown. These axial sensing coils are always completely "overlapped" by the disruptor element 451. Therefore, their signal components are nominally only responsive to the position of the disruptor element 451 along the axial or Z direction, and are indicative of the position of the disruptor element 451 along the Z direction. The generation of various signal component is described in greater detail below with reference to FIGS. 5 and 6.

Similarly to operation previously outlined with reference to FIG. 2, in operation the moving disruptor element 451 causes position-dependent local variations in a changing magnetic field along the axial direction generated by the field generating coil 461. The receiver coil portion 470 is responsive to the changing magnetic field and the variations therein caused by the disruptor element 451, and outputs the rotary signal components RSigs and the axial signal components ASigs that may be processed to determine the rotary position of the disruptor element 451 (e.g., a Y and X position, and corresponding signals) and its axial position (e.g., a Z position), as previously outlined with reference to FIG. 2, and as described in detail further below. It will be appreciated that the position of the disruptor element 451 is related by a known geometry to the position of the stylus coupling portion 442 and/or its contact portion 448. For example, for small rotation angles, for the illustrated movement or displacement ΔY of the disruptor element 451 along the Y direction away from null (e.g., from the undeflected position UNDF):

$$\Delta Y = H\theta_Y \qquad \text{(Eq. 1)}$$

where H is the distance from the rotation center RC to the nominal plane of the disruptor element 451, and $\theta_Y$ is the rotary motion tilt of the rotating member 436 (and the moving member 412) in a plane parallel to the Y direction (i.e., that is, rotation about an axis parallel to the X axis at the rotation center RC). If a larger rotation angle is used in various implementations, an analogous expression that is accurate for larger rotation angles may be used, as is known in the art. The Y direction movement or displacement $Y_{STYLUS}$ away from null (e.g., corresponding to the undeflected position UNDF) of the contact portion 448 of the stylus 406 in relation to the rotary motion tilt component $\theta_Y$ may be approximated as:

$$\Delta Y_{STYLUS} = \theta_Y * (h_S + l_S) \qquad \text{(Eq. 2)}$$

where $h_S$ is the distance from the end of the stylus coupling portion 442 to the rotation center RC, and $l_S$ is the length of the stylus 406. Combining EQUATIONS 1 and 2, the ratio of the displacement ΔY of the disruptor element 451 in relation to the Y direction displacement at the contact portion 448 may be approximated as:

$$\Delta Y / \Delta Y_{STYLUS} = H/(h_S + l_S) \qquad \text{(Eq. 3)}$$

It will be appreciated that the X coordinate motion components are analogous to the above expressions, and will not be explained in further detail herein. The stylus length $l_S$ for various styli may be utilized in the equations (e.g., with respect to the trigonometry of the system) for determining the X-Y position of the contact portion 448 based on the X-Y detected spot position. Regarding the Z coordinate displacement or position component, a displacement ΔZ (not shown) of the disruptor element 451 along the axial or Z direction away from null (e.g., corresponding to the undeflected position UNDF), in relation to the Z direction displacement $\Delta Z_{STYLUS}$ at a stylus contact portion (e.g., the contact portion 448) may be approximated as:

$$\Delta Z / \Delta Z_{STYLUS} \approx 1 \qquad \text{(Eq. 4)}$$

Figure 4:
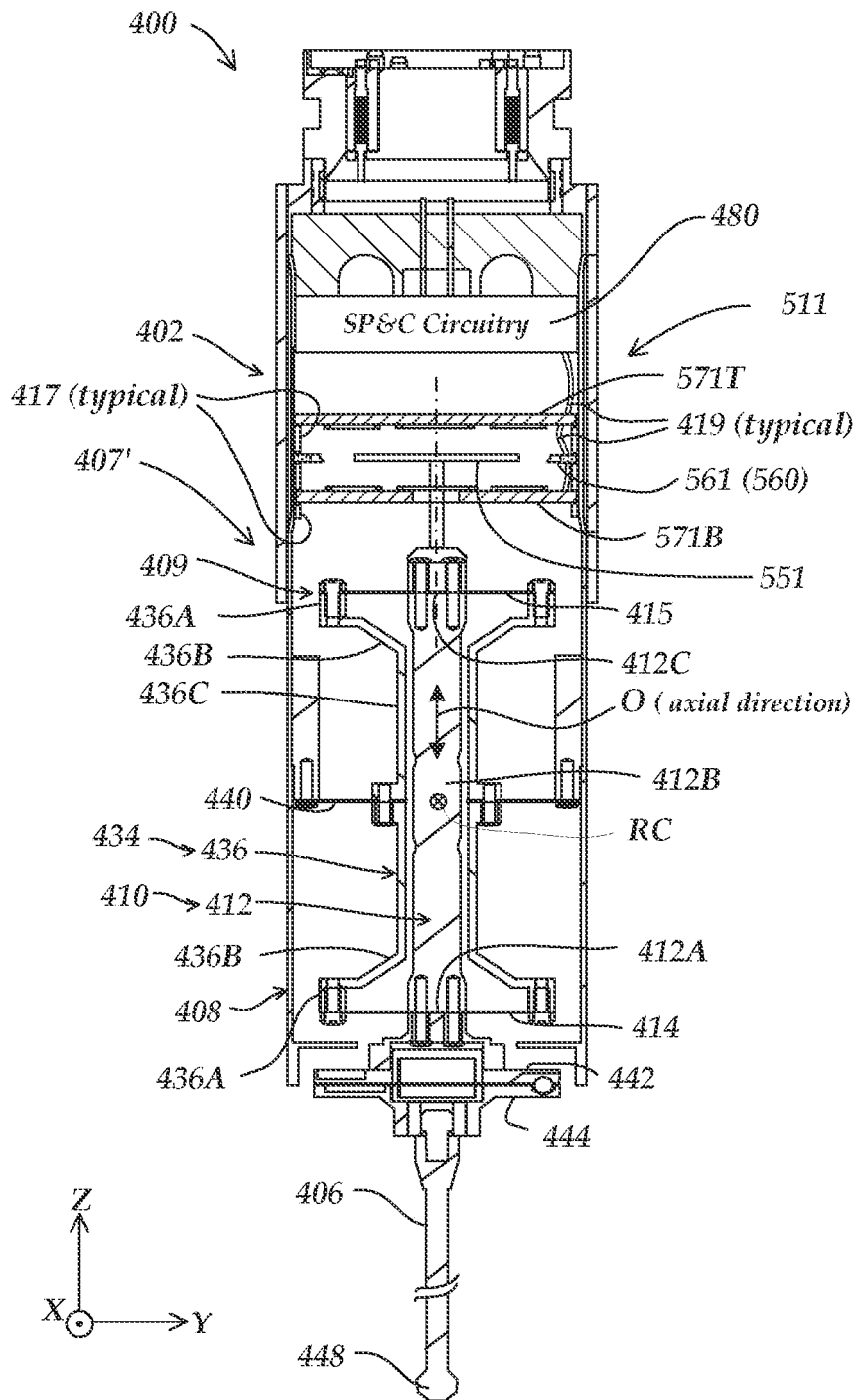
FIG. 4 is a diagram showing a cross section of one implementation of the stylus suspension portion of FIG. 3 as included within a main body frame of a scanning probe.

FIG. 4 is a partially schematic diagram showing a cross section of one implementation of a stylus suspension portion 407' usable as the stylus suspension portion 407 represented in FIG. 3, as well as one implementation of a stylus position detection portion 511 that is similar to the stylus position detection portion 411 shown in FIG. 3, and signal processing and control circuitry 480. The foregoing elements are shown as included within a frame 408 of a probe main body 402 of a scanning probe 400. The substrates 571T, 571B, and the field generating coil 561 or its substrate (e.g., printed circuit type substrates) of the stylus position detection portion 511 may be positioned for proper operation in the scanning probe 400 using alignment and mounting portions 417, or other known techniques. Various signal connections associated with the stylus position detection portion 511 may be provided by connectors (e.g., flex print and/or wire connections) 419, or the like, according to known techniques. In some implementations, some or all of the signal processing and control circuitry 480 may be provided as a separate circuit assembly as represented in FIG. 4. In other implementations, some or all of the signal processing and control circuitry 480 may be combined on the substrates of the stylus position detection portion 511, if desired.

As shown in FIG. 4, the stylus suspension portion 407' includes a stylus motion mechanism 409 and a stylus coupling portion 442 which is coupled to a stylus 406. The stylus motion mechanism 409 may include a moving member 412, a rotating member 436, a flexure element 440 coupled to the main body frame 408 for supporting and enabling rotary motion of the rotating member 436, and flexure elements 414 and 415 (i.e., referenced as first flexure elements) supporting the moving member 412 and coupling it to the rotating member 436 for enabling axial motion of the moving member 412. The scanning probe 400 includes the stylus position detection portion 511 having components and operation described in greater detail below with reference to FIG. 5, for determining the position and/or motion of the stylus motion mechanism 409 and/or the contact portion 448 of the stylus 406.

The flexure element 440 (i.e., referenced as a second flexure element) may be disposed between the respective planes of a pair of flexure elements 414 and 415 (i.e., referenced as first flexure elements) in the axial direction O. Flexure designs suitable for the flexure elements 414, 415 and 440 may be determined according to principles known in the art. For example, one possible implementation is illustrated in copending and commonly assigned U.S. patent application Ser. No. 14/973,376, entitled "Measurement Device With Multiplexed Position Signals", filed on Dec. 17, 2015, now Issued U.S. Pat. No. 9,791,262, which is hereby incorporated herein by reference in its entirety. The rotating member 436 may have a shape symmetric about the second flexure element 440 and may integrally include: two ring portions 436A; two connecting portions 436B; and a cylindrical portion 436C. Peripheral portions of the first flexure elements 414 and 415 are fixed to the ring portions 436A. The connecting portions 436B extend inside of the ring portions 436A so as to connect to the cylindrical portion 436C, which has a hollow center. The first flexure elements 414 and 415 may be disposed at a symmetric distance with respect to the second flexure element 440, although such an implementation is exemplary only and not limiting.

An axial motion mechanism 410 including the moving member 412 is supported inside of the rotating member 436, and the rotating member 436 and the axial motion mechanism 410 together constitute a motion module that is part of the stylus motion mechanism 409. The axial motion mechanism 410 allows the contact portion 448 to move in the axial direction O. The rotary motion mechanism 434 including the rotating member 436 allows the contact portion 448 of the stylus 406 to move transverse (e.g., approximately perpendicular) to the axial direction O by means of rotary motion about the rotation center RC.

The moving member 412 integrally includes: a lower portion 412A; a rod portion 412B; and an upper portion 412C. As previously outlined with reference to FIG. 3, and described in more detail below with respect to the stylus position detection portion 511 shown in FIG. 5, the disruptor element 551 that is attached to the upper portion 412C of the moving member 412 functions as both a rotary and axial position indicating element. The rod portion 412B is disposed between the pair of first flexure elements 414 and 415. The rod portion 412B is housed in the rotating member 436. The lower portion 412A is formed below the rod portion 412B and a stylus coupling portion 442 (e.g., a flange member) is attached to the lower portion 412A. A flange part 444 is provided for attachment of the stylus 406. The flange part 444 and the stylus coupling portion 442 together may constitute a detachable coupling mechanism (e.g., a known type of kinematic joint or coupling) which allows attachment and detachment between various styli 406 and the stylus coupling portion 442 with repeatable positioning (e.g., in the case of a collision knocking off a stylus, or when intentionally changing styli).

Figure 5:
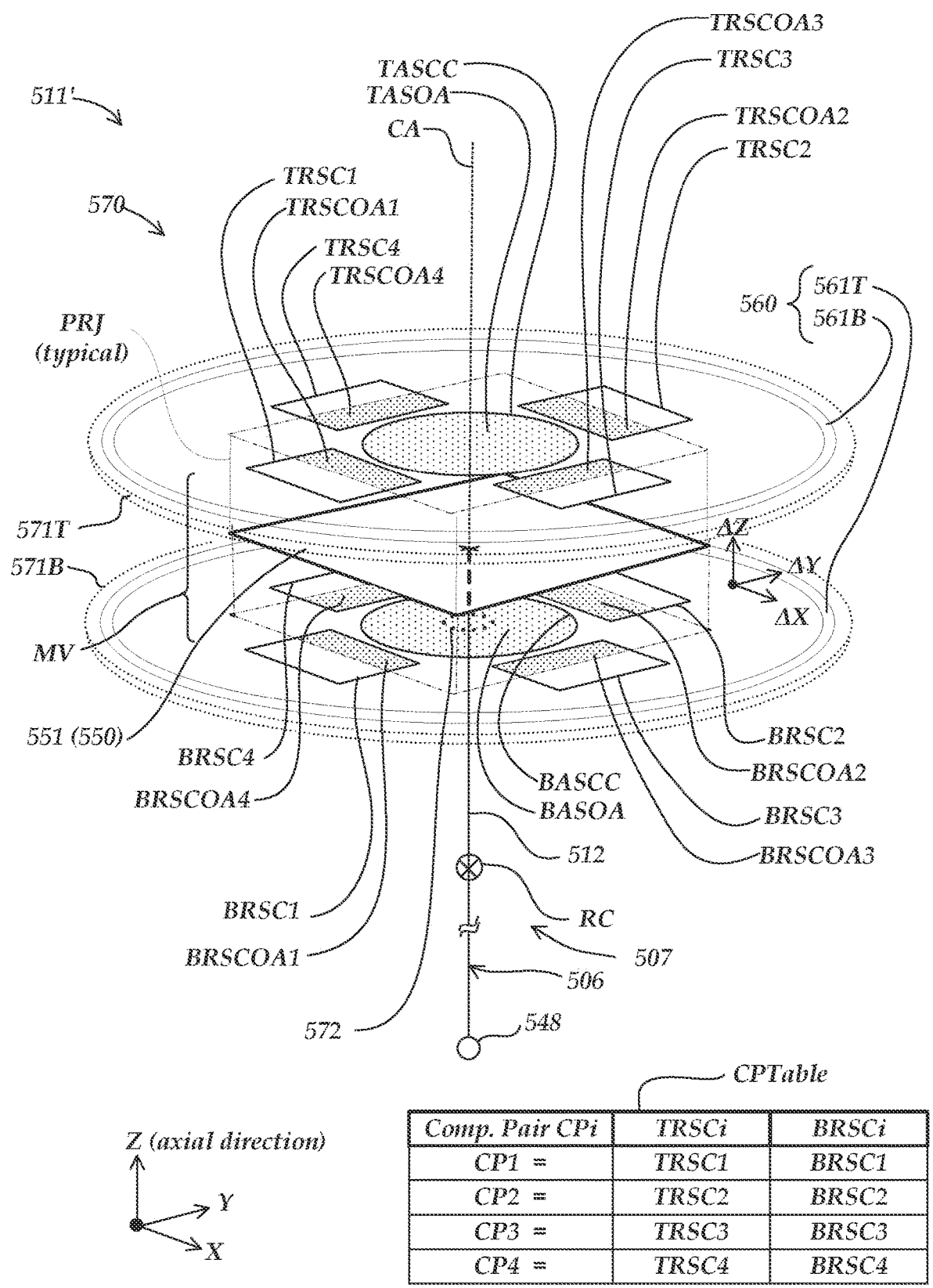
FIG. 5 is a partially schematic isometric diagram of an alternative implementation of the stylus position detection portion shown in FIGS. 3 and 4, emphasizing certain aspects according to principles disclosed herein.

FIG. 5 is a partially schematic isometric diagram of an alternative implementation of a stylus position detection portion 511' that is similar to a stylus position detection portion 511 shown in FIG. 4, emphasizing certain aspects according to principles disclosed herein. The stylus position detection portions 511' and 511 are similar except for a difference in the field generating coil configuration 560, as explained further below. In general, the stylus position detection portion 511' includes certain components that are similar to those of the stylus position detection portions 311, 411 and 511 of FIGS. 2, 3 and 4, and will be understood to operate similarly except as otherwise described below.

In the implementation shown in FIG. 5, the stylus position detection portion 511' comprises the receiver coil portion 570, the disruptor configuration 550 comprising the disruptor element 551, and the field generating coil configuration 560.

In various implementations, disruptor element 551 (or more generally the disruptor configuration 550) may comprise a conductive plate or conductive loop, or parallel conductive plates or conductive loops (e.g., as fabricated on two sides of a printed circuit substrate, patterned by printed circuit board fabrication techniques), or any other desired operational configuration that provides a disruptor area (e.g., its interior area). The disruptor element 551 is located along the central axis CA in the disruptor motion volume MV between the top and bottom coil substrates 571T and 571B and is coupled to the stylus suspension portion 507 by a coupling configuration (e.g., comprising the moving member 512). For purposes of explanation, we may describe the disruptor element 551 as moving relative to the undeflected position illustrated in FIG. 5 (see the undeflected position UNDF, in FIG. 3) in response to a deflection of the stylus suspension portion 507 and/or the stylus 506 and/or the moving member 512. The disruptor element may be described as moving with displacement increments $\Delta Z$ over an operating motion range $+/-Rz$ along the axial direction in response to axial motion, and with displacement increments $\Delta X$ and $\Delta Y$ over respective operating motion ranges $+/-Rx$ and $+/-Ry$ along orthogonal X and Y directions that are orthogonal to the axial direction (Z direction) in response to rotary motion. The specified or expected operating motion ranges are described in greater detail below.

The receiver coil portion 570 may comprise the planar top coil substrate 571T including N top rotary sensing coils TRSC (e.g., TRSC1-TRSC4, where N=4) and a top axial sensing coil configuration TASCC (e.g., comprising the single illustrated individual coil in this implementation), and a planar bottom coil substrate 571B including N bottom rotary sensing coils BRSC (e.g., BRSC1-BRSC4, where N=4) and a bottom axial sensing coil configuration BASCC (e.g., comprising the single illustrated individual coil in this implementation). The top and bottom coil substrates 571T and 571B are mounted in a fixed relationship to the frame of the scanning probe with the bottom coil substrate closer to the stylus 506 and/or the stylus suspension portion 507. The top and bottom coil substrates 571T and 571B may be nominally parallel to one another and nominally orthogonal to the central axis CA, and are spaced apart along the central axis CA with the disruptor motion volume MV located therebetween. It should be appreciated that although the various sensing coils shown in FIG. 5 are represented by "closed loops" for simplicity of illustration, all coils comprise windings or conductors that have first and second connection ends (e.g., as representing in FIG. 6) that are configured to operate as one or more inductively coupled "turns".

Figure 6:
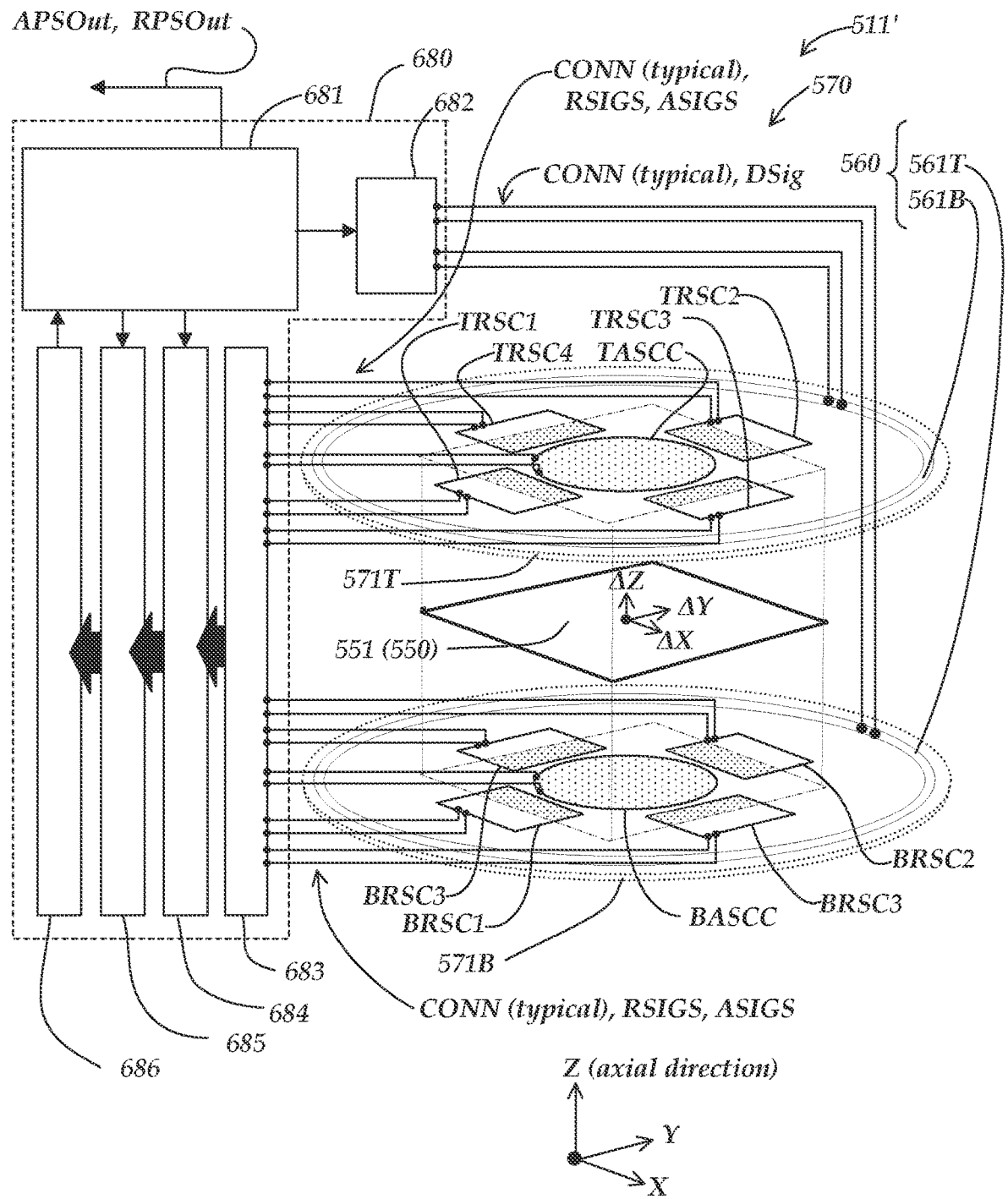
FIG. 6 is a partially schematic isometric diagram of certain elements of the stylus position detection portion shown in FIG. 5, including schematically represented connections to a block diagram of one exemplary implementation of processing and control circuitry according to principles disclosed herein.

The field generating coil configuration (e.g., the field generating coil configuration 560) generally comprises at least a first field generating coil that is located proximate to the disruptor motion volume MV and that is nominally planar and orthogonal to the central axis CA. In contrast to the single planar field generating coil 461 in the implementation shown in FIG. 3 (which is located approximately at a midplane of the disruptor motion volume MV), in the implementation shown in FIG. 5, the field generating coil configuration 560 comprise a pair of planar field generating coils 561T and 561B (located on the top and bottom coil substrates 571T and 571B, respectively) that are approximately equidistant from a midplane of the disruptor motion volume MV along the central axis CA, and that are nominally planar and orthogonal to the central axis CA. Generally speaking, either of the field generating coil configurations 460 or 560 may be used with the receiver coil portion 570 (or other receiver coil portions disclosed herein) provided that the field generating coil configuration comprises at least a first field generating coil that is configured such that a projection of its coil area along the axial direction (Z direction) encompasses the conductive plate or loop that provides the disruptor area of the disruptor configuration 560 (e.g., of the disruptor element 551) and a coil area of all the rotary and axial sensing coils RSCi and ASCC located on the top and bottom coil substrates 571T and 571B. In such a case, the field generating coil configuration is configured to generate a changing magnetic flux generally along the axial direction in the disruptor motion volume MV in response to a coil drive signal, as desired for operation of the stylus position detection portion 511'. It should be appreciated that, although the various field generating coils shown in FIG. 5 are represented by a single "closed loop" comprising a wide flat conductive trace (the edges of which are shown) for simplicity of illustration, in an actual device all coils comprise windings or conductors that have first and second connection ends (e.g., as represented in FIG. 6), and are configured to operate as one or more field generating "turns".

As illustrated in FIG. 5, a projection of the disruptor element 551 along the axial direction (e.g., as shown by fine dashed lines PRJ in FIG. 5) through an interior coil area of the top axial sensing coil configuration TASCC defines a top axial sensing overlap area TASOA (indicated by a dot pattern filling that interior coil area), and a projection of the disruptor element 551 along the axial direction through an interior coil area of the bottom axial sensing coil configuration BASCC defines a bottom axial sensing overlap area BASOA (indicated by a dot pattern filling that interior coil area). Similarly, a projection of the disruptor element 551 along the axial direction through an interior coil area of any respective top rotary sensing coil TRSCi (e.g., TRSC1-TRSC4) defines a respective top rotary coil sensing overlap area TRSCOAi (e.g., TRSCOA1-TRSCOA4), as indicated by a dot pattern filling the various respective overlap areas shown in FIG. 5, where i is an individual coil identification index in the range 1 to N. A projection of the disruptor element 551 along the axial direction through an interior coil area of any respective bottom rotary sensing coil BRSCi (e.g., BRSC1-BRSC4) defines a respective bottom rotary coil sensing overlap area BRSCOAi (e.g., TRSCOA1-TRSCOA4), as indicated by a dot pattern filling the various respective overlap areas shown in FIG. 5.

Regarding axial position detection in a stylus position detection portion (e.g., 511'), according to principles described and claimed herein, the receiver coil portion (e.g., 570) and the disruptor element (e.g., 551) are generally configured to provide a top axial sensing overlap area TASOA and bottom axial sensing overlap area BASOA wherein an amount of each of the overlap areas TASOA and BASOA is unchanged or independent of the position of the disruptor element 551 within operating motion ranges +/−Rz, +/−Rx, and +/−Ry. (It will be appreciated that, for a particular scanning probe, the operating motion ranges may be prescribed or specified in combination with the configuration of the probe's particular stylus position detection portion, if needed, in order to fulfill this requirement.) In this way, the signal components generated in the top and bottom axial sensing coil configurations TASCC and BASCC are nominally independent of the rotary motion (that is the position of the disruptor element 551 along the X and Y directions), and are nominally sensitive only to variations in "proximity" or gap to the disruptor element 551, which varies depending on the axial (Z) position or displacement ΔZ of the disruptor element 551. In operation, currents induced in the disruptor element 551 by the changing magnetic field of the field generating configuration 560 cause opposing magnetic fields. Generally speaking, as the disruptor element 551 moves upward along the axial (Z) direction in FIG. 5, the opposing magnetic fields couple more strongly to the top axial sensing coil configurations TASCC, reducing its signal component that arises from the changing magnetic field. Conversely, the opposing magnetic fields couple more weakly to the bottom axial sensing coil configurations BASCC, increasing its signal component that arises from the changing magnetic field. By a convention used in this disclosure, we may refer to a signal component SIGTASCC as the signal component arising from a particular top axial sensing coil configuration (or coil) TASCC, and so on.

It will be appreciated that at the undeflected position UNDF, the net signal components SIGTASCC and SIGBASCC may be approximately balanced. For small displacements ΔZ, such as those expected in operation, the net signal components SIGTASCC and SIGBASCC may vary approximately linearly, and inversely compared to one another. Certain considerations related to degree of nonlinearity of such signals are discussed further below. In one implementation, an axial displacement or position ΔZ may be indicated by, or correspond to, the signal relationship:

ΔZ=function of [(SIGBASCC−SIGTASCC)/(SIGBASCC+SIGTASCC)]   (Eq. 5)

This signal relationship is exemplary only, and not limiting. In various implementations, this signal relationship may be adjusted or compensated by additional calibration or signal processing operations, including operations that reduce the effects of geometric and/or signal cross-coupling between various displacement directions or signal components, if desired. In various implementations, the top axial sensing coil configuration may comprise at least one top axial sensing coil that is not one of the N top rotary sensing coils and that is arranged closer to the central axis than the top rotary sensing coils, and the at least one top axial sensing coil and the disruptor element are characterized in that the at least one top axial sensing coil has an interior coil area that is smaller than the disruptor element, and a projection of the disruptor element along the axial direction completely fills the interior coil area of the at least one top axial sensing coil for any position of the disruptor element within the operating motion ranges +/−Rz, +/−Rx, and +/−Ry, whereby the top axial sensing overlap area TASOA is unchanged by the position of the disruptor element. Similarly, in various such implementations, the bottom axial sensing coil configuration may comprise at least one bottom axial sensing coil that is not one of the N bottom rotary sensing coils and that is arranged closer to the central axis than the bottom rotary sensing coils, and the at least one bottom axial sensing coil and the disruptor element are characterized in that the at least one bottom axial sensing coil has an interior coil area that is smaller than the disruptor element and a projection of the disruptor element along the axial direction completely fills the interior coil area of the at least one bottom axial sensing coil for any position of the disruptor element within the operating motion ranges +/−Rz, +/−Rx, and +/−Ry, whereby the bottom axial sensing overlap area TASOA is unchanged by the position of the disruptor element. It may be seen that the particular implementation of the stylus position detection portion 511' shown in FIG. 5, wherein the top axial sensing coil configuration TASCC and the bottom axial sensing coil configuration BASCC each comprise a single sensing coil, conforms to this description. It will be appreciated that various configurations of the top and bottom axial sensing coil configurations TASCC and BASCC may be used, and the particular configurations shown in FIG. 5 are exemplary only and not limiting. Various alternative configurations are described with reference to other figures below.

Regarding rotary position detection in a stylus position detection portion (e.g., 511'), according to principles described and claimed herein, the receiver coil portion (e.g., 570) and the disruptor element (e.g., 551) are generally configured to provide N complementary pairs of rotary sensing coils CPi (e.g., CP1-CP4, where N=4) that each comprise a top rotary sensing coil TRSCi and a bottom rotary sensing coil BRSCi, wherein for any complementary pair CPi, and for any disruptor element displacement increment within the operating motion ranges +/−Rz, +/−Rx, and +/−Ry, the magnitude of the change in overlap areas TRSCOAi and BRSCOAi associated with that disruptor displacement increment is nominally the same in that complementary pair. (It will be appreciated that for a particular scanning probe the operating motion ranges may be prescribed or specified in combination with the configuration of its particular stylus position detection portion, if needed in order to fulfill this requirement.) The table CPTable in FIG. 5 indicates the respective members TRSCi and BRSCi of each respective complementary pair CPi for the implementation shown in FIG. 5.

By conforming to the foregoing principle, the complementary pairs CPi shown in FIG. 5 may be used to compensate or eliminate certain cross-coupling errors, and/or to simplify the signal processing required to provide precise rotary position or displacement measurements (e.g., along the X and/or Y directions). In particular, pairs of signal components arising in complementary pairs CPi of rotary sensing coils in the implementation shown in FIG. 5 may be combined or processed in a relationship that provides a resulting signal that is nominally insensitive to variations in "proximity" or gap between the individual coils of the complementary pair and the disruptor element 551. That is, the resulting signal may be insensitive to the axial (Z) position or displacement ΔZ of the disruptor element 551, and nominally only sensitive to a rotary position or displacement (e.g., along the X and/or Y directions), as described in greater detail below. For the particular implementation shown in FIG. 5, it may be understood that a displacement of the disruptor element 551 that has a displacement component ΔY along the Y axis direction will increase (or decrease) the overlap areas TRSCOA2 and BRSCOA2 in the complementary pair CP2 and decrease (or increase) the overlap areas TRSCOA1 and BRSCOA1 in the complementary pair CP1. Similarly, a displacement of the disruptor element 551 that has a displacement component ΔX along the X axis direction will increase (or decrease) the overlap areas TRSCOA3 and BRSCOA3 in the complementary pair CP3 and decrease (or increase) the overlap areas TRSCOA4 and BRSCOA4 in the complementary pair CP4.

As previous outlined, in operation, currents induced in the disruptor element 551 by the changing magnetic field of the field generating configuration 560 cause opposing magnetic fields. Generally speaking, the signal component SIGTRSCi (or SIGBRSCi) generated in any rotary sensing coil TRSCi (or BRSCi), will be reduced as a proximate portion of the disruptor element 551 comes closer to that rotary sensing coil along the axial direction, or increases its overlap TRSCOAi (or BRSCOAi) with the rotary sensing coil.

It will be appreciated that for the complementary pairs CP1-CP4 indicated in FIG. 5 (wherein the coils in a complementary pairs CPi may be identical and aligned along the axial direction), at the illustrated undeflected position UNDF, the signal components in each complementary pair (e.g., SIGTRSC1 and SIGBRSC1) may be approximately balanced. According to previously outlined principles, for a portion of the disruptor element 551 proximate to a complementary pair (e.g., CP1), for small displacements ΔZ such as those expected in operation, the net signal components (e.g., SIGTRSC1 and SIGBRSC1) may vary approximately linearly, and inversely compared to one another. Thus, the sum of such signals for a complementary pair CPi may be nominally insensitive to a ΔZ associated with the proximate portion of the disruptor element 551. Furthermore, in the implementation shown in FIG. 5, the edges of the disruptor element 551 may be parallel to the X and Y directions, such that, within the operating motion ranges +/−Rx and +/−Ry, a Y direction displacement component does not alter the rotary coil sensing overlap areas TRSCOA3, BRSCOA3, and/or TRSCOA4 and BRSCOA4, and an X direction displacement component does not alter the rotary coil sensing overlap areas TRSCOA2, BRSCOA2, and/or TRSCOA1 and BRSCOA1. Therefore, in one implementation, a rotary displacement or position component ΔX along the X direction may be indicated by or correspond to the following signal relationship, ideally regardless of ΔZ and/or ΔY:

$$\Delta X = \text{function of } [(SIGTRSC3+SIGBRSC3) - (SIGTRSC4+SIGBRSC4)] \div [(SIGTRSC3+ SIGBRSC3)+(SIGTRSC4+SIGBRSC4)] \quad (Eq. 6)$$

Similarly, in one implementation, a rotary displacement or position component ΔY along the Y direction may be indicated by or correspond to the following signal relationship, ideally regardless of ΔZ and/or ΔX:

$$\Delta Y = \text{function of } [(SIGTRSC2+SIGBRSC2) - (SIGTRSC1+SIGBRSC1)] \div [(SIGTRSC2+ SIGBRSC2)+(SIGTRSC1+SIGBRSC1)] \quad (Eq. 7)$$

These signal relationships are exemplary only, and not limiting. In various implementations, these signal relationships may be adjusted or compensated by additional calibration or signal processing operations, including operations that reduce the effects of geometric and/or signal cross-coupling between various displacement directions or signal components, if desired.

In some particularly advantageous implementations, the receiver coil portion (e.g., 570) and the disruptor element (e.g., 551) are configured wherein, for any complementary pair CPi and any disruptor element displacement increment within the operating motion ranges +/−Rz, +/−Rx, and +/−Ry, both the magnitude and sign of the change in overlap areas TRSCOAi and BRSCOAi associated with that disruptor displacement increment are the same in that complementary pair. In some such implementations, the receiver coil portion is configured wherein each complementary pair CPi comprises a top rotary sensing coil TRSCi and a bottom rotary sensing coil BRSCi characterized in that the shape of their interior areas nominally coincide when projected along the axial direction. It may be seen that the particular implementation of the stylus position detection portion 511' shown in FIG. 5 conforms to this description. However, it will be appreciated that various configurations of complementary pairs may be used, and the particular configurations shown in FIG. 5 are exemplary only and not limiting. Various alternative configurations are described with reference to other figures below.

In some particularly advantageous implementations, the receiver coil portion (e.g., 570) and the disruptor element (e.g., 551) may be configured wherein the disruptor element comprises at least N straight sides, and, for any respective complementary pair CPi, a respective one of the straight sides of the disruptor element transects both the top rotary sensing coil TRSCi and the bottom rotary sensing coil BRSCi of that respective complementary pair. In some such implementations, N=4, and the at least N straight sides include 4 sides that are arranged parallel to the sides of a rectangular or square shape. It may be seen that the particular implementation of the stylus position detection portion 511' shown in FIG. 5 conforms to this description. However, it will be appreciated that various combinations of complementary pairs configurations and disruptor element edge configurations may be used, and the combination of the particular configurations shown in FIG. 5 is exemplary only and not limiting. Various alternative combinations of configurations are described with reference to other figures below.

FIG. 6 is a partially schematic isometric diagram of certain elements of the stylus position detection portion 511' shown in FIG. 5, including schematically represented connections CONN to a block diagram of one exemplary implementation of signal processing and control circuitry 680 according to principles disclosed herein. As shown in FIG. 6, the signal processing and control circuitry 680 is operably connected to the various coils of the stylus position detection portion 511'. In the implementation shown in FIG. 6, the signal processing and control circuitry 680 comprises a digital controller/processor 681, that may govern various timing and signal connection or exchange operations between its various interconnected components, which include a drive signal generator 682, an amplification/switching portion 683, a sample and hold portion 684, a multiplexing portion 685, and an A/D convertor portion 686. The digital controller/processor 681 may also perform various digital signal processing operations to determine the output signals APSOut and RPSOut, as previously outlined with reference to FIG. 2, and described further below. The design and operation of the signal processing and control circuitry 680 may generally be recognized and understood by one of ordinary skill in the art, according to known principles. For example, in one implementation, the various elements of the signal processing and control circuitry 680 may be designed and operated by analogy to corresponding elements disclosed in U.S. Pat. No. 5,841,274, which is hereby incorporated herein by reference in its entirety. Therefore, the operation of the illustrated signal processing and control circuitry 680 will be described only briefly here.

In operation, the drive signal generator 682 is operated to provide a changing coil drive signal Dsig (e.g., a pulse) to the field generating coil configuration 560, which generates a changing magnetic flux generally along the axial direction in the disruptor motion volume MV in response to the coil drive signal. In the illustrated configuration, the top field generating coil 561T and the bottom field generating coil 561B are configured to provide changing magnetic fluxes that reinforce one another. The amplification/switching portion 683 is configured to input the signals RSIGs and ASIGs from the receiver coil portion 570, comprising respective signal components provided by the respective rotary and axial sensing coils located on the top and bottom coil substrates (e.g., the previously outlined signal components SIGTASCC, SIGBASCC, SIGTRSC1-SIGTRSC4, and SIGBRSC1-SIGBRSC4). In some implementations, the amplification/switching portion 683 may include switching circuits which may combine various analog signals to provide various desired sum or difference signals (e.g., by appropriate serial or parallel connections, or the like), for example as prescribed in the relationships shown in EQUATIONS 5-7, or the like. However, in other implementations, the amplification/switching portion 683 may perform only amplification and signal conditioning operations (and possibly signal inversion operations), with all signal combination operations performed in other circuit portions.

The sample and hold portion 684 inputs the various analog signals from the amplification/switching portion 683, and performs sample and hold operations according to known principles, e.g., to simultaneously sample and hold all respective signal components that arise from the various respective sensing coils of the receiver coil portion 570. In one implementation, the multiplexing portion 685 may connect various signals to the A/D convertor portion 686 sequentially, and/or in combinations related to various desired signal relationships (for example, as prescribed in the relationships shown in EQUATIONS 5-7, or the like). The A/D convertor portion 686 outputs corresponding digital signal values to the digital controller/processor 681. The digital controller/processor 681 may then process and/or combine the digital signal values according to various desired relationships (for example, as prescribed in the relationships shown in EQUATIONS 5-7, or the like), to determine and output the output signals APSOut and RPSOut, which are indicative of the axial position and the rotary position of at least one of the disruptor element 551 or the stylus 506 relative to the frame or housing of the scanning probe. In some implementations the digital controller/processor 681 may be configured such that the output signals APSOut and RPSOut directly indicate the three-dimensional position of the stylus 506 or its contact portion 548 relative to the frame of the scanning probe. In other implementations, it may be configured to output signals that indirectly indicate the three-dimensional position of the stylus 506 or its contact portion 548 relative to the frame of the scanning probe, and a host system (e.g., a CMM) inputs such signals and performs additional processing to further combine or refine such signals and determine the three-dimensional position of the stylus 506 or its contact portion 548 relative to the scanning probe and/or relative to a an overall coordinate system used for CMM measurements.

It should be appreciated that for implementations of a stylus position detection portion (e.g., 511') according to the various principles disclosed and claimed herein, the signal components that are provided by the various receiver coils of the receiver coil portion (e.g., 570) are particularly advantageous with regard to eliminating or allowing correction of certain signal errors and/or signal cross coupling errors, while using relatively fast and simple signal processing in order to provide robust and highly accurate three-dimensional position indications.

Regarding the use of relatively fast and simple signal processing in order to provide robust and highly accurate three-dimensional position indications, one consideration is the linearity of the position or displacement signal components (or the linearity of certain combined signals, such as the Z signal relationship expressed in EQUATION 5). It should be understood that signals or signal relationships that vary with displacement according to significant 3rd order and/or 5th order signal variation contributions generally require more complex signal processing and/or compensation and/or calibration in order to provide precise displacement or position indications. The inventors have found that certain desirable configurations may tend to suppress higher order signal variation contributions in the axial sensing coil signal components ASigs, and/or combinations thereof. As one way of describing these desirable configurations, the sensing coils of the top and bottom axial sensing coil configurations TASCC and BASCC may be considered as defining an "axial sensing coil region inscribed cylinder" that is defined to be concentric with the central axis CA and to have a radius that is the minimum necessary such that the top and bottom axial sensing coils (e.g., the sensing coils of the top and bottom axial sensing coil configurations TASCC and BASCC shown in FIG. 5) fit within it. A "disruptor inscribed cylinder" may be defined to be concentric with the central axis CA and to have a radius that is the maximum radius that may be inscribed within the edges of the disruptor element (e.g., the disruptor element 551, or the like). In various implementations it may be desirable (but not required) that the radius of the disruptor inscribed cylinder may be at least 1.1 times the radius of the axial sensing coil region inscribed cylinder. In some implementations, it may be desirable (but not required) that the radius of the disruptor inscribed cylinder may be at least 1.2 or at least 1.5 times the radius of the axial sensing coil region inscribed cylinder.

FIGS. 7A-7E show "plan view" diagrams (looking along the axial or Z direction) representing respective "4 complementary pair" implementations of stylus position detection portion components comprising receiver coil portions 770A-770E and disruptor elements 751A-751E, respectively, according to principles disclosed herein. The illustrated components are usable in various implementations of a stylus position detection portion according to principles disclosed herein. Field generating coils are not shown in FIGS. 7A-7E, but they will be understood to be provided according to previously disclosed principles. The various components shown in FIGS. 7A-7E are similar or analogous to similarly numbered components in the previously described stylus position detection portions 311, 411, 511 and/or 511', and may generally be understood by analogy thereto. Therefore, only certain unique or important characteristics of the "4 complementary pair" implementations included in FIGS. 7A-7E are described below.

FIG. 7A shows an implementation of a receiver coil portion 770A and a disruptor element 751A similar to those previously described with reference to the stylus position detection portion 511', and will be understood by analogy thereto. In addition to showing the circular top and bottom axial sensing coil configurations TASCC and BASCC similar to those previously described with reference to the stylus position detection portion 511', FIG. 7A also shows alternative square top and bottom axial sensing coil configurations TASCC' and BASCC', shown in dashed outline. More generally, it will be understood that any desired shape may be used for the top and bottom axial sensing coil configurations provided that they are configured to provide desirable operation according to the various principles disclosed and/or claimed herein.

It may be noted that the shape of the disruptor element 751A includes "trimmed corners", for compactness. It should be appreciated that in order to fulfill principles previously disclosed herein, wherein the magnitude of the change in overlap areas TRSCOAi and BRSCOAi associated with a disruptor displacement increment is nominally the same in any of the illustrated complementary pairs, the operating motion ranges +/−Rx and +/−Ry along orthogonal X and Y directions may be prescribed or specified to not extend past the straight edge sections that transect each complementary pair, in order to fulfill this principle.

FIG. 7B shows an implementation of a receiver coil portion 770B and a disruptor element 751B similar to those previously described with reference to FIG. 7A, except that the complementary pairs CP1-CP4 in the receiver coil portion 770B comprise larger rotary sensing coils that overlap the sensing coils of the top and bottom axial sensing coil configurations TASCC and BASCC, which is not prohibited according to the various principles disclosed herein. In order to fabricate such a configuration, the rotary and axial sensing coils may be fabricated on respective layers of a multi-layer printed circuit board, for example.

FIG. 7C shows an implementation of a receiver coil portion 770C and a disruptor element 751C similar to those previously described with reference to FIG. 7B, except that the top and bottom axial sensing coil configurations TASCC and BASCC are not provided by axial sensing coils that are separate from the various rotary sensing coils TRSCi and BRSCi. Instead, it will be understood that the top axial sensing coil configuration TASCC comprises a combination of the N (N=4) top rotary sensing coils TRSC1-TRSC4, wherein the top axial sensing overlap area TASOA comprises a sum of the individual overlap areas TRSCOAi associated with the N top rotary sensing coils. It may be observed that due to the similar shapes of the N top rotary sensing coils TRSC1-TRSC4, and the two pairs of parallel sides of the disruptor element that overlap them, any overlap area that is lost in the overlap area TRSCOA1 due to a displacement increment of the disruptor element 751C is gained in the overlap area TRSCOA2, and vice versa. Similarly, any overlap area that is lost in the overlap area TRSCOA3 is gained in the overlap area TRSCOA4, and vice versa. Thus, the sum of the overlap areas TRSCOAi is unchanged or independent of the position of the disruptor element 751C within the operating motion ranges +/−Rz, +/−Rx, and +/−Ry, even though its constituent individual overlap areas TRSCOAi vary depending on the position of the disruptor element 751C. Similarly, the bottom axial sensing coil configuration BASCC comprises a combination of the N (N=4) bottom rotary sensing coils BRSC1-BRSC4, wherein the bottom axial sensing overlap area BASOA comprises a sum of the individual overlap areas BRSCOAi associated with the N bottom rotary sensing coils. This sum of the overlap areas BRSCOAi is also unchanged or independent of the position of the disruptor element 751C within the operating motion ranges +/−Rz, +/−Rx, and +/−Ry, even though its constituent individual overlap areas BRSCOAi vary depending on the position of the disruptor element 751C. Thus, despite its differences from previously described configurations, the implementation shown in FIG. 7C provides a configuration according to a general principle disclosed herein, wherein the receiver coil portion 770C and the disruptor element 751C are configured to provide a top axial sensing overlap area TASOA and bottom axial sensing overlap area BASOA wherein an amount of each of the overlap areas TASOA and BASOA is unchanged or independent of the position of the disruptor element within the operating motion ranges +/−Rz, +/−Rx, and +/−Ry.

FIG. 7D shows an implementation of a receiver coil portion 770D and a disruptor element 751D which function in a manner analogous to that previously described with reference to FIG. 7C, wherein the axial sensing coil configurations TASCC and BASCC are not provided by axial sensing coils that are separate from the various rotary sensing coils TRSCi and BRSCi. Instead, it will be understood that the top and bottom axial sensing coil configurations TASCC and BASCC comprise respective combinations of the N (N=4) top and bottom rotary sensing coils TRSC1-TRSC4 and BRSC1-BRSC4, wherein the top axial sensing overlap area TASOA comprises a sum of the individual overlap areas TRSCOAi associated with the N top rotary sensing coils and the bottom axial sensing overlap area BASOA comprises a sum of the individual overlap areas BRSCOAi associated with the N bottom rotary sensing coils. Similarly to the configuration shown in FIG. 7C, the sum of the overlap areas TRSCOAi is unchanged or independent of the position of the disruptor element 751D within the operating motion ranges +/−Rz, +/−Rx, and +/−Ry, even though its constituent individual overlap areas TRSCOAi vary depending on the position of the disruptor element 751D, and the sum of the overlap areas BRSCOAi is also unchanged or independent of the position of the disruptor element 751D within the operating motion ranges +/−Rz, +/−Rx, and +/−Ry, even though its constituent individual overlap areas BRSCOAi vary depending on the position of the disruptor element 751D. Thus, despite its differences from previously described configurations, the implementation shown in FIG. 7D provides a configuration according to a general principle disclosed herein, wherein the receiver coil portion 770D and the disruptor element 751D are configured to provide a top axial sensing overlap area TASOA and bottom axial sensing overlap area BASOA wherein an amount of each of the overlap areas TASOA and BASOA is unchanged or independent of the position of the disruptor element within the operating motion ranges +/−Rz, +/−Rx, and +/−Ry. Due to the illustrated shape of the disruptor element 751D, it should be appreciated that in order to fulfill principles previously disclosed herein, wherein the magnitude of the change in overlap areas TRSCOAi and BRSCOAi associated with a disruptor displacement increment is nominally the same in any of the illustrated complementary pairs, the operating motion ranges +/−Rx and +/−Ry along orthogonal X and Y directions may be prescribed or specified such that none of the corners of the disruptor element 751D move from their illustrated positions to an extent such that they cross any boundary of a sensing coil of any complementary pair CP1-CP4.

FIG. 7E shows an implementation of a receiver coil portion 770E and a disruptor element 751E similar to those previously described with reference to FIG. 7A (or the stylus position detection portion 511'), except that the top and bottom rotary sensing coils of each complementary pair CPi are rotated about the central axis by an angle 2*NAA relative to one another, where NAA is a "non-alignment angle". However, this implementation becomes increasingly disadvantageous in comparison to the previously outlined configurations (wherein the top and bottom rotary sensing coils of each complementary pair CPi are aligned along the axial direction), as the non-alignment angle NAA increases. The reason it becomes increasingly disadvantageous is that sum of the operating gaps (e.g., the operating gap OG, illustrated in FIG. 3) between the disruptor element 751E and the top and bottom rotary sensing coils of each complementary pair CPi is not necessarily constant for all displacements of the disruptor element 751E, since their overlap areas with the disruptor element 751E are not "co-located". Thus, the sum of their signals may not be ideally independent of the axial displacement $\Delta Z$, as previously outlined with reference to EQUATION 6. The configuration shown in FIG. 7E and outlined above is nevertheless not prohibited according to the various principles disclosed herein. It should be appreciated that such a configuration may still fulfill the most basic principles disclosed and claimed herein, and provide signal components that at least partially retain the various advantages outlined above in comparison to previously known inductive sensor configurations. As one way of describing the configuration shown in FIG. 7E, the receiver coil portion 770E is configured wherein each complementary pair CPi comprises a top rotary sensing coil TRSCi and a bottom rotary sensing coil BRSCi characterized in that the shape of their interior areas would nominally coincide if the shape of one of them is rotated about the central axis to coincide with an angular location of the other about the central axis (e.g., by an angle 2*NAA), and then projected along the axial direction. In various implementations, the receiver coil portion 770E and the disruptor element 751E may be configured wherein the disruptor element 751E comprises at least N straight sides (e.g., N=4), and, for any respective complementary pair CPi (e.g., CP1-CP4), a respective one of the straight sides of the disruptor element 751E transects both the top rotary sensing coil TRSCi and the bottom rotary sensing coil BRSCi of that respective complementary pair CPi. In such implementations where N=4, the at least N straight sides of the disruptor element 751E include 4 sides that are arranged parallel to the sides of a rectangular or square shape.

FIGS. 8A-8F show "plan view" diagrams (looking along the axial or Z direction) representing respective "3 (or 6) complementary pair" implementations of stylus position detection portion components comprising receiver coil portions 870A-870F and disruptor elements 851A-851F, respectively, according to principles disclosed herein. The illustrated components are usable in various implementations of a stylus position detection portion according to principles disclosed herein. Field generating coils are not shown in FIGS. 8A-8F, but they will be understood to be provided according to previously disclosed principles. Various elements shown in "3 (or 6) complementary pair" configurations shown in several of the FIGS. 8A-8F are similar or analogous to corresponding elements shown in corresponding "4 complementary pair" configurations previously described with reference to FIGS. 7A-7E, and they may generally be understood by analogy thereto. Therefore, only certain unique or important characteristics of the "3 complementary pair" implementations included in FIGS. 8A-8F are described below.

FIGS. 8A-8C are "3 complementary pair" analogs of their counterpart "4 complementary pair" configurations shown in the corresponding FIGS. 7A-7C. They may generally be understood by analogy with the description of their counterpart configurations (e.g., FIG. 8A to its counterpart FIG. 7A, and so on), based on the following additional description.

Figure 8F:
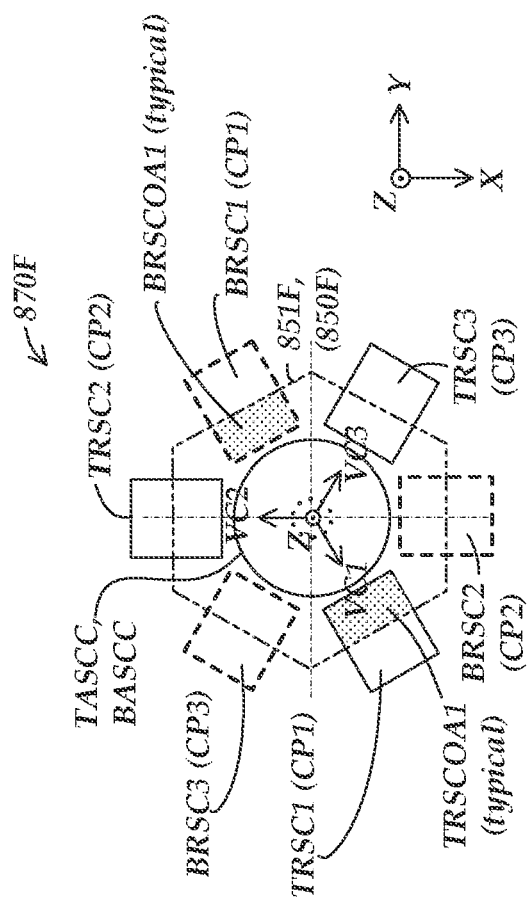

The use of 3 complementary pairs oriented at 120 degrees from one another, in contrast with the previously described 4 complementary pairs oriented at 90 degrees from one another (e.g., as shown in FIG. 7A), may be appreciated by considering that any displacement increment or position of a disruptor element (e.g., 851A) is just as easily characterized by displacement or position vector components or coordinates oriented along the respective vector component directions VC1, VC2, and VC3 shown in FIGS. 8A-8F as it is by displacement or position vector components or coordinates oriented along the X and Y axis directions shown in various figures herein. Methods of converting vector components from one coordinate system to another are well known, and need not be discussed in detail here. Based on this, it may be understood that the complementary pairs CPi shown in FIGS. 8A-8C are configured according to the same principles outlined in the previous description of complementary pairs, and their respective overlap areas are indicative of the displacement or position of the disruptor element along their corresponding vector component directions VC1, VC2, and VC3. For example, the representative overlap areas TRSCOA1 and BRSCOA1 indicated in FIG. 8A result in associated signal components SIGTRSC1 and SIGBRSC1 according to previously outlined principles, which are indicative of the displacement or position of the disruptor element along the corresponding vector component direction VC1, and so on. For the implementations shown in FIGS. 8A-8C and 8E, in one implementation, a rotary displacement or position component $\Delta VC1$ along the VC1 direction may be indicated by or correspond to the following signal relationship, which is nominally independent of $\Delta Z$ according to previously outlined principles for comparable complementary pairs:

$$\Delta VC1 = \text{function of } [(SIGTRSC1+SIGBRSC1) - (SIGTRSC1_{UNDF}+SIGBRSC1_{UNDF}], \quad \text{(Eq. 8)}$$

where $SIGTRSC1_{UNDF}$ and $SIGBRSC1_{UNDF}$ are reference signal values resulting from the overlap areas overlap areas TRSCOA1 and BRSCOA1 corresponding to the undeflected position UNDF of the disruptor element (e.g., 851A, etc.).

Similarly, rotary displacement or position components $\Delta VC2$ along the VC2 direction, and $\Delta VC3$ along the VC3 direction, may be indicated by or correspond to the following signal relationships:

$$\Delta VC2 = \text{function of } [(SIGTRSC2+SIGBRSC2) - (SIGTRSC2_{UNDF}+SIGBRSC2_{UNDF}] \quad \text{(Eq. 9)}$$

$$\Delta VC3 = \text{function of } [(SIGTRSC3+SIGBRSC3) - (SIGTRSC3_{UNDF}+SIGBRSC3_{UNDF}] \quad \text{(Eq. 10)}$$

It will appreciated that the axial sensing coil configurations TASCC and BASCC shown in FIGS. 8A-8C are substantially the same as those previously describe herein with reference to their counterpart configurations, and may be determined according to the same type of signal components and signal relationship. The signal relationships outlined above are exemplary only, and not limiting. In various implementations, these signal relationships may be adjusted or compensated by additional calibration or signal processing operations, including operations that reduce the effects of geometric and/or signal cross-coupling between various displacement directions or signal components, if desired.

FIG. 8D shows an implementation of a receiver coil portion 870D and a disruptor element 851D similar to those previously described with reference to FIG. 8A, except that additional complementary pairs CP4-CP6 are provided that are symmetrically configured across the central axis from the complementary pairs CP1-CP3, to provide a total of 6 complementary pairs. In particular, CP1 and CP4 are oriented opposite one another along the VC1 direction, CP2 and CP5 are oriented opposite one another along the VC2 direction, and CP3 and CP6 are oriented opposite one another along the VC3 direction. These opposing pairs are analogous to the opposing complementary pairs shown oriented along the X and Y axis directions in FIGS. 7A-7D. Such a configuration need not depend on the reference signal values (e.g., SIGTRSC1$_{UNDF}$, and so on) used in EQUATIONS 8-10. Therefore, such a configuration may be more robust and accurate (e.g., inherently compensating for signal drift due to various causes, and the like). For the implementation shown in FIG. 8D, in one implementation, a rotary displacement or position component ΔVC1 along the VC1 direction may be indicated by or correspond to the following signal relationships, which are nominally independent of ΔZ according to previously outlined principles for comparable complementary pairs:

$$\Delta VC1 = \text{function of } [(SIGTRSC1+SIGBRSC1)-(SIGTRSC4+SIGBRSC4)]+[(SIGTRSC1+SIGBRSC1)+(SIGTRSC4+SIGBRSC4)] \quad (Eq. 11)$$

$$\Delta VC2 = \text{function of } [(SIGTRSC2+SIGBRSC2)-(SIGTRSC5+SIGBRSC5)]+[(SIGTRSC2+SIGBRSC2)+(SIGTRSC5+SIGBRSC5)] \quad (Eq. 12)$$

$$\Delta VC3 = \text{function of } [(SIGTRSC3+SIGBRSC3)-(SIGTRSC6+SIGBRSC6)]+[(SIGTRSC3+SIGBRSC3)+(SIGTRSC6+SIGBRSC6)] \quad (Eq. 13)$$

It will be appreciated that the "3 complementary pair" implementations shown in FIGS. 8B and 8C could be similarly adapted to include 6 complementary pairs, and use analogous signal processing with analogous benefits.

FIG. 8E shows an implementation of a receiver coil portion 870E and a disruptor element 851E analogous to those previously described with reference to FIG. 7E, and may generally be understood by analogy to that description, in conjunction with the foregoing description of FIGS. 8A-8C. To briefly paraphrase that description, in FIG. 8E the top and bottom rotary sensing coils of each complementary pair CPi are rotated about the central axis by an angle 2*NAA relative to one another, where NAA is a "non-alignment angle". This implementation becomes increasingly disadvantageous in comparison to previously outlined configurations (wherein the top and bottom rotary sensing coils of each complementary pair CPi are aligned along the axial direction), as the non-alignment angle NAA increases, as previously described with reference to FIG. 7E, where it was explained that the sum of the signals from a complementary pair may not be ideally independent of the axial displacement ΔZ as previously outlined with reference to EQUATION 6. The configuration shown in FIG. 8E is nevertheless not prohibited according to the various principles disclosed herein. It should be appreciated that such a configuration may still fulfill the most basic principles disclosed and claimed herein, and provide signal components that at least partially retain the various advantages outlined above in comparison to previously known inductive sensor configurations.

FIG. 8F shows an implementation of a receiver coil portion 870F and a disruptor element 851F wherein the complementary pairs of sensing coils CPi have a different configuration sensing coils than those of previously described complementary pairs (e.g., as shown in FIG. 8A), in that they are located symmetrical across the central axis relative to one another. Thus, they may be characterized as similar to previously described complementary pairs in that the receiver coil portion and the disruptor element are further configured wherein, for any complementary pair CPi and any disruptor element displacement increment within the operating motion ranges +/−Rz, +/−Rx, and +/−Ry, the magnitude of the change in overlap areas TRSCOAi and BRSCOAi associated with the disruptor displacement increment is the same in that complementary pair. Furthermore, in the implementation shown in FIG. 8F, the receiver coil portion is configured similarly to some complementary pairs previously described herein, wherein each complementary pair CPi comprises a top rotary sensing coil TRSCi and a bottom rotary sensing coil BRSCi characterized in that the shape of their interior areas would nominally coincide if the shape of one of them is rotated by an offset angle (e.g., 180 degrees) about the central axis to coincide with the angular location of the other about the central axis, and then projected along the axial direction.

However, in contrast to previously described complementary pairs, the sign of the change in overlap areas TRSCOAi and BRSCOAi associated with the disruptor displacement increment are the opposite in the complementary pairs shown in FIG. 8F. Such an implementation may have certain disadvantages in comparison to implementations wherein the sign of the change in overlap areas TRSCOAi and BRSCOAi associated with a disruptor displacement increment are the same in each complementary pair. However, the configuration shown in FIG. 8F is nevertheless not prohibited according to the various principles disclosed herein. With appropriate signal processing, such implementations may still provide certain advantages for use in a scanning probe, in comparison to known inductive type sensing configurations. The signal processing may need to be more complex than is needed in previously disclosed implementations herein (e.g., using more complex signal component relationships to indicate various displacement or position vector components), in order to correct or compensate for various cross coupling effects or the like. However, for the receiver coil portion 870F, such effects may generally be compensated based on known geometric and/or signal relationship constraints and the fact that the magnitude of the change in overlap areas for a given displacement of the disruptor element 851F is the same in the sensor coils of each complementary pair. For example, in the implementation shown in FIG. 8F, the disruptor element 851F comprises 3 pairs of parallel straight sides (e.g., arranged parallel to the sides of a regular hexagon shape), and, for any respective complementary pair CPi, a first one of a pair of parallel straight sides transects the top rotary sensing coil TRSCi, and a second one of that pair of parallel straight sides transects the bottom rotary sensing coil BRSCi of that respective complementary pair. Based on the known rigid body translation and rotation characteristics of the disruptor element 851F, the respective overlap areas and local operating gaps of each sensing coil are included in the receiver coil portion 870F to be constrained by known relationships relative to one another, and these known relationships may be used to determine accurate displacement vectors in signal processing for the signal components provided by the receiver coil portion 870F.

It will be appreciated that the variations shown in FIGS. 7A-7E and FIGS. 8A-8F are indicative of the possibility of further rearranging and/or adjusting the configuration and combination of various elements in a stylus position detection portion according to the various principles disclosed and claimed herein, while retaining many or all of the advantages previously outlined in association with those principles. In general, it will be understood that the various implementations disclosed herein are intended to be exemplary only and not limiting.

Figure 9A:
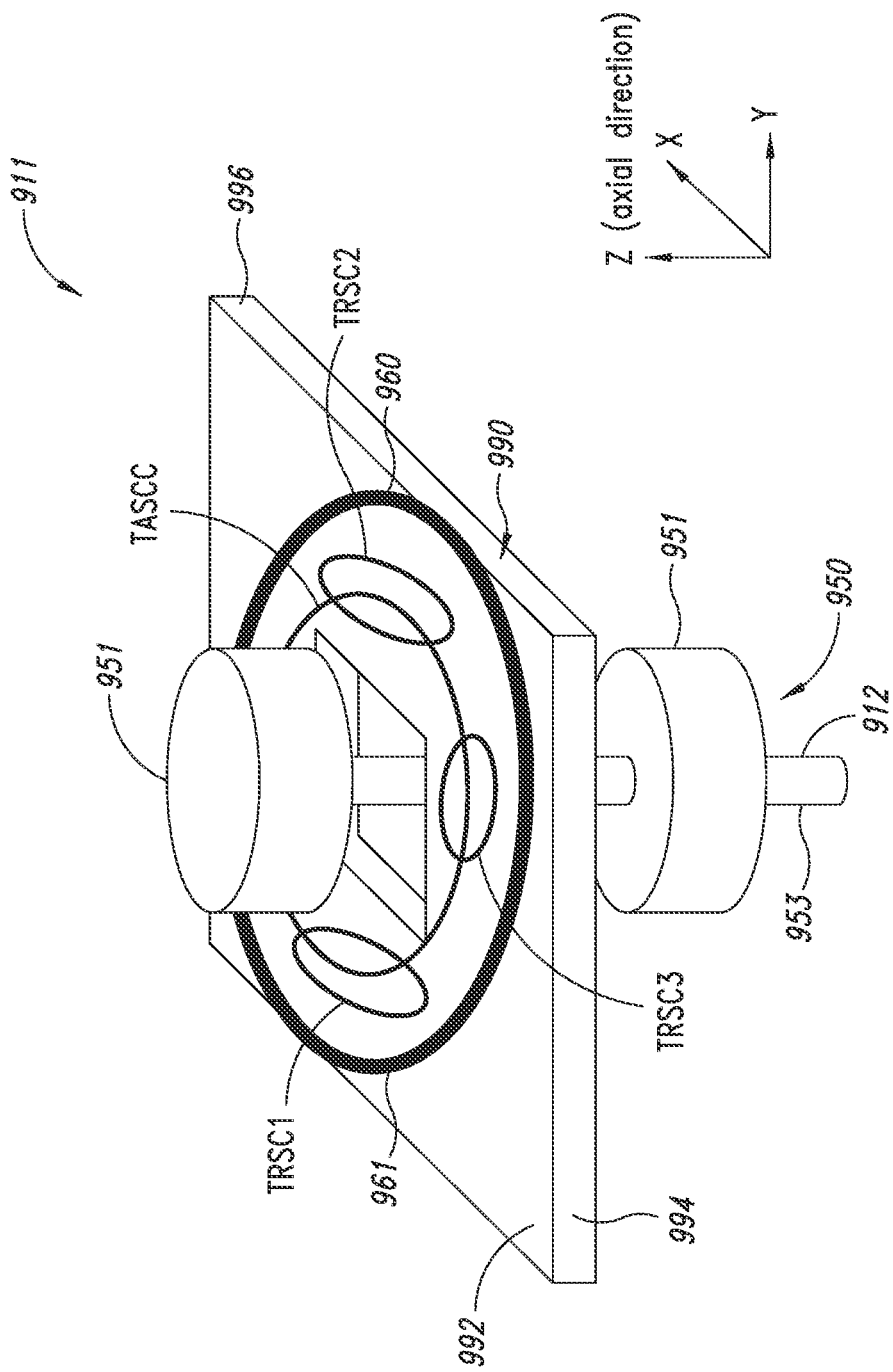
FIGS. 9A and 9B are diagrams showing portions of an exemplary implementation of a stylus position detection portion for detecting the position of the stylus suspension portion.
Figure 9B:
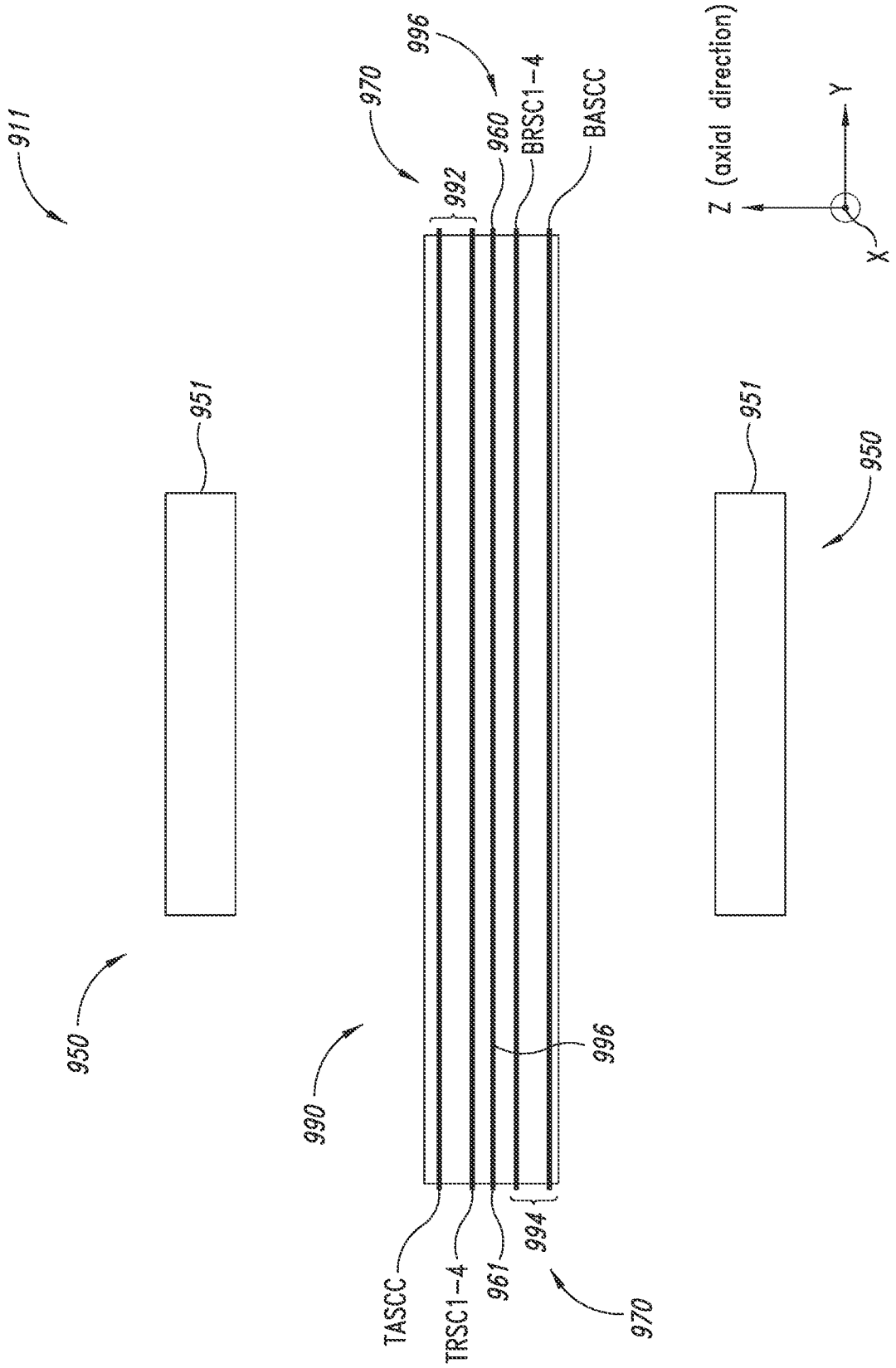

FIGS. 9A and 9B illustrate an alternative configuration of a stylus position detection portion 911, which may be employed, for example, in the scanning probe 300 of FIG. 2 as the stylus position detection portion 311, in the implementation of FIG. 3 instead of the stylus position detection portion 411, in the implementation of FIG. 4 instead of the stylus position detection portion 511, etc. The inductive components are illustrated in FIG. 9B. The stylus position detection portion 911 uses inductive sensing principles and includes a coil board configuration 990 having a receiver coil portion 970 and a field generating coil configuration 960, which as illustrated comprises a transmitter coil 961, and a disruptor configuration 950, which as illustrated includes first and second disruptor elements 951. The receiver coil portion 970 may comprise rotary sensing coil portions (also referred to as rotary sensing coils) RSC and axial sensing coil configurations ASCC. Briefly, the moving disruptor elements 951 (or more generally, the disruptor configuration 950) cause position-dependent variations in a changing magnetic field generated by the field generating coil configuration 960. The receiver coil portion 970 is responsive to the changing magnetic field and the variations therein caused by the disruptor elements 951.

The coil board configuration 990 comprises a first board portion 992 including N top rotary sensing coil portions (as illustrated, TRSC1 to TRSC4, for which N=4 in this example) and a top axial sensing coil configuration (as illustrated TASCC), a second board portion 994 including N bottom rotary sensing coil portions (as illustrated, BRSC1 to BRSC4, for which N=4 in this example) and a bottom axial sensing coil configuration (as illustrated BASCC). The coil board configuration 990 also comprises a center board portion 996 positioned between the first board portion 992 and the second board portion 994. The center board portion 996 includes at least a first field generating coil configuration 960 (as illustrated including transmitting coil 961). The coil board configuration 990 is mounted in a fixed relationship to the frame of a scanning probe (see scanning probe 300 of FIG. 2 and frame 408 of FIG. 4), with the second board portion 994 of the coil board configuration 990 closer to the stylus suspension portion 307/407 (see FIGS. 2 and 3). The first board portion 992, the second board portion 994 and center board portion 996 of the coil board configuration 990 are nominally parallel to one another and nominally orthogonal to a central axis CA (see FIG. 3) of a scanning probe 300 (see FIG. 2). The coil board configuration 990 may comprise, for example, a two-sided substrate or printed circuit board having coils fabricated as printed conductors in layers of the substrate or printed circuit board, free-standing coils fastened to a substrate or printed circuit board, etc., and/or various combinations thereof.

In various implementations, the disruptor elements 951 of the disruptor configuration 950 each comprise at least one of a conductive plate or a conductive loop that provides a disruptor area, and the disruptor elements 951 are located along the central axis CA (see FIG. 3) in a disruptor motion volume extending on opposite sides of the coil board configuration 990. The disruptor elements 951 are coupled to the stylus suspension portion 307/407 (see FIGS. 2 and 3) in a fixed relationship relative to one another by a coupling configuration 953, including an upper portion of a moving member 912 (e.g., similar to the moving member 412 of FIG. 3). The disruptor elements 951 move in the disruptor motion volume relative to an undeflected position in response to a deflection of the stylus suspension portion 307/407 (see FIGS. 2 and 3), the disruptor elements moving over operating motion ranges +/−Rz along the axial direction in response to the axial motion, and over respective operating motion ranges +/−Rx and +/−Ry along respective orthogonal X and Y directions that are orthogonal to the axial direction in response to the rotary motion. A projection of a coil area of the first field generating coil 961 along the axial direction encompasses the conductive plates or loops that provide the disruptor areas and a coil area of all the rotary and axial sensing coils located on the coil board configuration 990. The field generating coil configuration 960 generates a changing magnetic flux generally along the axial direction in the disruptor motion volume in response to a coil drive signal.

Figure 10:
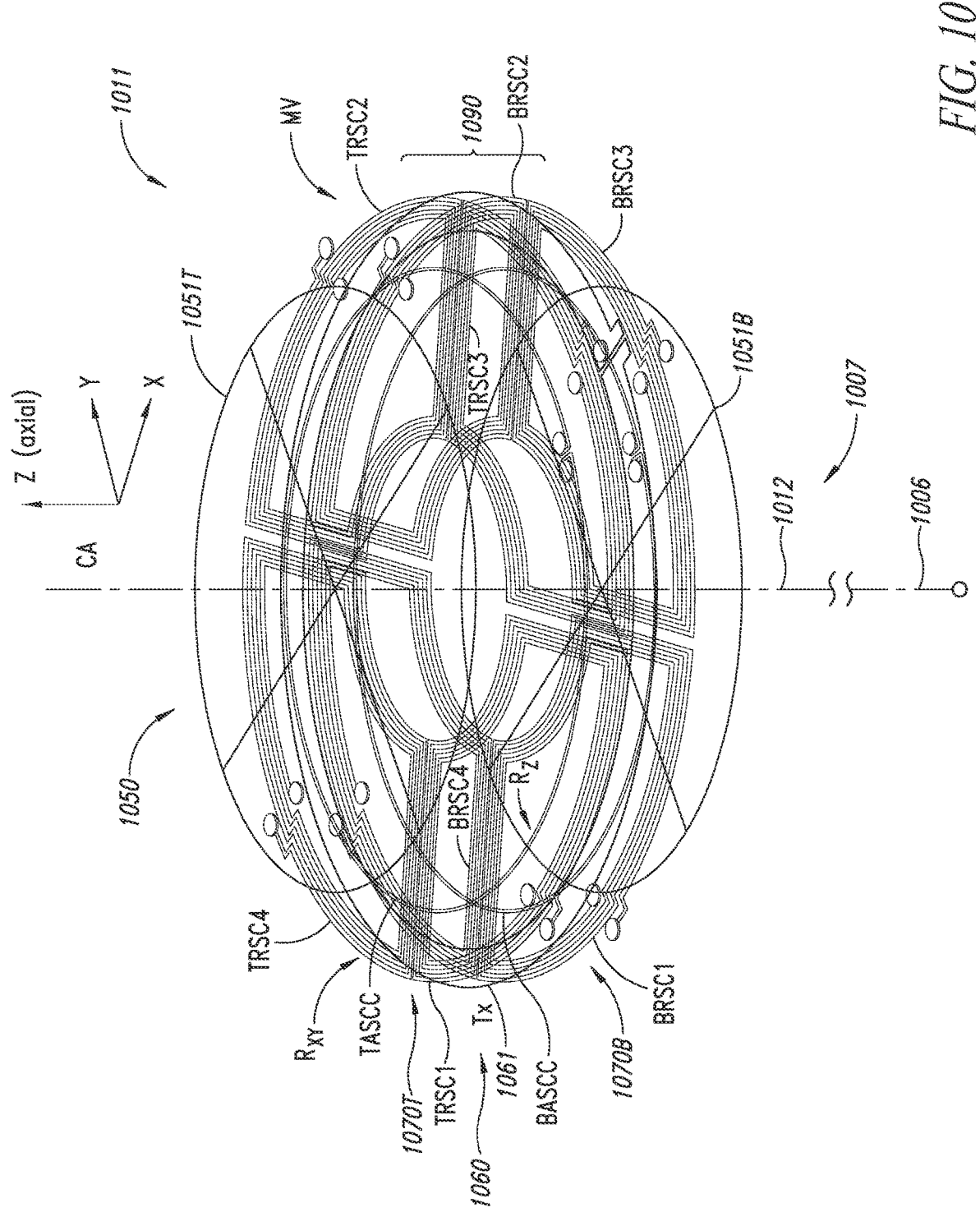
FIG. 10 is a partially schematic isometric diagram of an alternative implementation of the stylus position detection portion shown in FIGS. 9A and 9B, emphasizing certain aspects according to principles disclosed herein.

FIG. 10 is a partially schematic isometric diagram of an implementation of a stylus position detection portion 1011 that is similar to a stylus position detection portion 911 shown in FIGS. 9A and 9B, emphasizing certain aspects according to principles disclosed herein. In general, the stylus position detection portion 1011 includes certain components that are similar to those of the stylus position detection portions 311, 411, 511 and 911 of FIGS. 2, 3, 4, 9A and 9B, and will be understood to operate similarly except as otherwise described below. The configuration of a stylus position detection portion 1011, may be employed, for example, in the scanning probe 300 of FIG. 2 as the stylus position detection portion 311, in the implementation of FIG. 3 instead of the stylus position detection portion 411, in the implementation of FIG. 4 instead of the stylus position detection portion 511, in the implementation of FIGS. 9A and 9B instead of the stylus position detection portion 911, etc.

In the implementation shown in FIG. 10, the stylus position detection portion 1011 comprises a coil board configuration portion 1090 and a disrupter configuration 1050. The coil board configuration portion 1090 includes top and bottom receiver coil board portions 1070T, 1070B, with a field generation coil board portion 1060 positioned between the top receiver coil board portion 1070T and the bottom receiver coil board portion 1070B. In various implementations, the top and bottom receiver coil board portions 1070T, 1070B may also be referenced as first and second board portions 1070T, 1070B, and the field generation coil board portion 1060 may also be referenced as a center board portion 1060. The disruptor configuration 1050 includes disruptor elements 1051T, 1051B or scales. In various implementations, the disruptor elements 1051T, 1051B may also be referenced as first and second disruptor elements 1051T, 1051B.

In various implementations, disruptor elements 1051T, 1051B (or more generally the disruptor configuration 1050) may each comprise at least one of a conductive plate or conductive loop, or parallel conductive plates or conductive loops (e.g., as fabricated on two sides of a printed circuit substrate, patterned by printed circuit board fabrication techniques), or any other desired operational configuration that provides a disruptor area (e.g., its interior area). As illustrated in FIG. 10, the disruptor elements 1051T and 1051B each comprise a conductive plate. The disruptor elements 1051T and 1051B are located along the central axis CA in the disruptor motion volume MV, which extends on opposite sides of the coil board configuration 1090, and are coupled to a stylus suspension portion 1007 by a coupling configuration (e.g., comprising at least an upper portion of a moving member 1012 that is similar to the moving member 412 of FIG. 3). For purposes of explanation, the disruptor elements 1051T, 1051B move relative to the undeflected position illustrated in FIG. 10 (e.g., similar to the undeflected position UNDF, in FIG. 3) in response to a deflection of a stylus suspension portion 1007 and/or a stylus 1006 and/or the moving member 1012 (e.g., which may be similar or identical to the stylus suspension portion 407, stylus 406 and moving member 412 of FIG. 3). The disruptor elements 1051T, 1051B may be described as moving with displacement increments ΔZ over an operating motion range +/−Rz along the axial direction in response to axial motion, and with respective displacement increments ΔX and ΔY over respective operating motion ranges +/−Rx and +/−Ry along orthogonal X and Y directions that are orthogonal to the axial direction (Z direction) in response to rotary motion.

The top receiver coil board portion 1070T includes N top rotary sensing coils TRSC (e.g., as illustrated TRSC1-TRSC4, where N=4) and a top axial sensing coil configuration TASCC (e.g., comprising the single illustrated individual coil in this implementation), and the bottom receiver coil board portion 1070B includes N bottom rotary sensing coils BRSC (e.g., as illustrated BRSC1-BRSC4, where N=4) and a bottom axial sensing coil configuration BASCC (e.g., comprising the single illustrated individual coil in this implementation).

The coil board configuration 1090 is mounted in a fixed relationship to the frame of the scanning probe (e.g., frame 408 of FIG. 4) with the bottom receiver coil board portion 1070B closer to the stylus 1006 and/or the stylus suspension portion 1007. It should be appreciated with respect to the various sensing coils shown in FIG. 10, all coils comprise at least one of windings or conductors that have first and second connection ends (e.g., as represented in FIG. 6) that are configured to operate as one or more inductively coupled "turns." As illustrated, the top and bottom axial sensing coil configurations TASCC and BASCC, as well as the top and bottom rotary sensing coil configurations TRSC and BRSC, are nominally symmetrically spaced with respect to the disruptor configuration 1050 and the corresponding positions of the disruptor elements 1051T, 1051B. Other configurations are possible (e.g., the rotary sensing coil configurations TRSC and BRSC may not be nominally centered relative to the disruptor configuration 1050 in some implementations).

The field generating coil board portion 1060 generally comprises at least a first field generating coil 1061 and is positioned between the top receiver coil board portion 1070T and the bottom receiver coil board portion 1070B. As illustrated in FIG. 10, the at least a first field generating coil comprises a single field generating coil 1061 which has an area larger than an area of the disruptor elements 1051T, 1051B. The top receiver coil board portion 1070T, the field generating coil board portion 1060 and the bottom receiver coil board portion 1070B are nominally planar, nominally parallel to each other and nominally orthogonal to the central axis CA.

In the illustrated implementations of FIGS. 3, 4 and 5, the disruptor element is positioned inside the field generating coil elements (e.g., disruptor element 551 of FIG. 4 fits inside the field generating coil 561), and an area of the disruptor element is smaller than an area of the field generating coil elements. In the illustrated implementations of FIGS. 9A, 9B and 10, the disruptor elements are positioned parallel to the field generating coil elements (e.g., the disruptor elements 1051T, 1051B are positioned above and below the field generating coil 1061). The configurations of FIGS. 9A, 9B and 10 provide increased flexibility with respect to the relative sizes of the disruptor elements and the field coil elements. In addition, utilization of a single printed circuit board (e.g., for which the first board portion, the second board portion and the central board portion may comprise portions of a single multilayer printed circuit board) may reduce cost and complexity relative to configurations utilizing multiple printed circuit boards.

Figure 11:
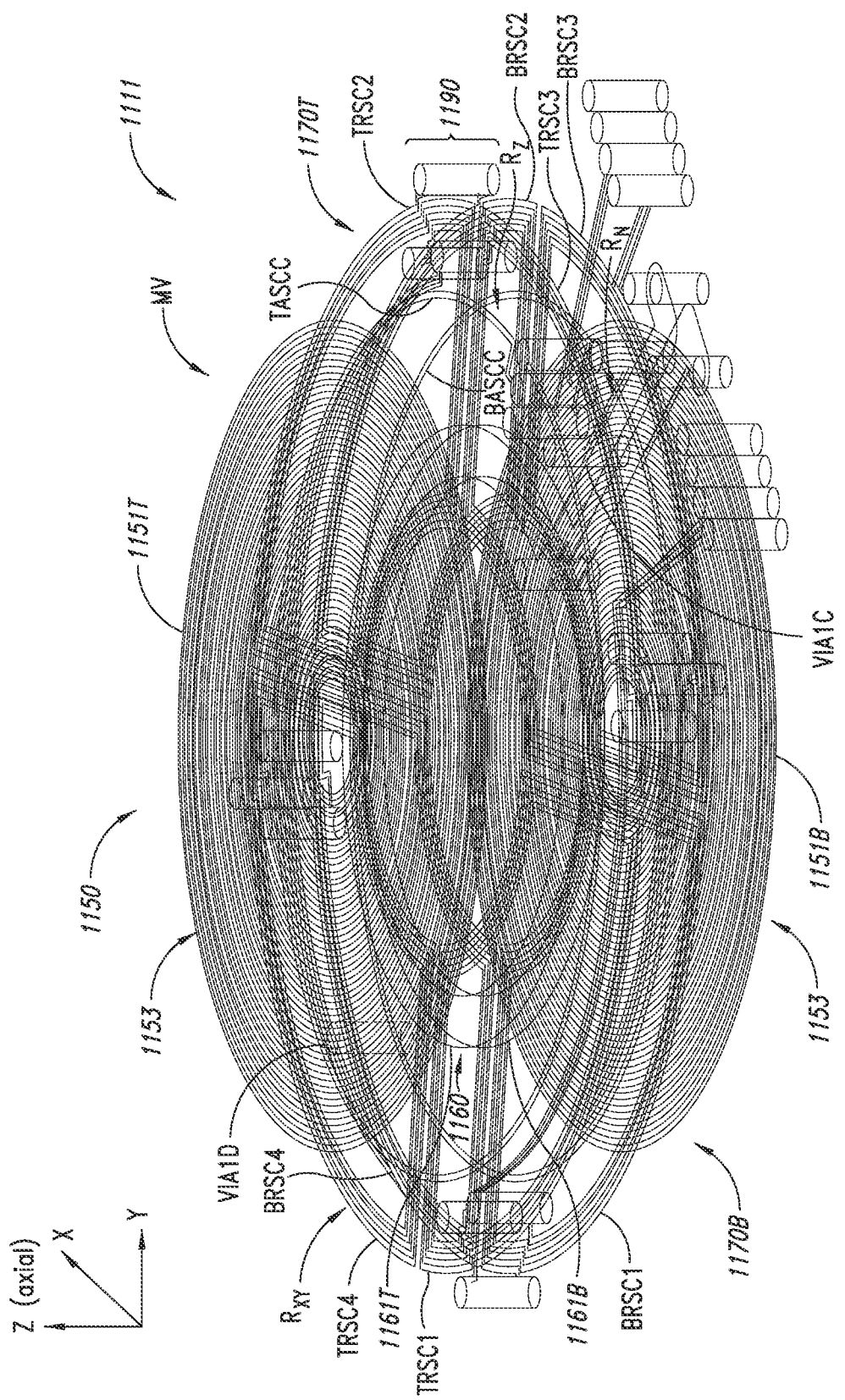
FIG. 11 is a partially schematic isometric diagram of an alternative implementation of the stylus position detection portion shown in FIG. 10, emphasizing certain aspects according to principles disclosed herein.

FIG. 11 is a partially schematic isometric diagram of an alternative implementation of a stylus position detection portion 1111 that is similar to a stylus position detection portion 1011 shown in FIG. 10, emphasizing certain aspects according to principles disclosed herein. In general, the stylus position detection portion 1111 includes certain components that are similar to those of the stylus position detection portion 1011 of FIG. 10, and will be understood to operate similarly except as otherwise described below. The configuration of a stylus position detection portion 1111, may be employed, for example, in the scanning probe 300 of FIG. 2 as the stylus position detection portion 311, in the implementation of FIG. 3 instead of the stylus position detection portion 411, in the implementation of FIG. 4 instead of the stylus position detection portion 511, in the implementation of FIGS. 9A and 9B instead of the stylus position detection portion 911, in the implementation of FIG. 10 instead of the stylus position detection portion 1011, etc.

In the implementation shown in FIG. 11, the stylus position detection portion 1111 comprises a coil board configuration portion 1190 and a disrupter configuration 1150. The coil board configuration portion 1190 includes top and bottom receiver coil board portions 1170T, 1170B, with a field generation coil board portion 1160 positioned between the top receiver coil board portion 1170T and the bottom receiver coil board portion 1170B. In various implementations, the top and bottom receiver coil board portions 1170T, 1170B may also be referenced as first and second board portions 1170T, 1170B, and the field generation coil board portion 1160 may also be referenced as a center board portion 1160. The disruptor configuration 1150 includes disruptor elements 1151T, 1151B or scales. In various implementations, the disruptor elements 1151T, 1151B may also be referenced as first and second disruptor elements 1151T, 1151B. The top and bottom receiver coil board portions 1170T, 1170B as illustrated are generally similar to the corresponding top and bottom receiver coil board portions 1070T, 1070B of FIG. 10 (more details of conductive vias and pads are illustrated in FIG. 11).

In various implementations, disruptor elements 1151T, 1151B (or more generally the disruptor configuration 1150) may each comprise at least one of a conductive plate or a conductive loop, or parallel conductive plates or conductive loops (e.g., as fabricated on two sides of a printed circuit substrate, patterned by printed circuit board fabrication techniques), or any other desired operational configuration that provides a disruptor area (e.g., its interior area). In various implementations, a configuration with conductive loops may include at least one of concentric loops, a spiral pattern, etc. As illustrated in FIG. 11, the disruptors 1151T and 1151B each comprise a plurality of concentric conductive loops, instead of the conductive plates employed in the illustrated implementation of FIG. 10. The disruptor elements 1151T and 1151B are located along the central axis CA in the disruptor motion volume MV, which extends on opposite sides of the coil board configuration 1190, and may be coupled to a stylus suspension portion (see stylus suspension portion 1007 of FIG. 10) in a manner similar to that discussed above with reference to FIG. 10.

The field generating coil board portion 1160 generally comprises at least a first field generating coil. As illustrated, the field generating coil board portion 1160 comprises a top field generating coil portion 1161T and a bottom field generating coil portion 1161B, which are positioned between the top receiver coil board portion 1170T and the bottom receiver coil board portion 1170B. The top receiver coil board portion 1170T, the field generating coil board portion 1160 and the bottom receiver coil board portion 1170B are nominally planar, nominally parallel to each other and nominally orthogonal to the central axis CA. In the example implementation of FIG. 11, the field generating coil board portion 1160 comprises a multi-turn field generating coil with two turns and for which the two corresponding field generating coil portions 1161T and 1161B are connected by a via and are located approximately equidistant from a midplane of the disruptor motion volume along the central axis, and are nominally planar and orthogonal to the central axis.

As illustrated in FIG. 11, the top field generating coil portion 1161T and the bottom field generating coil portion 1161B have areas which are smaller than the areas of the disruptor elements 1151T, 1151B. Employing field generating coils having a smaller area than areas of the disruptor elements facilitates reducing the sensitivity of the stylus position detection portion 1111 to the size of the disruptor elements or scales. Using conductive loops (e.g., concentric loops, a spiral pattern, etc.) in the disruptor elements instead of conductive plates or a single conductive loop also facilitates reducing the sensitivity of the stylus position detection portion 1111 to the size of the disruptor elements or scales, while maintaining good X and Y position signal strength. Reducing the sensitivity of the stylus portion to the size of the disruptor elements or scales may facilitate increased accuracy of measurements, and may reduce processing costs associated with generating results in a desired output format.

In some implementations, due to the close proximity of the receiver coils (e.g., coils BRSC1-BRSC4, TRSC1-TRSC4) to the transmitter (e.g., coils 1161T, 1161B), non-connected vias/pads may be added to balance offsets that may otherwise be generated by connection traces (e.g., for transmitter and receiver leads) or other elements. As an illustrative example, in the implementation of FIG. 11, certain connected vias/pads/leads (e.g., as connected to and/or part of electronic circuitry or configurations) are shown within the coils BRSC3/TRSC3 (e.g., for connection traces) that do not have symmetrical connected counterparts (e.g., symmetrical about the central axis) within the symmetrical coils BRSC4/TRSC4 (e.g., five such vias as well as upper and lower transmitter leads are illustrated within the coils BRSC3/TRSC3 in the example configuration of FIG. 11, including three vias for the connections for the axial sensing coil configurations TASCC, BASCC, a via for connecting the portions of the normalization coil $R_N$, a via for connecting the field generating coil portions 1161T, 1161B, and the upper and lower transmitter leads for the field generating coil portions 1161T, 1161B). In some implementations, such traces/vias/pads/leads may reduce the magnetic field into the receiver coils which can result in a signal offset if not compensated for. In some implementations, such offsets may be addressed by mirroring such features (e.g., on the opposite side of the central axis) within the symmetrical receiver coils with non-connected vias/pads/leads. For example, in one implementation, non-connected vias/pads/leads may be added within the coils BRSC4/TRSC4, each of which may mirror/be symmetrical with a corresponding connected via/pad/lead within the coils BRSC3/TRSC3 (e.g., five non-connected vias as well as upper and lower pads may be added within the coils BRSC4/TRSC4 that are each symmetrical with/mirror a corresponding connected via/pad/lead illustrated within the coils BRSC3/TRSC3).

As a specific illustrative example of such concepts, in FIG. 11 the via for connecting the portions of the normalization coil $R_N$ is designated as an electrically connected via VIA1C and is shown within the coils BRSC3/TRSC3. In accordance with the principles described above, a non-connected via VIA1D may be included within the coils BRSC4/TRSC4 that is symmetrical with/mirrors the corresponding connected via VIA1C illustrated within the coils BRSC3/TRSC3 (e.g., symmetrical with and mirrored relative to the central axis of the configuration). More specifically, the via VIA1D is at a location within the coils BRSC4/TRSC4 that is symmetrical with/mirrors the location of the via VIA1C within the coils BRSC3/TRSC3 (e.g., such that a line between the location of the via VIA1C and the location of the via VIA1D would pass through the central axis of the configuration and for which each location is equidistant from the central axis). The via VIA1D balances the offset that could otherwise be generated by the via VIA1C as described above. More specifically, the non-connected element VIA1D is located within the rotary sensing coils BRSC4/TRSC4 and is symmetrically opposite (i.e., relative to the central axis and/or axial direction) from the similar electronically connected element VIA1C which is located within the rotary sensing coils BRSC3/TRSC3, and for which the non-connected element VIA1D reduces a signal offset that would otherwise result in the signal components provided by the rotary sensing coils BRSC3/TRSC3 and BRSC4/TRSC4 due to the presence of the connected element VIA1C in the rotary sensing coils BRSC3/TRSC3.

In the implementation of FIG. 11, the via VIA1C for connecting the portions of the normalization coil $R_N$ is shown to be proximate to the vias for the connections for the axial sensing coil configurations TASCC, BASCC. The normalization coil $R_N$ includes an upper portion and a lower portion, wherein the upper portion is straight and extends radially and is connected by the via VIA1C to the lower portion that is also straight and also extends radially (for which the lower portion is located directly below the upper portion but which for simplicity of the illustration is not shown in FIG. 11 due to being obscured by other elements). In various implementations, the normalization coil $R_N$ is utilized to provide a measurement of the transmitter field (e.g., corresponding to the changing magnetic flux that is generated by the field generating coil configuration 1160), for which the measured signal may be relatively independent of (e.g., may be only nominally affected by) the position of the disruptor elements 1151T, 1151B. In various implementations, the position measurements may be scaled to this measured signal to make them relatively insensitive to variations in the transmitter amplitude (from the field generating coil configuration 1160). In various implementations, such processing may be performed by signal processing and control circuitry (e.g., the signal processing and control circuitry 380 of FIG. 2).

With reference to FIGS. 9A, 9B, 10 and 11, in a manner similar to that described above with reference to FIGS. 2-8F, the rotary sensing coil portion RSC (as illustrated TRSC1 to TRSC4 and BRSC1 to BRSC4) outputs at least first and second rotary signal components RSigs that are indicative of the rotary position (e.g., X and Y position signals) of the stylus coupling portion 342 (see FIG. 2) over corresponding signal lines, and the axial sensing coil configuration ASCC (as illustrated TASCC and BASCC) outputs one or more axial signal components ASigs that is indicative of the axial position (e.g., a Z position signal) of the stylus coupling portion over corresponding signal lines. In various implementations, signal processing and control circuitry 380 (see FIG. 2) receives the rotary signal components RSigs and the axial signal components ASigs, and may perform various levels of related signal processing in various implementations. For example, in one implementation, the signal processing and control circuitry may cause the signal components from various receiver coils to be combined and/or processed in various relationships, and provide the results in a desired output format as the rotary and axial position signal outputs RPSOut and APSOut, through an attachment portion 224 (see FIG. 2). With reference to FIG. 2, one or more receiving portions (e.g., in the CMM 200, motion controller 115, host computer 120, etc.) may receive the rotary and axial position signal outputs RPSOut and APSOut, and one or more associated processing and control portions may be utilized to determine a three-dimensional position of the stylus coupling portion 342 and/or of the contact portion of the attached stylus 306 as its contact portion 348 moves along a surface of a workpiece W that is being measured. The numbers, sizes and shapes of the receiver coils, the field generating coils, and the conductive plates or loops of the disruptor elements employed in various implementations may be selected based on desired operational characteristics, such as improved position sensing and reduced high-order non-linearities. It is noted that low order non-linearities may be calibrated by the CMM.

The implementations of FIGS. 9A, 9B, 10 and 11 may facilitate employing fewer mechanical components, as in some implementations only one board needs to be mounted (e.g., flexible cables between separate boards may not be needed). Such implementations also may facilitate improved repeatability and lower assembly costs as the receiver coils may have fewer degrees of freedom with respect to alignment, and thus may be less sensitive to tilt and rotation issues that may arise in multi-board implementations, for example, with respect to XY positioning signals.

Figure 12A:
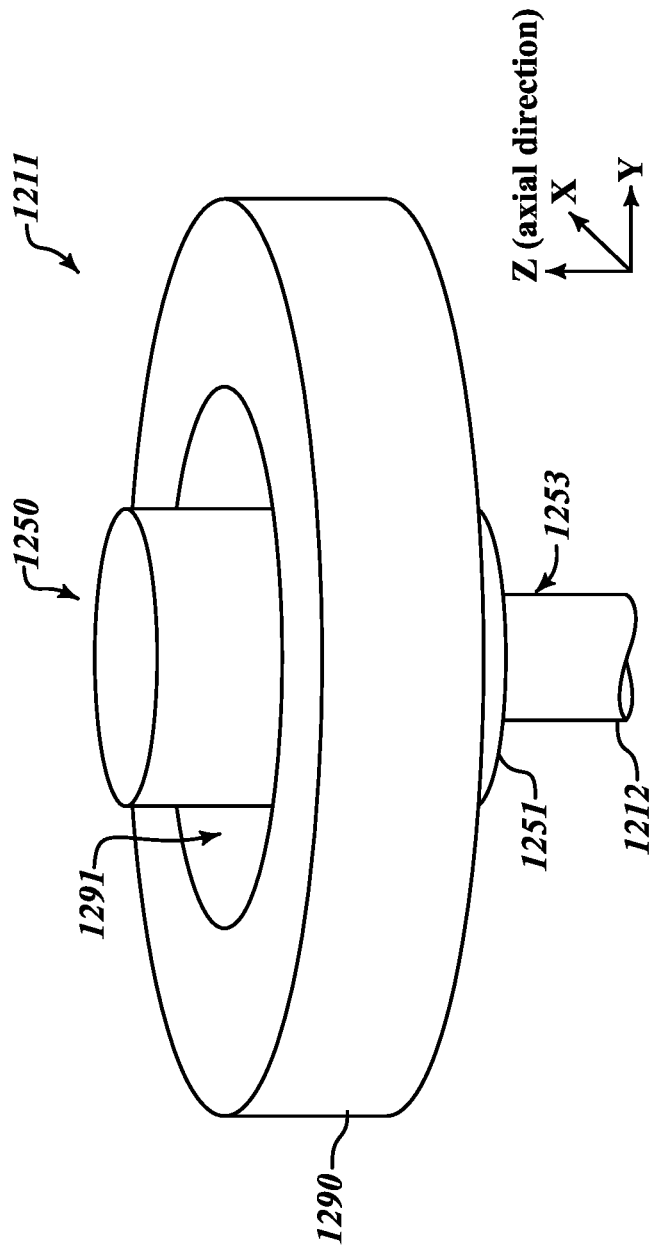
FIGS. 12A and 12B are diagrams showing portions of an exemplary implementation of a stylus position detection portion for detecting the position of the stylus suspension portion.
Figure 12B:
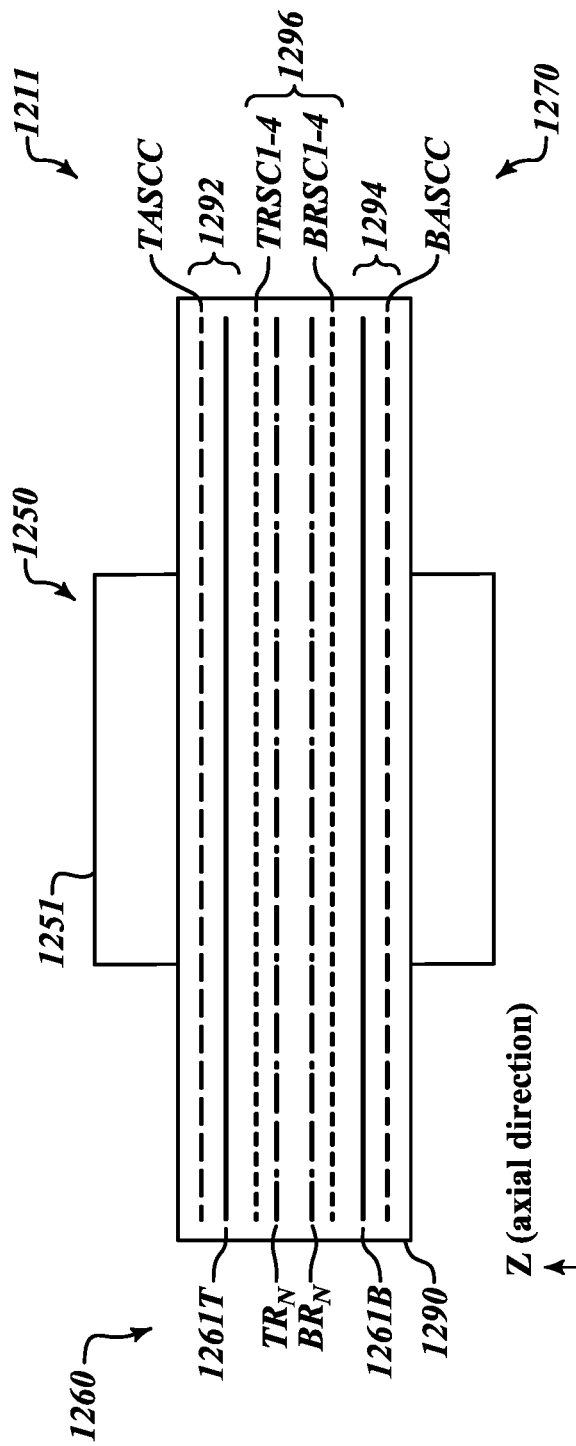

FIGS. 12A and 12B illustrate an alternative configuration of a stylus position detection portion 1211, which may be employed, for example, in the scanning probe 300 of FIG. 2 as the stylus position detection portion 311, in the implementation of FIG. 3 instead of the stylus position detection portion 411, in the implementation of FIG. 4 instead of the stylus position detection portion 511, etc. The stylus position detection portion 1211 uses inductive sensing principles and includes a disruptor configuration 1250 and a coil board configuration 1290. The disruptor configuration 1250 as illustrated comprises a generally cylindrical disruptor 1251. The coil board configuration 1290 as illustrated comprises a generally disc-shaped structure, and is illustrated in more detail in FIG. 12B.

As illustrated, the disruptor 1251 is positioned within a center opening 1291 of the coil board configuration 1290, and extends in the Z direction of the disc-shaped coil board configuration 1290. In the example of FIGS. 12A and 12B, the disruptor 1251 is illustrated as extending in the Z direction above and below the coil board configuration 1290, although it will be appreciated that in other implementations this may not be the case (e.g., in various alternative implementations the disruptor 1251 may be even with, or shorter than the coil board configuration 1290 in the Z direction). In various implementations, rather than the height along the Z direction, it is the cylindrical shape of the disruptor 1251 which is the more important factor (e.g., which results in various desirable operating characteristics, as will be described in more detail below, such as with respect to FIGS. 14A-14D, etc.)

The coil board configuration 1290 includes a field generating coil configuration 1260, as illustrated having two transmission coils 1261T and 1261B, and a receiver coil portion 1270. The receiver coil portion 1270 may comprise rotary sensing coil portions (also referred to as rotary sensing coils) RSC (e.g., for sensing motion transverse to the axial direction, as described above with respect to FIGS. 3-6, etc.) and axial sensing coil configurations ASCC (e.g., for sensing motion along the axial direction, as described above with respect to FIGS. 3-6, etc.).

Briefly, the moving disruptor element 1251 (or more generally, the disruptor configuration 1250) causes position-dependent variations in a changing magnetic field generated by the field generating coil configuration 1260. The receiver coil portion 1270 is responsive to the changing magnetic field and the variations therein caused by the disruptor element 1251.

As illustrated, the coil board configuration 1290 comprises a first board portion 1292, including a top axial sensing coil TASCC, and a field generating coil 1261T, a second board portion 1294, including a bottom axial sensing coil BASCC, and a field generating coil 1261B, and a center board portion 1296 positioned between the first board portion 1292 and the second board portion 1294. The center board portion 1296 includes top rotary sensing coils TRSC1-4, a top normalization coil TRN, a bottom normalization coil BRN, and bottom rotary sensing coils BRSC1-4.

The coil board configuration 1290 is mounted in a fixed relationship to the frame of a scanning probe (see scanning probe 300 of FIG. 2 and frame 408 of FIG. 4), with the second board portion 1294 of the coil board configuration 1290 closer to the stylus suspension portion 307/407 (see FIGS. 2 and 3). The first board portion 1292, the second board portion 1294 and center board portion 1296 of the coil board configuration 1290 are nominally parallel to one another and nominally orthogonal to a central axis CA (see FIG. 3) of a scanning probe 300 (see FIG. 2). The coil board configuration 1290 may comprise, for example, a two-sided substrate or printed circuit board having coils fabricated as printed conductors in layers of the substrate or printed circuit board, free-standing coils fastened to a substrate or printed circuit board, etc., and/or various combinations thereof.

In various implementations, the disruptor element 1251 of the disruptor configuration 1250 may comprise a conductive cylinder that provides a disruptor area, and the disruptor element 1251 is located along the central axis CA (see FIG. 3) in a disruptor motion volume extending on opposite sides of the coil board configuration 1290. The disruptor element 1251 is coupled to the stylus suspension portion 307/407 (see FIGS. 2 and 3) in a fixed relationship relative to one another by a coupling configuration 1253, including an upper portion of a moving member 1212 (e.g., similar to the moving member 412 of FIG. 3). The disruptor element 1251 moves in the disruptor motion volume relative to an undeflected position in response to a deflection of the stylus suspension portion 307/407 (see FIGS. 2 and 3), the disruptor element moving over operating motion ranges +/−Rz along the axial direction in response to the axial motion, and over respective operating motion ranges +/−Rx and +/−Ry along respective orthogonal X and Y directions that are orthogonal to the axial direction in response to the rotary motion. The field generating coil configuration 1260 generates a changing magnetic flux generally along the axial direction in the disruptor motion volume in response to a coil drive signal.

As described above with respect to FIG. 11, in various implementations, the top and bottom normalization coils TRN and BRN may be utilized to provide a measurement of the transmitter field (e.g., corresponding to the changing magnetic flux that is generated by the field generating coil configuration 1260), for which the measured signal may be relatively independent of (e.g., may be only nominally affected by) the position of the disruptor element 1251. In various implementations, the position measurements may be scaled to this measured signal to make them relatively insensitive to variations in the transmitter amplitude (from the field generating coil configuration 1260). In various implementations, such processing may be performed by signal processing and control circuitry (e.g., the signal processing and control circuitry 380 of FIG. 2).

FIGS. 13A to 13F illustrate an implementation of a stylus position detection portion 1311 that is similar to a stylus position detection portion 1211 shown in FIGS. 12A and 12B, emphasizing certain aspects according to principles disclosed herein.

Figure 13A:
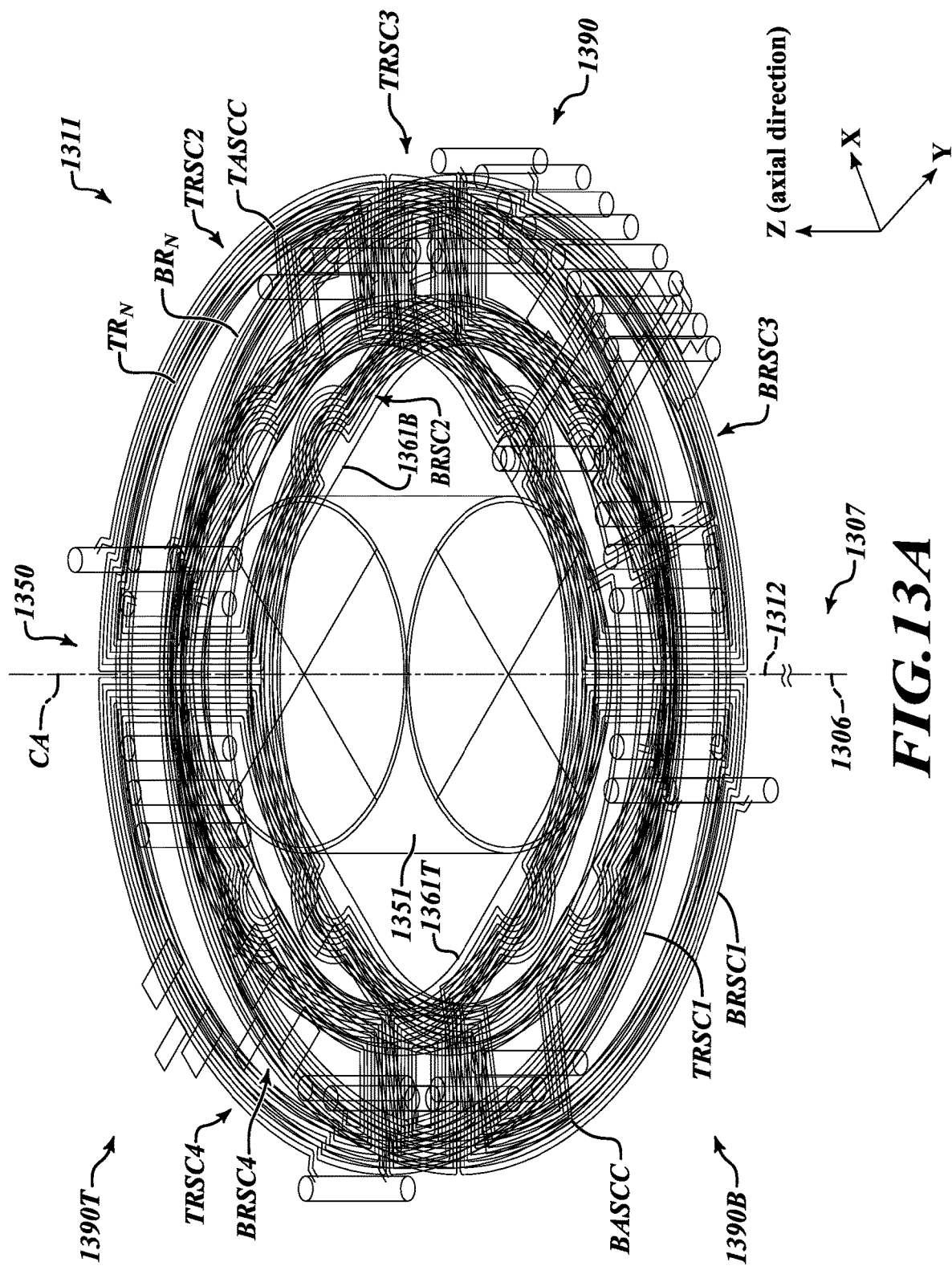
FIG. 13A is a partially schematic isometric diagram of an exemplary implementation of a stylus position detection portion, emphasizing certain aspects according to principles disclosed herein.

FIG. 13A is a partially schematic isometric diagram of an implementation of a stylus position detection portion 1311 that is similar to a stylus position detection portion 1211 shown in FIGS. 12A and 12B, emphasizing certain aspects according to principles disclosed herein. In general, the stylus position detection portion 1311 includes certain components that are similar to those of the stylus position detection portions 311, 411, 511 and 911 of FIGS. 2, 3, 4, 9A and 9B, and will be understood to operate similarly except as otherwise described below. The configuration of a stylus position detection portion 1311, may be employed, for example, in the scanning probe 300 of FIG. 2 as the stylus position detection portion 311, in the implementation of FIG. 3 instead of the stylus position detection portion 411, in the implementation of FIG. 4 instead of the stylus position detection portion 511, in the implementation of FIGS. 9A and 9B instead of the stylus position detection portion 911, in the implementation FIGS. 12A and 12B instead of the stylus position detection portion 1211, etc.

In the implementation shown in FIG. 13A, the stylus position detection portion 1311 comprises a coil board configuration portion 1390 and a disrupter configuration 1350. In various implementations, disruptor element 1351 (or more generally the disruptor configuration 1350) comprises a conductive cylinder, or any other desired operational configuration that provides a disruptor area (e.g., its interior area). As illustrated in FIG. 13A, the disruptor element 1351 comprises a conductive cylinder. The disruptor element 1351 is located along the central axis CA in the disruptor motion volume MV, which extends on opposite sides of the coil board configuration 1390, and is coupled to a stylus suspension portion by a coupling configuration (e.g., comprising at least an upper portion of a moving member 1312 that is similar to the moving member 412 of FIG. 3). For purposes of explanation, the disruptor element 1350 moves relative to the undeflected position illustrated in FIG. 13A (e.g., similar to the undeflected position UNDF, in FIG. 3) in response to a deflection of a stylus suspension portion 1307 and/or a stylus 1306 and/or the moving member 1312 (e.g., which may be similar or identical to the stylus suspension portion 407, stylus 406 and moving member 412 of FIG. 3). The disruptor element 1351 may be described as moving with displacement increments ΔZ over an operating motion range +/−Rz along the axial direction in response to axial motion, and with respective displacement increments ΔX and ΔY over respective operating motion ranges +/−Rx and +/−Ry along orthogonal X and Y directions that are orthogonal to the axial direction (Z direction) in response to rotary motion.

The coil board configuration 1390 includes a top coil board portion 1390T and a bottom coil board portion 1390B. The top coil board portion 1390T includes a top axial sensing coil configuration TASCC (e.g., comprising the single illustrated individual coil in this implementation), at least a first top field generating coil configuration 1361T, N top rotary sensing coils TRSC (e.g., as illustrated TRSC1-TRSC4, where N=4), and a top normalization coil configuration $TR_N$. The bottom coil board portion 1390B includes a bottom normalization coil configuration $BR_N$, N bottom rotary sensing coils BRSC (e.g., as illustrated BRSC1-BRSC4, where N=4), at least a first bottom field generating coil configuration 1361B, and a bottom axial sensing coil configuration BASCC (e.g., comprising the single illustrated individual coil in this implementation).

The coil board configuration 1390 is mounted in a fixed relationship to the frame of the scanning probe (e.g., frame 408 of FIG. 4) with the bottom coil board portion 1390B closer to the stylus 1306 and/or the stylus suspension portion 1307. It should be appreciated with respect to the various sensing coils shown in FIG. 13A, all coils comprise at least one of windings or conductors that have first and second connection ends (e.g., as represented in FIG. 6) that are configured to operate as one or more inductively coupled "turns." As illustrated, the top and bottom axial sensing coil configurations TASCC and BASCC, as well as the top and bottom rotary sensing coil configurations TRSC and BRSC, are nominally symmetrically spaced with respect to the disruptor configuration 1350 and the corresponding position of the disruptor element 1351. Other configurations are possible (e.g., the rotary sensing coil configurations TRSC and BRSC may not be nominally centered relative to the disruptor configuration 1350 in some implementations).

As illustrated in FIG. 13A, the at least a first top field generating coil configuration comprises a single field generating coil 1361T, which has an area larger than an area of the disruptor element 1351, the at least a first bottom field generating coil configuration comprises a single field generating coil 1361B, which has an area larger than an area of the disruptor element 1351. The top coil board portion 1390T, and the bottom coil board portion 1390B are nominally planar, nominally parallel to each other and nominally orthogonal to the central axis CA.

FIGS. 13B to 13E illustrate example implementations of coils of the coil board configuration 1390 of FIG. 13A. FIG. 13F illustrates an example layering of the coils in the coil board configuration 1390 of FIG. 13A. FIGS. 13A to 13E illustrate connecting pads or vias (see FIG. 13B), which may be similar to connecting pads or vias as discussed above in the description of FIG. 11.

Figure 13B:
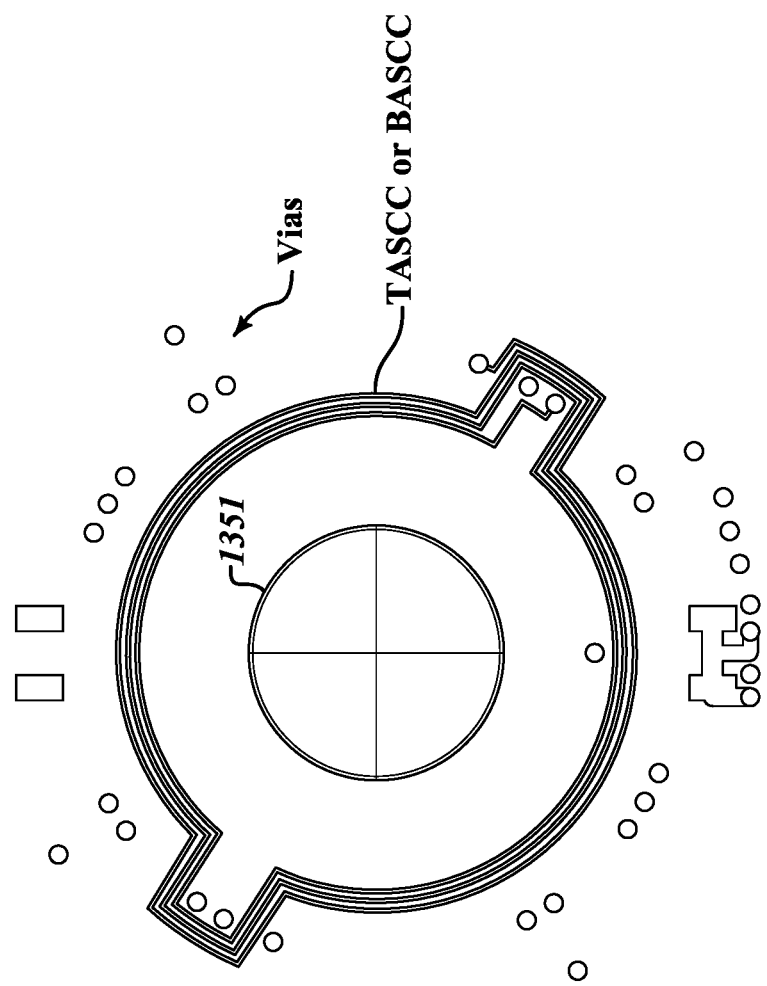

In FIG. 13B, an example implementation of the top axial sensing coil configuration TASCC or of the bottom sensing axial coil configuration BASCC is shown. As illustrated, a single coil is employed as the top axial coil configuration TASCC and a single coil is employed as the bottom axial coil configuration BASCC.

In FIG. 13C, an example implementation of the top field generating coil configuration 1361T or of the bottom field generating coil configuration 1361B is shown. As illustrated, a single coil is employed as the top field generating coil configuration 1361T and a single coil is employed as the bottom field generating coil configuration 1361B.

Figure 13D:
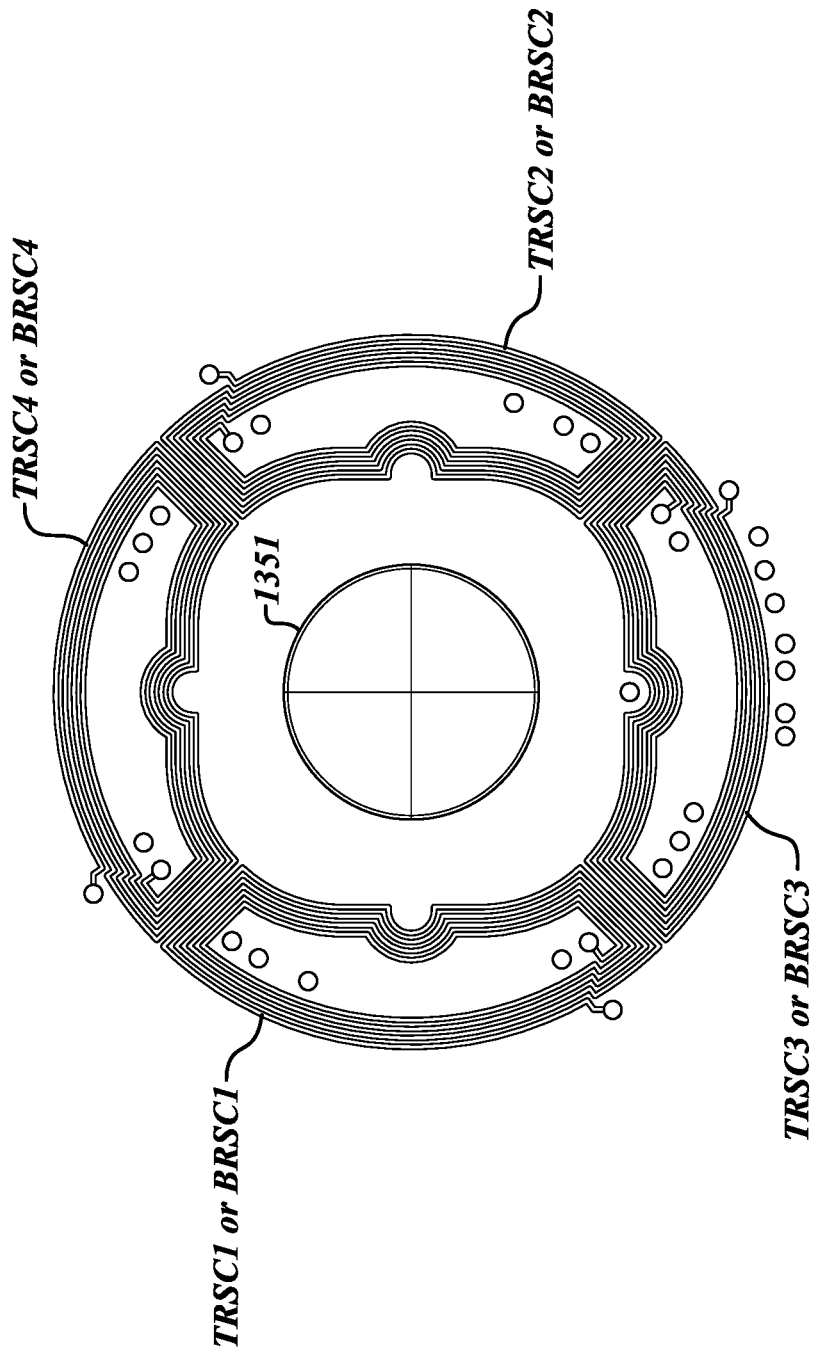

In FIG. 13D, an example implementation of the top rotary sensing coil configuration TRSC or of the bottom rotary sensing coil configuration BRSC is shown. As illustrated, four coils TRSC1-4 are employed as the top rotary sensing coil configuration TRSC and four coils BRSC1-4 are employed as the bottom rotary sensing coil configuration BRSC.

Figure 13E:
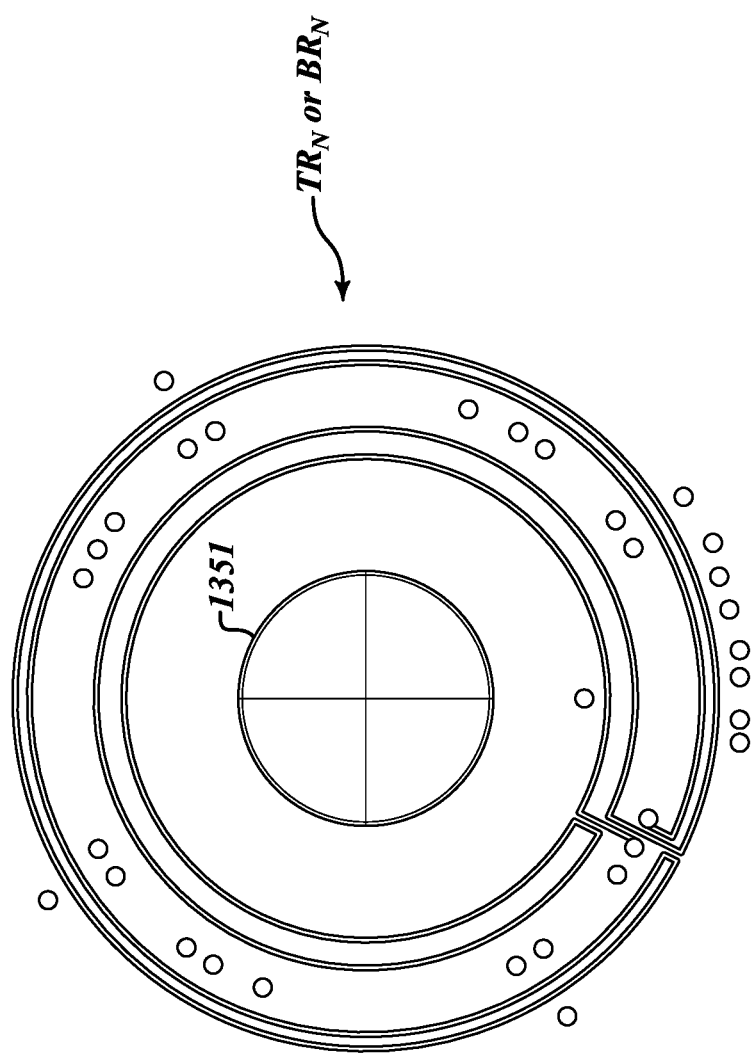
Figure 13F:
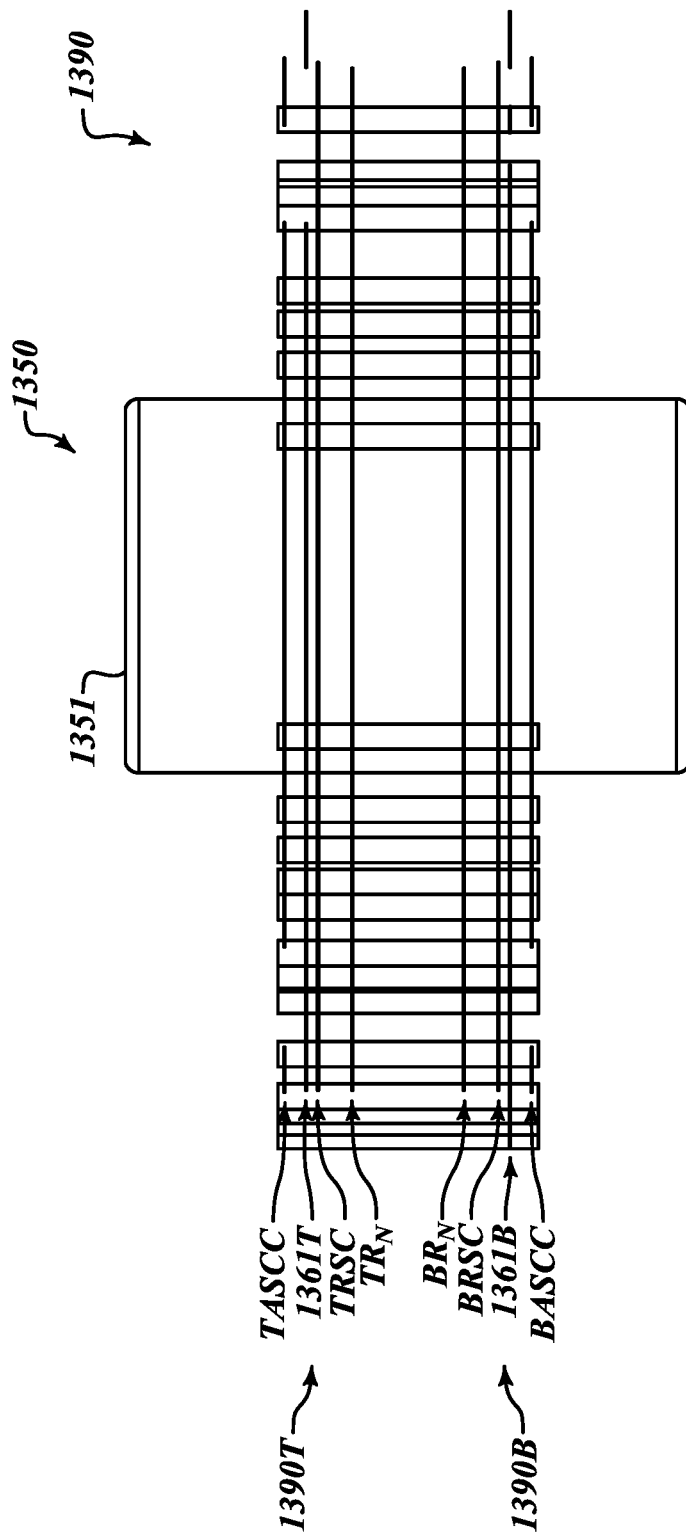

In FIG. 13E, an example implementation of the top normalization coil configuration $TR_N$ or of the bottom normalization coil configuration $TR_B$ is shown. As illustrated, a single coil is employed as the top normalization coil configuration $TR_N$ and a single coil is employed as the bottom normalization coil configuration $TR_B$.

In FIG. 13F, an example implementation of layers of the coil configuration 1390 is shown. As discussed above with reference to FIG. 13A, the coil board configuration 1390 includes a top coil board portion 1390T and a bottom coil board portion 1390B. The top coil board portion 1390T, in order, includes a first layer having a top axial sensing coil configuration TASCC, a second layer including at least a first top field generating coil configuration 1361T, a third layer including N top rotary sensing coils TRSC, and fourth layer including a top normalization coil configuration $TR_N$. The bottom coil board portion 1390B generally mirrors the top coil board configuration, and includes a first layer having a bottom normalization coil configuration $BR_N$, a second layer having N bottom rotary sensing coils BRSC, a third layer having at least a first bottom field generating coil configuration 1361B, and a fourth layer having a bottom axial sensing coil configuration BASCC. The disruptor element 1351 as illustrated is a conductive cylinder that extends above and below the coil board configuration.

As discussed above, in the illustrated implementations of FIGS. 3, 4 and 5, the disruptor element is positioned inside the field generating coil elements (e.g., disruptor element 551 of FIG. 4 fits inside the field generating coil 561), and an area of the disruptor element is smaller than an area of the field generating coil elements. In the illustrated implementations of FIGS. 9A, 9B and 10, the disruptor elements are positioned parallel to the field generating coil elements (e.g., the disruptor elements 1051T, 1051B are positioned above and below the field generating coil 1061). In the illustrated implementations of FIGS. 12A, 12B, and 13A to 13F, the single tall cylindrical disruptor element 1251/1351 fits within the hole 1291 which is surrounded by the coil elements, and for which the configuration provides increased flexibility with respect to the relative sizes and positions of the coil configuration board elements, while also utilizing a single printed circuit board (e.g., for which the top board portion and the bottom board portion may comprise portions of a single multilayer printed circuit board) which may reduce cost and complexity relative to configurations utilizing multiple printed circuit boards. In addition, as discussed in more detail below with respect to FIGS. 14A to 14D, in the implementations of FIGS. 12A, 12B, and 13A to 13F, significant reductions in the resonant frequency change (RFC) occurring as a result of displacements along the Z axis, as well as reductions in off-axis cross talk, may be obtained, resulting in better overall performance of the CMM.

The implementations of FIGS. 12A, 12B, and 13A to 13F may facilitate employing fewer mechanical components, as in some implementations only one board needs to be mounted (e.g., flexible cables between separate boards may not be needed), and a single tall disruptor element may be employed, which does not need to be disassembled to install or remove the board. Such implementations also may facilitate improved repeatability and lower assembly costs as the receiver coils may have fewer degrees of freedom with respect to alignment, and thus may be less sensitive to tilt and rotation issues that may arise in multi-board implementations, for example, with respect to XY positioning signals. Such implementations also may improve off-axis cross talk, frequency stability, and linearity.

Figure 14A:
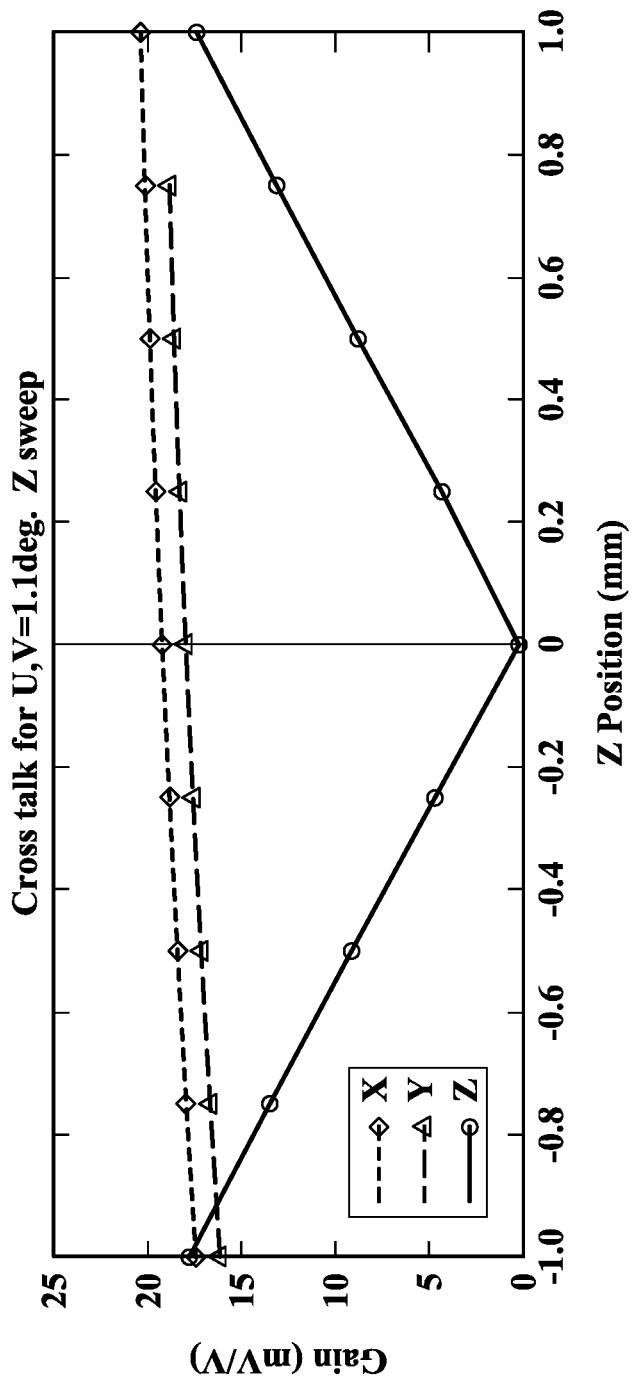
FIGS. 14A to 14D illustrate example frequency shift and off-axis cross talk characteristics associated with various implementations of a stylus position detection portion.
Figure 14B:
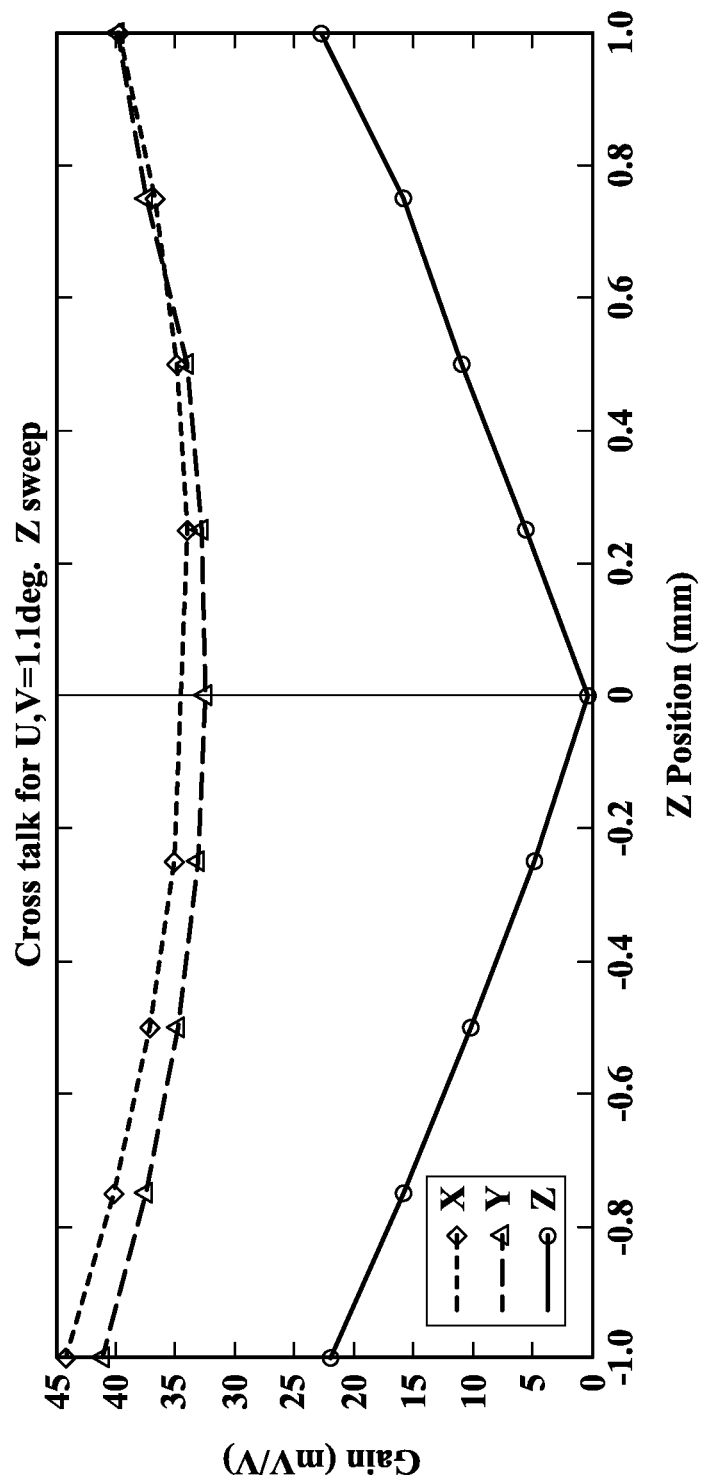
Figure 14C:
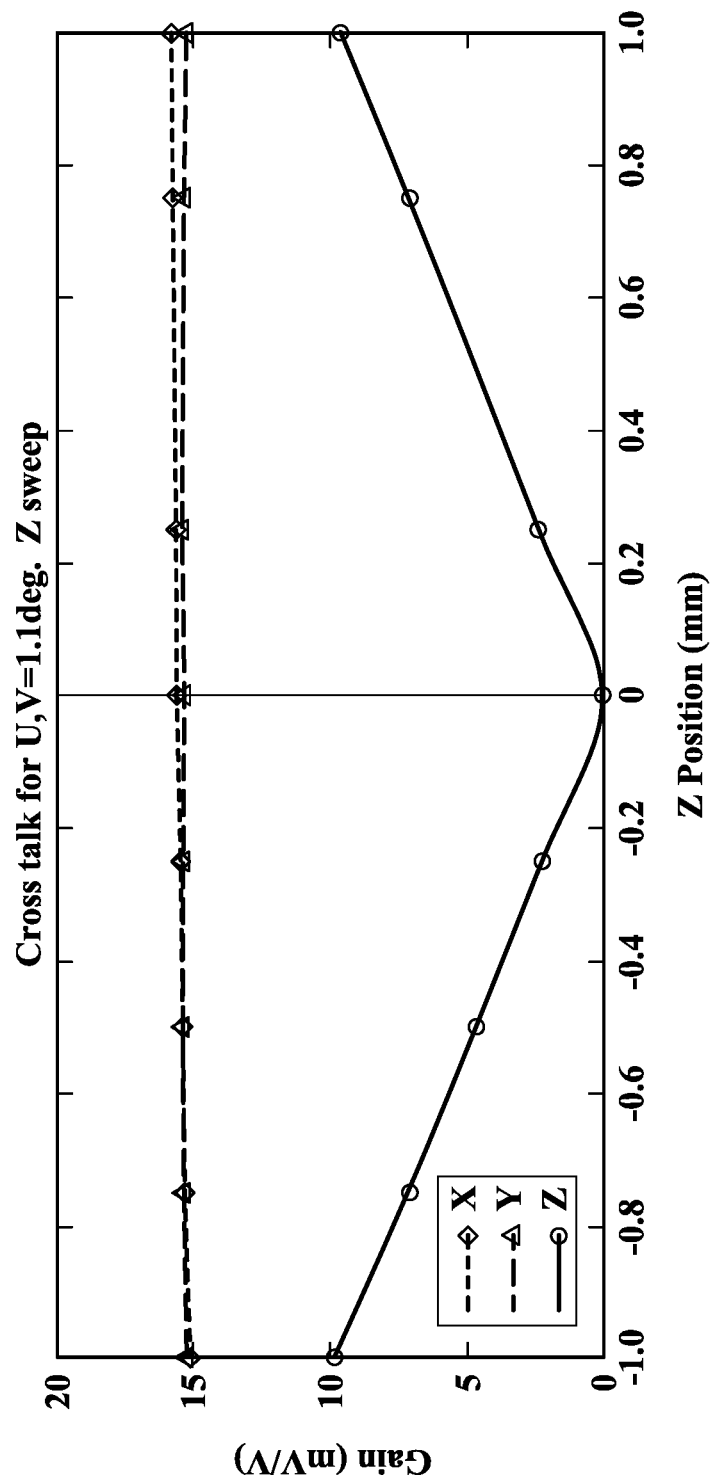

FIGS. 14A to 14C illustrate example frequency shift and off-axis cross talk errors for the embodiments illustrated in FIGS. 3, 4 and 5, the embodiments illustrated in FIGS. 9A, 9B and 10, and the embodiments illustrated in FIGS. 12A, 12B, and 13A to 13F. FIG. 14A illustrates an example off-axis cross talk error of the embodiments illustrated in FIGS. 3, 4 and 5 as the displacement of the disruptor (e.g., disruptor 551 of FIG. 4) along the Z axis is swept from −1 mm to +1 mm, and with U,V=1.1 degrees. FIG. 14B illustrates an example off-axis cross talk error of the embodiments illustrated in FIGS. 9A, 9B and 10 as the displacement of the disruptor (e.g., disruptor 950 of FIG. 9A) along the Z axis is swept from −1 mm to +1 mm, and with U,V=1.1 degrees. FIG. 14C illustrates an example off-axis cross talk error of the embodiments illustrated in FIGS. 12A, 12B and 13A to 13F as the displacement of the disruptor (e.g., disruptor 1250 of FIG. 12A) along the Z axis is swept from −1 mm to +1 mm, and with U,V=1.1 degrees. In each of the FIGS. 14A-14C, the V-shaped Z signal is the primary (linear) positioning signal, and the X and Y signals illustrate the size of the cross talk in the U,V directions. As can be seen, the off-axis cross talk error is highest for the embodiments of FIGS. 9A, 9B and 10, and is in the range of 32-45 mV/V for the X and Y axes, for which 40% of the nominal signal range is thus cross talk (i.e., (45−32)/32=40%). The embodiments of FIGS. 3, 4 and 5 have off-axis cross talk error in the range of 16-20 mV/V for the X and Y axes, for which 25% of the nominal signal range is thus cross talk (i.e., (20−16)/16=25%), providing some improvement. The off-axis cross talk error is lowest for the embodiments of FIGS. 12A, 12B and 13A to 13F, and is in the range of 15-16 mV/V for the X and Y axes, for which 7% of the nominal signal range is thus cross talk (i.e., (16−15)/15=7%).

Figure 14D:
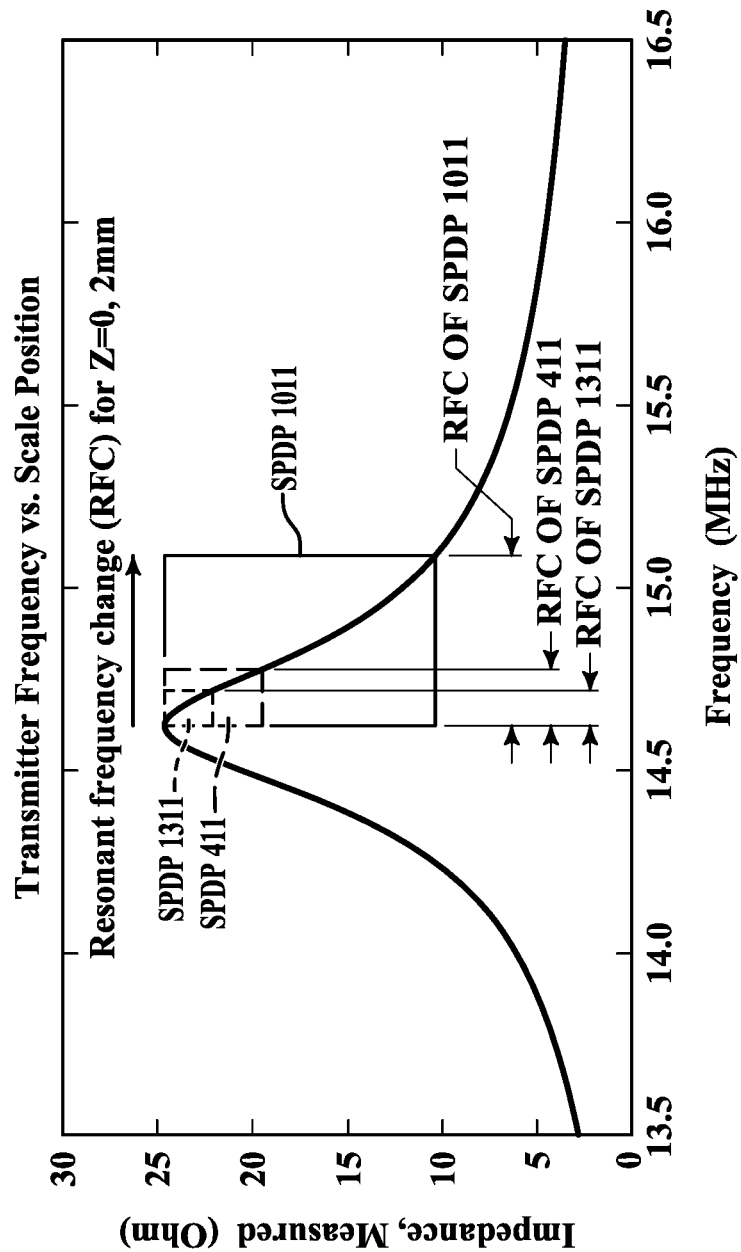

FIG. 14D illustrates example resonant transmitter frequency changes as the stylus position detection portion (SPDP) displacement is varied between zero mm and 2 mm for the embodiments illustrated FIGS. 3, 4 and 5, the embodiments illustrated in FIGS. 9A, 9B and 10, and the embodiments illustrated in FIGS. 12A, 12B, and 13A to 13F. At a displacement of zero mm, the resonant frequency is the same for the various embodiments. The resonant frequency change (RFC) at an SPDP displacement of 2 mm is largest for the embodiments of FIGS. 9A, 9B and 10 (labeled as SPDP 1011 in FIG. 14D), is smallest for the embodiments of FIGS. 12A, 12B and 13A-13F (labeled as SPDP 1311 in FIG. 14D), with the embodiments of FIGS. 3, 4, and 5 (labeled as 411 in FIG. 14D) having a RFC slightly larger than that of the embodiments of FIGS. 12A, 12B and 13A to 13F, but significantly smaller than that of the embodiments of FIGS. 9A, 9B and 10. As can be seen, the embodiments of FIGS. 12A, 12B and 13A to 13F have less change in inductance as the displacement along the Z axis is varied, resulting in a small RFC with disruptor position, in addition to having the smallest off-axis cross talk.

In various implementations, at least some signal offset errors may occur due to printed circuit board (PCB) manufacturing tolerances, such as layer to layer coil registration errors, particularly for single board implementations. For example, misalignments between field generating coil configurations and rotary sensing coil configurations (RSC) may occur due to PCB manufacturing tolerances. In accordance with principles disclosed herein, one or more misalignment compensation elements may be added to a coil board configuration to compensate for misalignments of coils (e.g., coils of the coil configurations of the first, second and/or center board portions, etc.) with respect to each other. More specifically, as will be described in more detail below, in various implementations one or more misalignment compensation element may be configured/utilized to reduce a signal offset that results from a misalignment of at least one coil of the coil board configuration (e.g., the coil board configuration may comprise a PCB with a plurality of layers in which the coils are located and the misalignment of the at least one coil may result from a registration error, such as within manufacturing tolerances, in a layer to layer registration as part of a fabrication process).

Figure 15B:
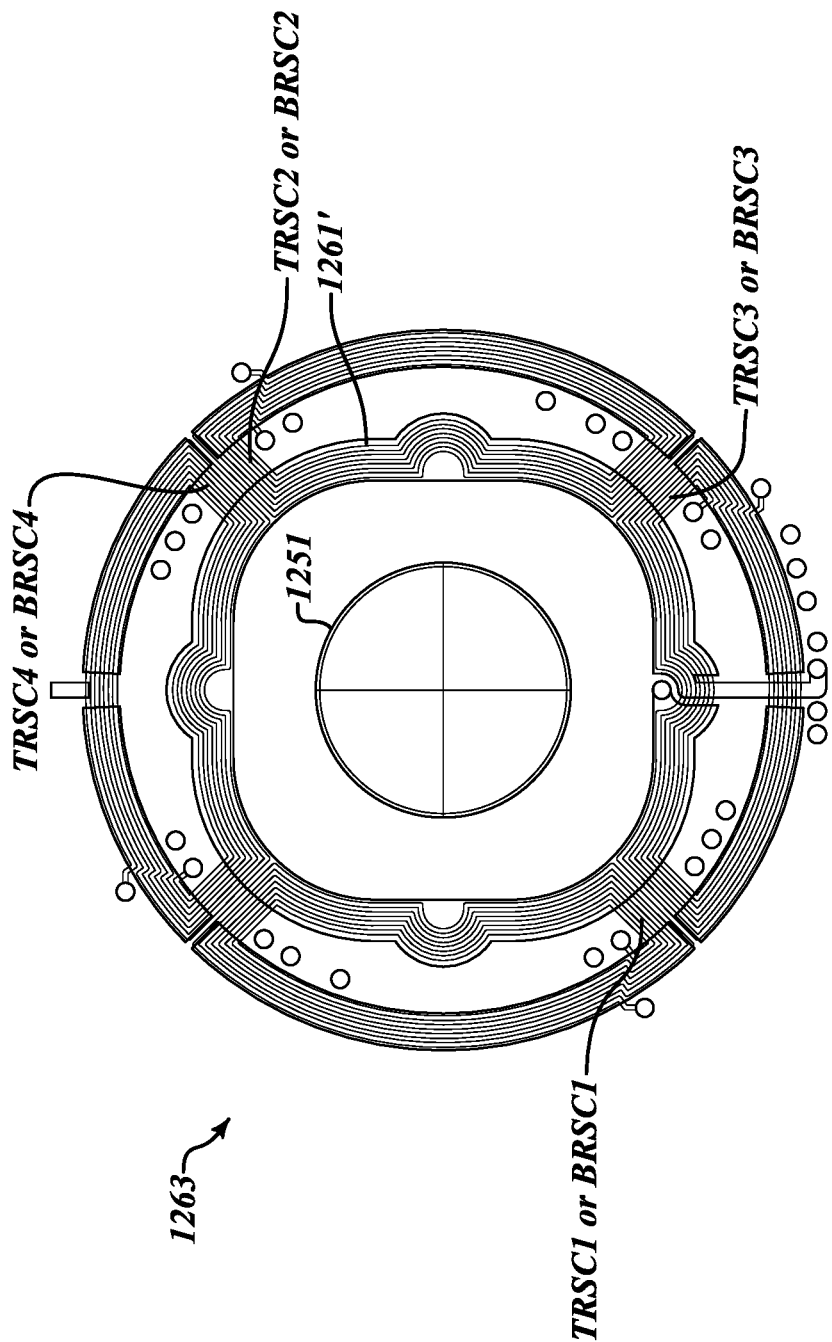
Figure 15C:
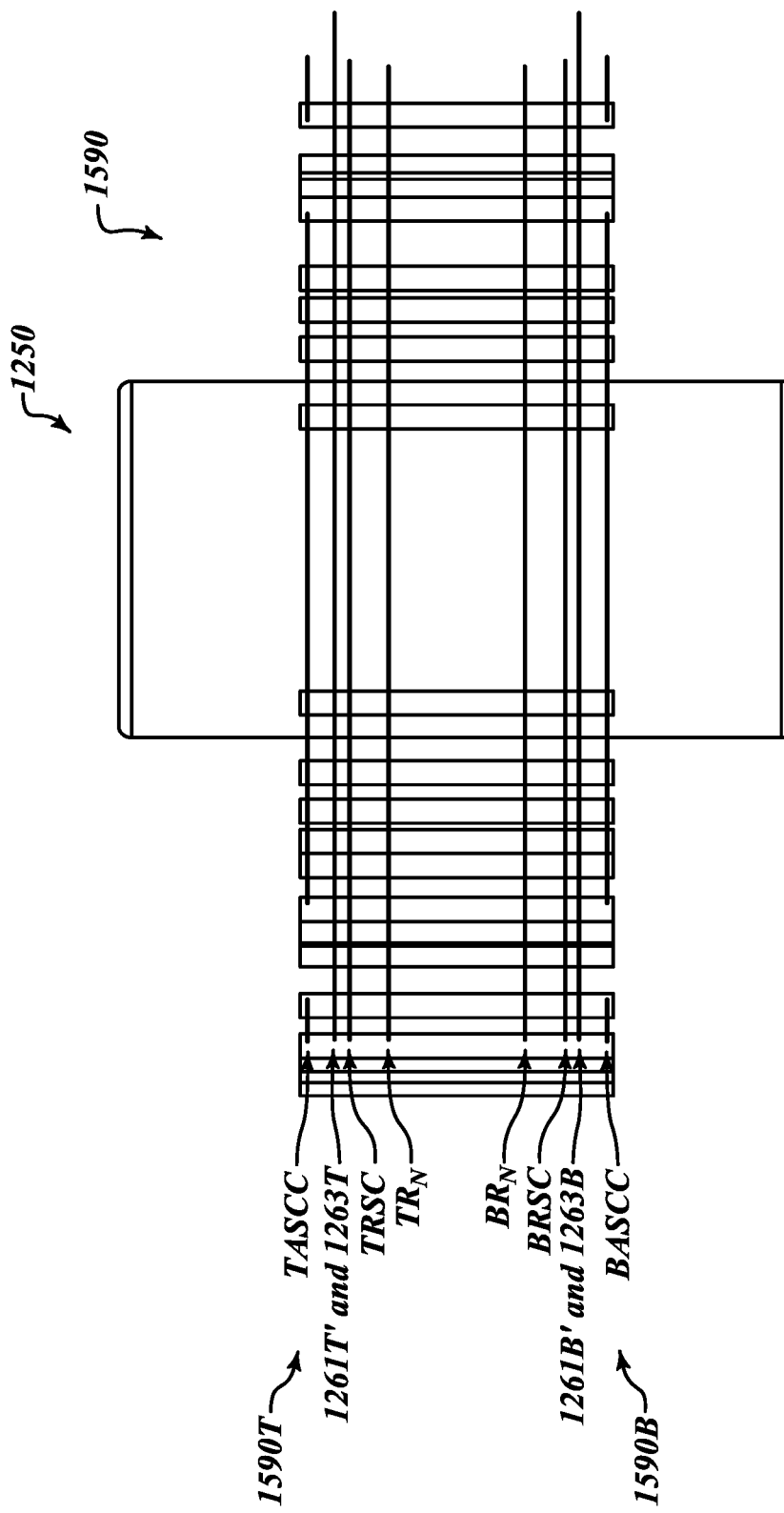

FIGS. 15A to 15C illustrate an embodiment in which misalignment compensation elements take a form of shielding added to reduce the effect of registration errors between a field generating coil configuration (e.g., field generating coils 1261T and 1261B of FIG. 12B) and a rotary sensing coil configuration (e.g., TRSC1-4 and BRSC1-4 of FIG. 12B). FIG. 15A illustrates an inner shielding 1261' in which copper pads are added to the field generating coils (e.g., 1261T and 1261B of FIG. 12B) and an outer shielding 1263, in which copper pads are positioned outside the shielded field generating coil 1261'. FIG. 15B is a top view illustrating an alignment of a shielded field generating coil 1261' and outer shielding 1263 with a rotary sensing coil configuration RSC (e.g., TRSC1-4 or BRSC1-4) with respect to the center axis of the stylus position detection portion (e.g., center axis CA of FIG. 13A). As illustrated, copper pads are added to the field generating coils 1261 to broaden an area of the shielded field generating coil 1261' to generally match an area of inner loops of the rotary sensing coils RSC, and the copper pads of the outer shielding are shaped and positioned to generally match an area of the outer loops of the rotary sensing coils RSC.

In FIG. 15C, an example implementation of layers of a coil board configuration 1590 is shown. As illustrated, the coil board configuration 1590 includes a top coil board portion 1590T and a bottom coil board portion 1590B. The top coil board portion 1590T, in order, includes a first layer having a top axial sensing coil configuration TASCC, a second layer including at least a first shielded top field generating coil configuration 1261T' and an outer shielding 1263T, a third layer including N top rotary sensing coils TRSC, and fourth layer including a top normalization coil configuration TR$_N$. The bottom coil board portion 1590B generally mirrors the top coil board configuration, and includes a first layer having a bottom normalization coil configuration BR$_N$, a second layer having N bottom rotary sensing coils BRSC, a third layer having at least a first shielded bottom field generating coil configuration 1261B' and outer shielding 1263B, and a fourth layer having a bottom axial sensing coil configuration BASCC.

Some embodiments may employ inner shielding (e.g., shielded field generating coil 1261') without employing outer shielding (e.g., outer shielding 1263), some embodiments may employ outer shielding (e.g., outer shielding 1263) without employing inner shielding (e.g., shielded field generating coil 1261'), some embodiments may employ both inner shielding (e.g., shielded field generating coil 1261') and outer shielding (e.g., outer shielding 1263). The shielding 1261', 1263, makes the field generated smaller and more uniform at the edges of the rotary sensing coils, reducing the effect of registration errors between the field generating coils and the rotary sensing coils. As shown in the table below, including inner and outer shielding may facilitate reducing offsets by 77% with only a 5% reduction in gain.

| Configuration | XY Gain (mV/V/mm) | Offset per 100 um mis-registration (%) | XY_L (nH) | Tx_L (nH) | Tx_R (Ohm) |
| --- | --- | --- | --- | --- | --- |
| No Added Shielding | 53.17 | 36.5 | 1656 | 66.3 | 0.127 |
| Inner Shielding | 50.82 | 13.26 | 1621 | 66.3 | 0.152 |
| Inner & Outer Shielding | 50.63 | 8.4 | 1501 | 60.3 | 0.152 |

Figure 16:
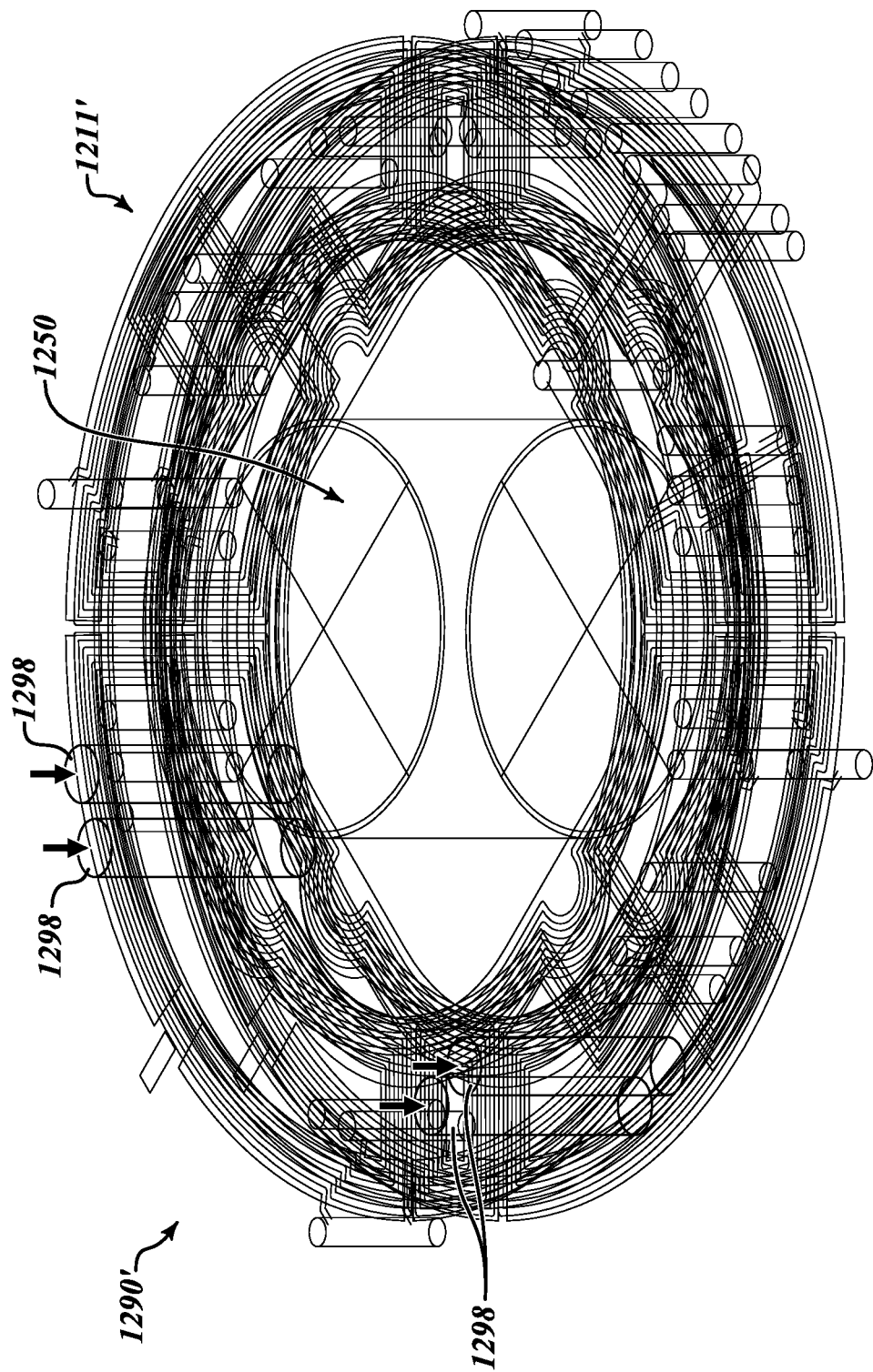
FIG. 16 is a partially schematic isometric diagram of an exemplary implementation of a stylus position detection portion, emphasizing certain aspects according to principles disclosed herein.

With reference to FIG. 12B, FIG. 16 illustrates an exemplary implementation of a stylus position detection portion 1211' in which misalignment compensation elements in the form of pins 1298 (e.g., which in various implementations may comprise pins, pads, etc.) are added to a coil board configuration to compensate for signal offset errors by introducing a compensating offset signal. In various implementations, the pins may extend through the entire coil board configuration or through only a portion thereof, or may be positioned in a layer of the coil board configuration. As illustrated, the one or more pins may comprise a plurality of pins positioned on one side of the coil board configuration 1290' with respect to a plane including the central axis (e.g., see FIG. 13A), wherein the pins are generally parallel to the central axis and compensate for a misalignment of one or more rotary sensing coils with respect to a field generating coil configuration. More specifically, in various implementations the placement of the pins may be utilized to either increase or decrease the magnetic field through the individual coils, so as to compensate for a misalignment of the coils.

Figure 17A:
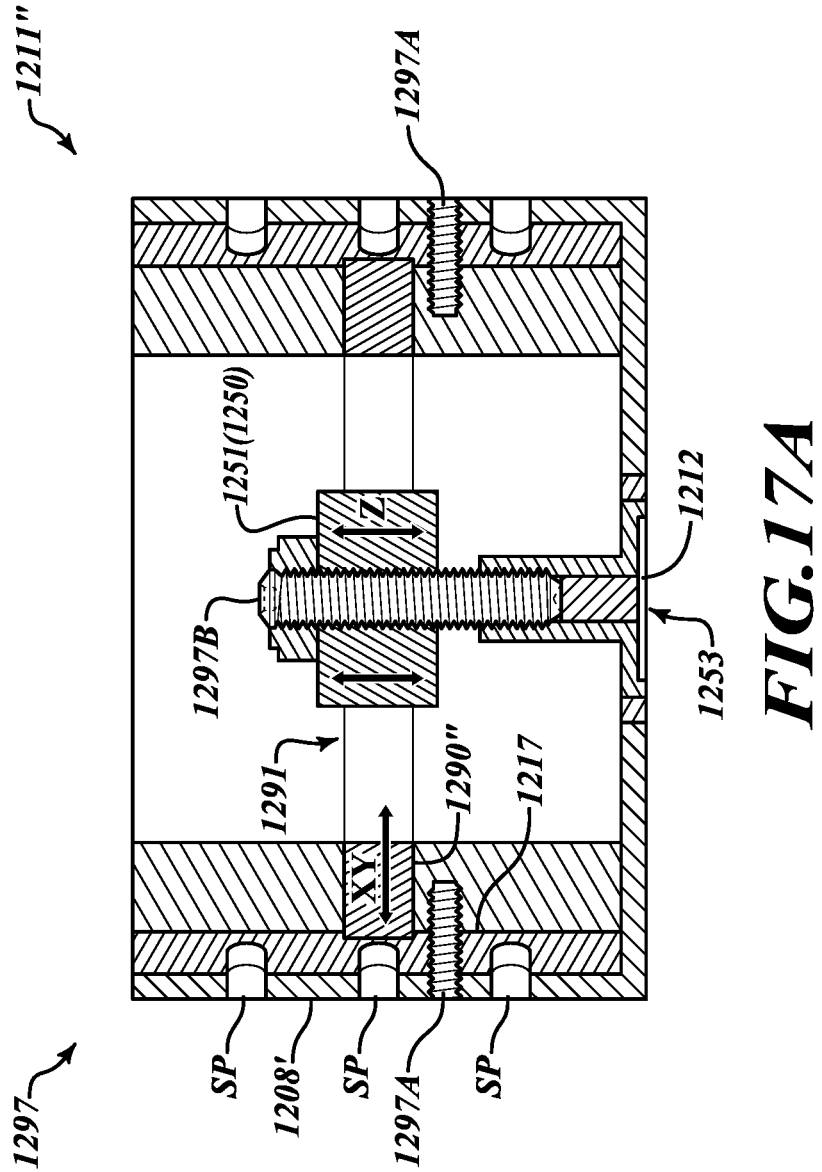
FIGS. 17A and 17B are diagrams showing portions of exemplary implementations of stylus position detection portions, emphasizing certain aspects according to principles disclosed herein.

With reference to FIG. 12B, FIG. 17A illustrates an exemplary implementation of a stylus position detection portion 1211" in which a mechanical adjustment mechanism 1297 is employed to adjust a relative position of the coil board configuration 1290" and/or the disruptor configuration 1250 (e.g., a relative X, Y and/or Z position of the coil board configuration 1290" or the disruptor configuration 1250 with respect to each other and/or with respect to the housing/enclosure of the coil board configuration, etc.) In various implementations, the coil board configuration 1290" may include additional spacing (e.g., around the edges and/or in the center, etc.) to allow for the adjustable positioning range. It will be appreciated that the mechanical adjustment mechanism 1297 may be utilized to reduce a misalignment condition. In an exemplary embodiment, gross compensation for a misalignment may be provided using one or more other misalignment compensation elements (e.g., pads or pins 1298 of FIG. 16, the shielding 1261', 1263 of FIGS. 15A to 15C, the adjustable coils TASCC of FIGS. 18A to 18C (discussed below), etc., and/or various combinations thereof), with position fine tuning provided by the mechanical adjustment mechanism 1297, to reduce any residual misalignment errors or improve the effectiveness of other misalignment compensation elements.

As illustrated, the mechanical position adjustment mechanism 1297 comprises set screws 1297A, 1297B. A first set screw 1297A (or multiple first set screws 1297A) facilitate(s) adjusting a relative XY position of the coil board configuration 1290", and a second set screw 1297B facilitates adjusting a Z position of the disruptor configuration 1250 relative to the coil board configuration 1290". In various implementations, the set screw(s) 1297A pass through and adjust the position of an alignment and mounting portion 1217 to which the coil board configuration 1290" is attached or otherwise coupled. An enclosure 1208' (e.g., which may be coupled to or part of a main body frame, such as frame 408 of FIG. 4) encloses the coil board configuration 1290" and includes spacers SP which operate in relation to the relative movement. As described above (e.g., with respect to FIG. 12A), the disruptor element 1251 moves within a hole 1291 of the coil board configuration 1290" and is coupled to a stylus suspension portion (e.g., see the suspension portion 307/407/407' of FIGS. 2-4) by a coupling configuration 1253, including an upper portion of a moving member 1212 (e.g., similar to the moving member 412 of FIGS. 3 and 4). In various implementations, the second set screw 1297B may be included as part of, or operate in conjunction with, the coupling configuration 1253 which may thus be at least partially adjustable and for which as noted above the second set screw 1297B facilitates adjusting a Z position of the disruptor element 1251 relative to the coil board configuration 1290".

Figure 17B:
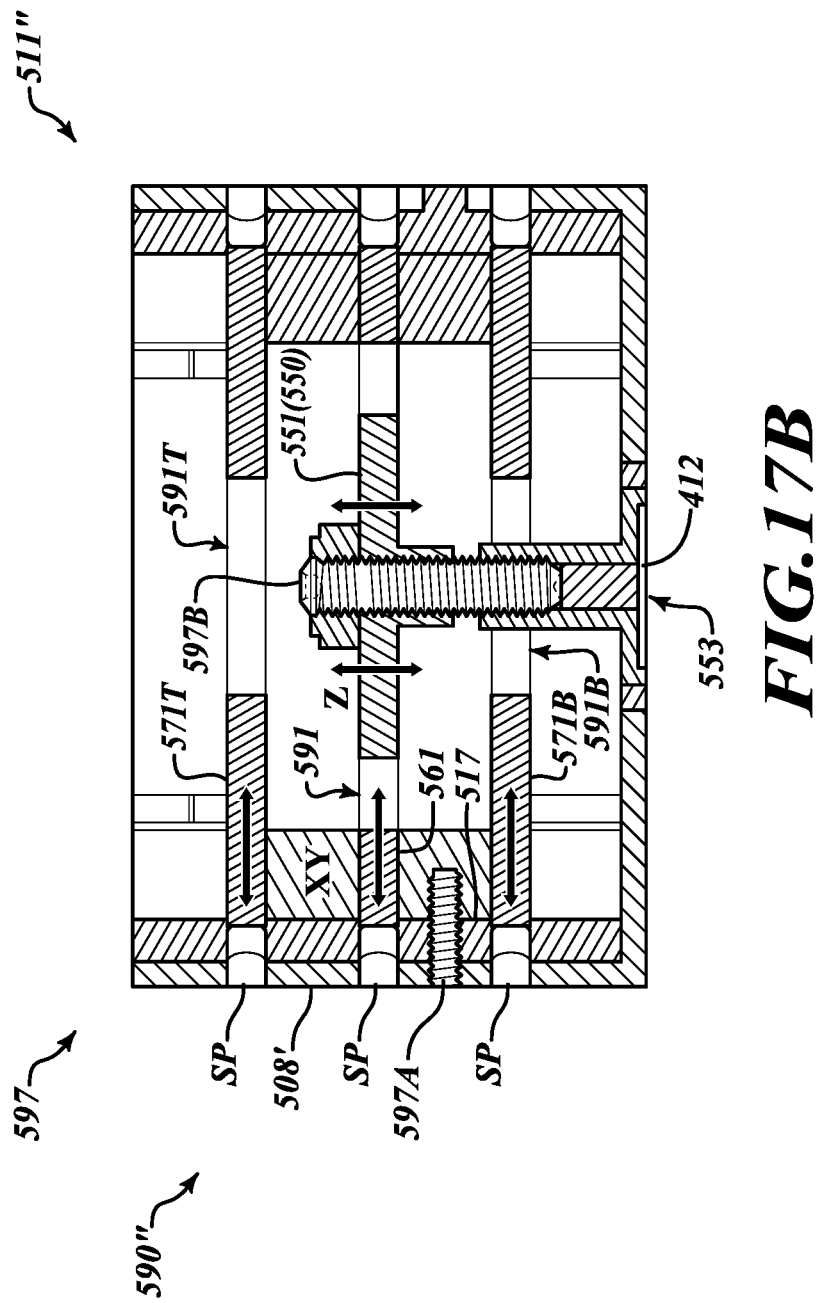

With reference to FIG. 4, FIG. 17B illustrates an exemplary implementation of a stylus position detection portion 511" in which a mechanical adjustment mechanism 597 is employed to adjust a relative position of a coil board configuration 590" and/or a disruptor configuration 550 (e.g., a relative X, Y and/or Z position of the coil board configuration or the disruptor configuration 550 with respect to each other and/or the housing/enclosure of the coil board configuration, etc.) In various implementations, the coil board configuration 590" (e.g., including the substrates 571T, 571B, and the field generating coil 561 and/or its substrate) may include additional spacing (e.g., around the edges and/or in the center, etc.) to allow for the adjustable positioning range. It will be appreciated that the mechanical adjustment mechanism 597 may be utilized to reduce a misalignment condition, similar to the operations described above with respect to FIG. 17A.

As illustrated, the mechanical position adjustment mechanism 597 comprises set screws 597A, 597B. A first set screw 597A (or multiple first set screws 597A) facilitate(s) adjusting a relative XY position of the coil board configuration 590", and a second set screw 597B facilitates adjusting a Z position of the disruptor configuration 550 relative to the coil board configuration 590". In various implementations, the set screw(s) 597A pass through and adjust the position of an alignment and mounting portion 517 to which the coil board configuration 590" is attached or otherwise coupled. An enclosure 508' (e.g., which may be coupled to or part of a main body frame, such as frame 408 of FIG. 4) encloses the coil board configuration 590" and includes spacers SP which operate in relation to the relative movement. In various implementations, the disruptor element 551 moves within a hole 591 of the coil board configuration 590" (e.g., within the field generating coil 561 and its substrate) and is coupled to a stylus suspension portion (e.g., see the suspension portion 307/407/407' of FIGS. 2-4) by a coupling configuration 553, including an upper portion of a moving member 412. In various implementations, the second set screw 597B may be included as part of, or operate in conjunction with, the coupling configuration 553 which may thus be at least partially adjustable and for which as noted above the second set screw 597B facilitates adjusting a Z position of the disruptor element 551 relative to the coil board configuration 590". In various implementations, a portion of the second set screw 597B, the moving member 412 and/or other portions of the coupling configuration 553 may move within a hole 591B of the substrate 571B (e.g., and for which in some implementations the substrate 571T may include a similar hole 591T, which may provide access to the second set screw 597B for making adjustments). In regard to FIGS. 17A and 17B, it will be appreciated that certain elements that are illustrated with or without hash lines may include holes or openings (e.g., as enabling certain relative movements, etc.) An example of such relative movements for the disruptor elements 551, 1251 within the respective stylus position detection portions 511', 1211' may be understood based at least in part on the illustration of FIG. 3 with regard to the relative movement of the disruptor element 451 within the stylus position detection portion 411.

With reference to FIG. 12B, FIGS. 18A to 18C illustrate an exemplary implementation in which misalignment compensation elements in the form of conductive shorts 1299 (e.g., a zero ohm resistor) may be added to a coil board configuration 1290'" to compensate for misalignment errors. More specifically, in various implementations the conductive shorts 1299 may be added (e.g., such as at locations as indicated in FIGS. 18B and 18C) to adjust the current path and essentially adjust the coil size of one or more adjustable coils of the coil board configuration 1290'", so as to effectively zero or otherwise compensate for certain determined offsets. In various implementations, the adjustable coils are at the top and/or bottom of the coil board configuration at the outer layers (e.g., as proximate to or part of the axial sensing coil configurations TASCC' or BASCC' in FIG. 12B), for which the conductive shorts 1299 may be easily added or removed without requiring access to internal layers of the coil board configuration.

In various implementations, when a coil board configuration is initially manufactured/produced, certain misalignment compensation elements (e.g., the shielding 1261', 1263 of FIGS. 15A to 15C) may be included as part of the manufacturing/production (e.g., as a general technique to reduce any misalignment errors that may occur due to any misalignments of the coils). In various implementations, after the coil board configuration is manufactured/produced, measurements may be taken and/or testing may be performed to determine what offsets may exist (e.g., due to coil misalignments that may have occurred during the manufacturing/production). Based on such testing/measurements, certain determinations may be made regarding the application of one or more offset compensation techniques (e.g., such as those described above with respect to FIGS. 16, 17A, 17B, and 18A to 18C). For example, in regard to the techniques of FIGS. 16, 18B and 18C, based on such testing/measurements, determinations may be made as to where the misalignment compensation elements (e.g., pins, conductive shorts, etc.) should be placed/located/added, in order to compensate for the offsets and to achieve a desired offset compensated configuration. As another example, in regard to the techniques of FIGS. 17A and 17B, based on such testing/measurements (e.g., which may be performed initially and/or after techniques such as of those of FIGS. 16, 18B and 18C have been performed to make larger adjustments and for which the techniques of FIGS. 17A and 17B are then performed to make finer adjustments), determinations may be made as to what and/or how much of an adjustment or adjustments should be made, in order to compensate for the offsets (e.g., remaining offsets) and to achieve a desired offset compensated configuration. In various implementations, multiple iterations of one or more of the compensation techniques (e.g., including repeated testing and/or active monitoring of any indicated offsets, etc.) may be performed, including continuing to make adjustments until a desired offset compensated configuration is achieved (e.g., a configuration in which respective offset errors have been reduced to an acceptable level, etc.)

While FIGS. 15A to 15C, 16, 17A, and 18A to 18C have generally been discussed with reference to FIGS. 12B and 13A, the techniques discussed herein to compensate for and reduce/address offset errors may be employed in other implementations, such as the implementations discussed above with respect to FIGS. 3, 4 and 5, and with respect to FIGS. 9A, 9B and 10.

In some implementations, a height of a cylindrical disruptor element of a scanning probe as disclosed herein along the Z direction may be equal to or greater than a height of the coil board configuration along the Z direction. In some such implementations, a height of the cylindrical disruptor element along the Z direction may be at least 1.5 times greater than a height of the coil board configuration along the Z direction.

In various implementations, the coil board configuration is configured to provide N complementary pairs of rotary sensing coils CPi that each comprise a top rotary sensing coil TRSCi and a bottom rotary sensing coil BRSCi, wherein each complementary pair CPi comprises a top rotary sensing coil TRSCi and a bottom rotary sensing coil BRSCi characterized in that a shape of their interior areas nominally coincide when projected along the axial direction.

In various implementations, the coil board configuration is configured to provide N complementary pairs of rotary sensing coils CPi that each comprise a top rotary sensing coil TRSCi and a bottom rotary sensing coil BRSCi, wherein each complementary pair CPi comprises a top rotary sensing coil TRSCi and a bottom rotary sensing coil BRSCi characterized in that a shape of their interior areas would nominally coincide if a shape of one of them is rotated about the central axis to coincide with an angular location of the other about the central axis, and then projected along the axial direction.

In some implementations, the scanning probe may comprise a moving member that is coupled to the cylindrical disruptor element and the stylus coupling portion, and which may generally extend along the central axis.

In some implementations, a method comprises generating drive control signals to control a drive mechanism that moves a scanning probe as disclosed herein along a surface of a workpiece and generating three-dimensional position information based on inductive sensing signals generated by the scanning probe as the scanning probe is moved along the surface of the workpiece.

In some implementations, a system comprises a scanning probe as disclosed herein, a drive mechanism and an attachment portion configured to couple the drive mechanism to the scanning probe. In some such implementations, the system comprises a motion controller which controls movements of the drive mechanism.

In various implementations, a field generating coil configuration of a system as disclosed herein comprises first and second field generating coil configurations that each surround a hole in the coil board configuration and correspondingly surround the disruptor motion volume. In some such implementations, the first and second field generating coil configurations comprise a pair of planar field generating coils that are located approximately equidistant from a midplane of the disruptor motion volume along the central axis, and that are nominally planar and orthogonal to the central axis. In some such implementations, the top and bottom axial sensing coil configurations also surround the hole in the coil board configuration and correspondingly surround the disruptor motion volume. In some such implementations, the coil board configuration has top and bottom portions. The top portion includes first, second and third layers, which include the top axial sensing coil configuration, the first field generating coil configuration and the N top rotary sensing coils, respectively. The bottom portion mirrors the top portion and correspondingly has first, second and third layers, which include the bottom axial sensing coil configuration, the second field generating coil configuration, and the N bottom rotary sensing coils, respectively. The coil board configuration is mounted in the fixed relationship to the frame of the scanning probe with the bottom portion of the coil board configuration closer to the stylus suspension portion. The top and bottom portions of the coil board configuration are nominally parallel to one another and nominally orthogonal to the central axis.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A scanning probe for a coordinate measuring machine, the scanning probe comprising:
    a stylus suspension portion that is coupled to a frame of the scanning probe, comprising:
        a stylus coupling portion that is configured to be rigidly coupled to a stylus; and
        a stylus motion mechanism that is configured to enable axial motion of the stylus coupling portion along an axial direction, and rotary motion of the stylus coupling portion about a rotation center; and
    a stylus position detection portion arranged along a central axis that is parallel to the axial direction and nominally aligned with the rotation center, comprising:
        a coil board configuration that is mounted in a fixed relationship to the frame of the scanning probe, the coil board configuration comprising:

a field generating coil configuration that surrounds a hole in the coil board configuration;

a top axial sensing coil configuration and a bottom axial sensing coil configuration;

N top rotary sensing coils and N bottom rotary sensing coils, where N is an integer greater than 3; and a disruptor configuration comprising a cylindrical disruptor element that is configured to move and fit within the hole of the coil board configuration, the cylindrical disruptor element comprising a conductive cylinder that provides a disruptor area, wherein the cylindrical disruptor element is located along the central axis in a disruptor motion volume and the cylindrical disruptor element is coupled to the stylus suspension portion by a coupling configuration, wherein the cylindrical disruptor element moves in the disruptor motion volume relative to an undeflected position in response to a deflection of the stylus suspension portion, the cylindrical disruptor element moving over operating motion ranges +/−Rz along the axial direction in response to the axial motion, and over respective operating motion ranges +/−Rx and +/−Ry along orthogonal X and Y directions that are orthogonal to the axial direction in response to the rotary motion, the field generating coil configuration generating a changing magnetic flux generally along the axial direction in the disruptor motion volume in response to a coil drive signal; and signal processing and control circuitry that is operably connected to the coils of the stylus position detection portion to provide the coil drive signal and configured to input signals from the coil board configuration comprising respective signal components provided by the respective rotary and axial sensing coils of the coil board configuration, and output signals indicative of an axial position and a rotary position of the cylindrical disruptor element or the stylus relative to the frame of the scanning probe.

2. The scanning probe of claim 1, wherein the field generating coil configuration comprises first and second field generating coil configurations that each surround the hole in the coil board configuration and correspondingly surround the disruptor motion volume.

3. The scanning probe of claim 2, wherein the first and second field generating coil configurations comprise a pair of planar field generating coils that are located approximately equidistant from a midplane of the disruptor motion volume along the central axis, and that are nominally planar and orthogonal to the central axis.

4. The scanning probe of claim 2, wherein the top and bottom axial sensing coil configurations also surround the hole in the coil board configuration and correspondingly surround the disruptor motion volume.

5. The scanning probe of claim 2, wherein:

the coil board configuration has top and bottom portions;

the top portion includes first, second and third layers which include the top axial sensing coil configuration, the first field generating coil configuration and the N top rotary sensing coils, respectively;

the bottom portion mirrors the top portion and correspondingly has first, second and third layers which include the bottom axial sensing coil configuration, the second field generating coil configuration, and the N bottom rotary sensing coils, respectively;

the coil board configuration is mounted in the fixed relationship to the frame of the scanning probe with the bottom portion of the coil board configuration closer to the stylus suspension portion; and the top and bottom portions of the coil board configuration are nominally parallel to one another and nominally orthogonal to the central axis.

6. The scanning probe of claim 5, wherein:

the coil board configuration comprises a normalization coil configuration having a top normalization coil as part of the top portion and a bottom normalization coil as part of the bottom portion; and the normalization coil configuration is utilized to provide a measurement of the changing magnetic flux that is generated by the first and second field generating coil configurations.

7. The scanning probe of claim 5, wherein the top and bottom portions are part of a single multilayer printed circuit board.

8. The scanning probe of claim 1, wherein a height of the cylindrical disruptor element along the Z direction is equal to or greater than a height of the coil board configuration along the Z direction.

9. The scanning probe of claim 1, a height of the cylindrical disruptor element along the Z direction is at least 1.5 times greater than a height of the coil board configuration along the Z direction.

10. The scanning probe of claim 1, wherein the coil board configuration is configured to provide N complementary pairs of rotary sensing coils CPi that each comprise a top rotary sensing coil TRSCi and a bottom rotary sensing coil BRSCi, and wherein each complementary pair CPi comprises a top rotary sensing coil TRSCi and a bottom rotary sensing coil BRSCi characterized in that a shape of their interior areas nominally coincide when projected along the axial direction.

11. The scanning probe of claim 1, wherein the coil board configuration is configured to provide N complementary pairs of rotary sensing coils CPi that each comprise a top rotary sensing coil TRSCi and a bottom rotary sensing coil BRSCi, and wherein each complementary pair CPi comprises a top rotary sensing coil TRSCi and a bottom rotary sensing coil BRSCi characterized in that a shape of their interior areas would nominally coincide if a shape of one of them is rotated about the central axis to coincide with an angular location of the other about the central axis, and then projected along the axial direction.

12. The scanning probe of claim 1, comprising a moving member that is coupled to the cylindrical disruptor element and the stylus coupling portion, the moving element generally extending along the central axis.

13. A method, comprising:

moving a scanning probe along a surface of a workpiece; and generating three-dimensional position information based on inductive sensing signals generated by the scanning probe as the scanning probe is moved along the surface of the workpiece, wherein the scanning probe comprises:

a stylus suspension portion that is coupled to a frame of the scanning probe, comprising:

a stylus coupling portion that is configured to be rigidly coupled to a stylus; and a stylus motion mechanism that is configured to enable axial motion of the stylus coupling portion along an axial direction, and rotary motion of the stylus coupling portion about a rotation center; and a stylus position detection portion arranged along a central axis that is parallel to the axial direction and nominally aligned with the rotation center, comprising:
  a coil board configuration, the coil board configuration comprising:
    a field generating coil configuration that surrounds a hole in the coil board configuration;
    a top axial sensing coil configuration and a bottom axial sensing coil configuration;
    N top rotary sensing coils and N bottom rotary sensing coils, where N is an integer greater than 3; and
  a disruptor configuration comprising a cylindrical disruptor element that is configured to move and fit within the hole of the coil board configuration, the cylindrical disruptor element comprising a conductive cylinder that provides a disruptor area, wherein the cylindrical disruptor element is located along the central axis in a disruptor motion volume and the cylindrical disruptor element is coupled to the stylus suspension portion by a coupling configuration, wherein the cylindrical disruptor element moves in the disruptor motion volume relative to an undeflected position in response to a deflection of the stylus suspension portion, the cylindrical disruptor element moving over operating motion ranges +/−Rz along the axial direction in response to the axial motion, and over respective operating motion ranges +/−Rx and +/−Ry along orthogonal X and Y directions that are orthogonal to the axial direction in response to the rotary motion, the field generating coil configuration generating a changing magnetic flux generally along the axial direction in the disruptor motion volume in response to a coil drive signal; and signal processing and control circuitry that is operably connected to the coils of the stylus position detection portion to provide the coil drive signal and configured to input signals from the coil board configuration comprising respective signal components provided by the respective rotary and axial sensing coils of the coil board configuration, and output signals indicative of an axial position and a rotary position of the cylindrical disruptor element or the stylus relative to the frame of the scanning probe.

14. The method of claim 13, further comprising:
generating drive control signals to control a drive mechanism that moves the scanning probe along the surface of the workpiece.

15. A system, comprising:
a scanning probe;
a drive mechanism; and
an attachment portion attaching the scanning probe to the drive mechanism, wherein the scanning probe comprises:
  a stylus suspension portion that is coupled to a frame of the scanning probe, comprising:
    a stylus coupling portion that is configured to be rigidly coupled to a stylus; and
    a stylus motion mechanism that is configured to enable axial motion of the stylus coupling portion along an axial direction, and rotary motion of the stylus coupling portion about a rotation center; and a stylus position detection portion arranged along a central axis that is parallel to the axial direction and nominally aligned with the rotation center, comprising:
  a coil board configuration, the coil board configuration comprising:
    a field generating coil configuration that surrounds a hole in the coil board configuration;
    a top axial sensing coil configuration and a bottom axial sensing coil configuration;
    N top rotary sensing coils and N bottom rotary sensing coils, where N is an integer greater than 3; and
  a disruptor configuration comprising a cylindrical disruptor element that is configured to move and fit within the hole of the coil board configuration, the cylindrical disruptor element comprising a conductive cylinder that provides a disruptor area, wherein the cylindrical disruptor element is located along the central axis in a disruptor motion volume and the cylindrical disruptor element is coupled to the stylus suspension portion by a coupling configuration, wherein the cylindrical disruptor element moves in the disruptor motion volume relative to an undeflected position in response to a deflection of the stylus suspension portion, the cylindrical disruptor element moving over operating motion ranges +/−Rz along the axial direction in response to the axial motion, and over respective operating motion ranges +/−Rx and +/−Ry along orthogonal X and Y directions that are orthogonal to the axial direction in response to the rotary motion, the field generating coil configuration generating a changing magnetic flux generally along the axial direction in the disruptor motion volume in response to a coil drive signal; and signal processing and control circuitry that is operably connected to the coils of the stylus position detection portion to provide the coil drive signal and configured to input signals from the coil board configuration comprising respective signal components provided by the respective rotary and axial sensing coils of the coil board configuration, and output signals indicative of an axial position and a rotary position of the cylindrical disruptor element or the stylus relative to the frame of the scanning probe.

16. The system of claim 15, further comprising a motion controller which controls movements of the drive mechanism.

17. The system of claim 15, wherein the field generating coil configuration comprises first and second field generating coil configurations that each surround the hole in the coil board configuration and correspondingly surround the disruptor motion volume.

18. The system of claim 17, wherein the first and second field generating coil configurations comprise a pair of planar field generating coils that are located approximately equidistant from a midplane of the disruptor motion volume along the central axis, and that are nominally planar and orthogonal to the central axis.

19. The system of claim 17, wherein the top and bottom axial sensing coil configurations also surround the hole in the coil board configuration and correspondingly surround the disruptor motion volume.

20. The system of claim 17, wherein:
the coil board configuration has top and bottom portions;
the top portion includes first, second and third layers which include the top axial sensing coil configuration, the first field generating coil configuration and the N top rotary sensing coils, respectively;
the bottom portion mirrors the top portion and correspondingly has first, second and third layers which include the bottom axial sensing coil configuration, the second field generating coil configuration, and the N bottom rotary sensing coils, respectively;
the coil board configuration is mounted in the fixed relationship to the frame of the scanning probe with the bottom portion of the coil board configuration closer to the stylus suspension portion; and
the top and bottom portions of the coil board configuration are nominally parallel to one another and nominally orthogonal to the central axis.

* * * * *